(12) United States Patent
Hasinoff et al.

(10) Patent No.: US 8,758,719 B2
(45) Date of Patent: Jun. 24, 2014

(54) PROCESS FOR CONVERTING FGD GYPSUM TO AMMONIUM SULFATE AND CALCIUM CARBONATE

(71) Applicant: Sparstane Technologies LLC, Birmingham, AL (US)

(72) Inventors: Murray P. Hasinoff, Birmingham, AL (US); Taylor Pursell, Mountain Brook, AL (US); Joseph A. Saiia, Birmingham, AL (US); Arthur R. Shirley, Jr., Florence, AL (US); Keith D. Cochran, Killen, AL (US); Timothy G. Holt, Florence, AL (US)

(73) Assignee: Sparstane Technologies LLC, Birmingham, AL (US)

( * ) Notice: Subject to any disclaimer, the term of this patent is extended or adjusted under 35 U.S.C. 154(b) by 0 days.

(21) Appl. No.: 13/963,072

(22) Filed: Aug. 9, 2013

(65) Prior Publication Data
US 2014/0044619 A1 Feb. 13, 2014

Related U.S. Application Data

(60) Provisional application No. 61/681,795, filed on Aug. 10, 2012.

(51) Int. Cl.
*C01C 1/24* (2006.01)
*C01C 1/26* (2006.01)
*C01F 11/18* (2006.01)
*C22B 26/20* (2006.01)

(52) U.S. Cl.
CPC . *C22B 26/20* (2013.01); *C01C 1/24* (2013.01); *C01F 11/18* (2013.01)
USPC ............................ 423/545; 423/420; 423/548

(58) Field of Classification Search
USPC .......................................... 423/420, 545, 548
See application file for complete search history.

(56) References Cited

U.S. PATENT DOCUMENTS

| | | |
|---|---|---|
| 1,902,649 A | 3/1933 | Larsson |
| 2,640,757 A | 6/1953 | Robinson |

(Continued)

FOREIGN PATENT DOCUMENTS

| | | |
|---|---|---|
| CN | 1050819 | 3/2000 |
| CN | 101497455 | 8/2009 |

(Continued)

OTHER PUBLICATIONS

Chou, M. et al. "Manufacture of Ammonium Sulfate Fertilizer from FGD-Gypsum", Technical Report Illinois Geological Survey, Rpt. No. DOE.PC/92521-T258, pub. Dec. 31, 1995.

(Continued)

*Primary Examiner* — Timothy Vanoy
(74) *Attorney, Agent, or Firm* — Paul E. White, Jr.; Manelli Selter PLLC

(57) ABSTRACT

A continuous countercurrent flow process for converting FGD gypsum to ammonium sulfate and calcium carbonate including countercurrent flows with internal recycle of liquids to maximize the purity of reaction products while minimizing reaction times, and further include embodiments of the process that provide a yield of both ammonium sulfate and calcium carbonate to be 97 to 100%, and embodiments that provide for processes having a total time of reaction being 8 to 12 minutes, the invention further including processes for removing contaminants from the FGD gypsum employing an acid rinse process and/or a slurry tank reactor process.

20 Claims, 7 Drawing Sheets

(56) References Cited

U.S. PATENT DOCUMENTS

| | | | |
|---|---|---|---|
| 2,795,486 A | 6/1957 | Plum | |
| 3,085,857 A * | 4/1963 | Montgomery O'Sullivan et al. | 423/548 |
| 3,515,534 A | 6/1970 | Livingston | |
| 3,687,620 A * | 8/1972 | Witte et al. | 423/548 |
| 4,124,688 A | 11/1978 | Shibazaki et al. | |
| 5,630,991 A | 5/1997 | Gal et al. | |
| 6,106,796 A * | 8/2000 | Phinney et al. | 423/545 |
| 2007/0062231 A1 | 3/2007 | Spindler et al. | |
| 2011/0300045 A1 | 12/2011 | Jang et al. | |

FOREIGN PATENT DOCUMENTS

| | | |
|---|---|---|
| CN | 102701256 | 10/2012 |
| DE | 610786 | 2/1935 |
| DE | 612806 | 4/1935 |
| DE | 3217394 | 11/1983 |
| EP | 0495937 | 7/1992 |
| GB | 273103 | 6/1927 |
| GB | 355098 | 8/1931 |
| GB | 437278 | 10/1935 |
| GB | 607231 | 8/1948 |
| GB | 756652 | 9/1956 |
| JP | 2008-132483 | 6/2008 |
| WO | WO 2005/118222 | 12/2005 |
| WO | WO 2012/022836 | 2/2012 |
| WO | WO 2013/012214 | 1/2013 |

OTHER PUBLICATIONS

Mulopo, J. et al. "Phosphogypsum Conversion to Calcium Carbonate and Utilization for Remediation of Acid Mine Drainage", J Chem Eng Process Technol, 3:129, p. 2-6, 2012.

Chou, M. et al. "Manufacture of Ammonium Sulfate Fertilizer . . . Byproduct of Flue Gas Desulfurization—A Prefeasibility Cost Estimate", ACS Div Fuel Chem, 41:2, p. 580-86, 1996.

Abbas, K. "Study on the Production of Ammonium Sulfate Fertilizer From Phosphogypsum", Eng. & Tech. J, 29:4, p. 814-821, 2011.

Chou, M. et al "Manufacture of Ammonium Sulfate Fertilizer From FGD-Gypsum", Symposium on Technologies for Utilization/Disposal of Waste Materials, Illinois GS p. 896-900, pub. Aug. 1996.

"Ultrasound influence upon calcium carbonate precipitation on bacterial cellulose membranes" Ultrasonics Sonochemistry, 19:4, Abstract, Figs 4-6, Jul. 2012.

Chou, M. et al. "Producing Ammonium Sulfate from Flue Gas Desulfurization By-Products", Energy Sources, 27:11, p. 1061-1071, 2005.

"What is PCC—Precipitated Calcium Carbonate?", www.specialtyminerals.com, 2012.

* cited by examiner

FIGURE 1 – FIRST GYPSUM CONVERSION COUNTERCURRENT FLOW PROCESS

FIGURE 3 — CONTAMINANT REMOVAL ACID RINSE PROCESS

LESS REACTIVE FGD GYPSUM A CRYSTALS

HIGHLY REACTIVE FGD GYPSUM B CRYSTALS

PRODUCT CALCIUM CARBONATE CRYSTALS AND AGGLOMERATES

PROCESS FOR CONVERTING FGD GYPSUM TO AMMONIUM SULFATE AND CALCIUM CARBONATE

BACKGROUND OF THE INVENTION

1. Field of the Invention

This invention relates to the production of ammonium sulfate and calcium carbonate from gypsum obtained from flue gas desulfurization (FGD) systems located at electric power plants. While FGD gypsum provides a cheap source of gypsum, the physical structure of the gypsum crystalline particles may have characteristics that make it difficult to react with other chemicals. The process of the present invention overcomes this problem and other difficulties to result in an economically viable method to produce ammonium sulfate of high purity and yield.

FGD gypsum is a synthetic product resulting from sulfur dioxide ($SO_2$) gas emission control systems used at fossil fuel and particularly, coal combustion power plants to remove sulfur from the combustion gases using "scrubber" devices. The sulfur dioxide is derived from any sulfur containing compounds in the fuels. A wet scrubber uses lime (calcium oxide or calcium hydroxide) or more typically, limestone (calcium carbonate) to react with sulfur dioxide gas to remove the sulfur in a solid form. The reaction in wet scrubbing uses a limestone ($CaCO_3$)-water slurry to produce calcium sulfite ($CaSO_3$) according to the following chemical reaction:

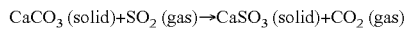

$$CaCO_3 \text{ (solid)} + SO_2 \text{ (gas)} \rightarrow CaSO_3 \text{ (solid)} + CO_2 \text{ (gas)}$$

In the above chemical reaction, the production of carbon dioxide ($CO_2$) causes a potential detrimental release of carbon dioxide into the flue gas which may lead to violation of air quality regulations and possibly lead to a greater atmospheric greenhouse effect.

To partially offset the cost of the FGD installation, the $CaSO_3$ (calcium sulfite) may be further oxidized (known as forced oxidation) to produce $CaSO_4 \cdot 2H_2O$ (FGD gypsum) according to the following chemical reaction:

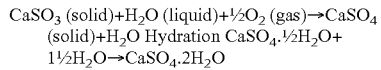

$$CaSO_3 \text{ (solid)} + H_2O \text{ (liquid)} + \tfrac{1}{2}O_2 \text{ (gas)} \rightarrow CaSO_4 \text{ (solid)} + H_2O \text{ Hydration } CaSO_4 \cdot \tfrac{1}{2}H_2O + 1\tfrac{1}{2}H_2O \rightarrow CaSO_4 \cdot 2H_2O$$

FGD gypsum consists of small, fine, crystalline particles and is chemically nearly identical to mined natural gypsum. However, FGD gypsum produced at different power plants may differ slightly in chemical composition and in crystalline structure. Most chemical differences are due to impurities from the employed fuel. Structurally, however, some FGD gypsum may be composed of crystalline particles that have less surface area and are thus less reactive than other FGD gypsum crystalline particles. FGD crystals that are thicker and more spherical have less reactive surface area. Thus, a process that employs FGD gypsum as a starting material, must be able to accommodate the less reactive FGD gypsum particles as well as FGD gypsum crystalline particles resulting from other FGD installations that produce particles having flatter, more disc like structure with greater reactive surface area.

The process of the present invention employs a chemical reaction of FGD gypsum with ammonium carbonate (($NH4)_2CO_3$) to produce ammonium sulfate (($NH4)_2SO_4$) and calcium carbonate ($CaCO_3$). Both the ammonium sulfate and calcium carbonate products are commercially valuable materials and are produced by the present process in high purity and high yield.

Ammonium sulfate (21-0-0-24S) is used most commonly as a chemical fertilizer for alkaline soils. When applied to damp soil, an ammonium ion is released which creates a small amount of acid, that lowers the pH balance of the soil. In the soil, the ammonium ions are converted to nitrate by soil bacteria which contributes nitrogen to the soil and aids in plant growth. Ammonium sulfate dissolves relatively slowly (ammonium sulfate—74.4 g/100 ml (20° C.), urea—107.9 g/100 ml (20° C.), ammonium nitrate—150 g/100 ml (20° C.)), which makes for more efficient use and thus reduces cost compared to some other artificial fertilizers.

Common nitrogen fertilizers include anhydrous ammonia (82% N), urea (46% N), urea and ammonium nitrate solutions (28-32% N), ammonium sulfate (21% N) and ammonium nitrate (34% N). Ammonium sulfate (21%) is a nitrogen source with little or no surface volatilization loss when applied to most soils. It is easy to store and is not as hygroscopic as ammonium nitrate. Ammonium sulfate is a good source of sulfur when it is needed to correct or prevent a sulfur deficiency. In areas with high pH soils, the sulfur in ammonium sulfate helps lower soil pH levels.

In addition to use as fertilizer, ammonium sulfate is used as an agricultural spray adjuvant for water soluble insecticides, herbicides and fungicides. In this capacity, it functions to bind iron and calcium cations that are present in both well water and plant cells. It is particularly effective as an adjuvant for 2,4-D (amine), glyphosate, and glufosinate herbicides.

Ammonium sulfate is used in flame retardant materials because it lowers the combustion temperature and increases the production of residues or chars.

In biochemistry, ammonium sulfate precipitation is a common method for purifying proteins by precipitation. As such, ammonium sulfate is also listed as an ingredient in many vaccines used in the United States. The DTap vaccine, which protects children from diphtheria, tetanus, and whooping cough, uses ammonium sulfate for this purpose.

Fine calcium carbonate results as precipitated particles from the process of the present invention and is useful in many industries.

High purity calcium carbonate is used as dietary calcium supplement to help ensure healthy bones and teeth. Calcium carbonate supplement is effective to treat certain medical disorders related to calcium deficiency such as osteoporosis and to reduce acid in the stomach and relieve indigestion and heartburn. For irritable bowel syndrome, a calcium carbonate supplement may be taken to reduce or relieve diarrhea. Calcium carbonate is used in the production of toothpaste and as an inert substance in pharmaceutical or dietary supplement tablets.

Fine calcium carbonate is the most preferred mineral in the paper industry, used for filling and coating paper. It helps in production of the best quality printing papers. Precipitated calcium carbonate is used as a filler in paper because it is cheaper than wood fiber wherein printing and writing paper can contain 10-20% calcium carbonate. In North America, calcium carbonate has begun to replace kaolin in the production of glossy paper. Europe has been practicing this as alkaline or acid-free papermaking for several decades. Precipitated calcium carbonate is especially useful compared to ground calcium carbonate because of having a very fine and controlled particle size, on the order of 2 micrometers in diameter, which is of particular utility in producing coatings for paper.

In the oil industry, calcium carbonate is added to drilling fluids as a formation-bridging and filter cake sealing agent and can also be used as a weighting material to increase the density of drilling fluids to control the down-hole pressure.

Additionally, with respect to the above described production of carbon dioxide by scrubbing the flue gas which ultimately produces FGD gypsum, the ammonium carbonate used in the process of the present invention will be produced by removing the carbon dioxide created by the scrubber and reacting it with ammonia in a separate reactor and process to produce the ammonium carbonate. Thus, a complete recycle of the scrubber carbon dioxide will be achieved by employing it in the form of ammonium carbonate to feed back into the process of the present invention. This would help lead to compliance with air quality regulations and possibly lead to less atmospheric greenhouse effect.

2. Description of Related Art

Because of increasingly stringent flue gas environmental standards for coal fired, electric power plants, the amount of solid waste, such as FGD gypsum, generated by flue gas scrubbers has increased to a very large volume. While others have previously attempted to make useful products from the FGD gypsum or similar gypsum waste products, they have failed to employ processes that can produce ammonium sulfate and calcium carbonate of the high purity and efficiency of yield provided by the process of the present invention.

For example, the publication, WO 2005/11822A discloses a process for treating phosphogypsum that produces calcium carbonate and ammonium sulfate, but the calcium carbonate is impure due to the process failure to include a procedure to remove ammonium sulfate or ammonium carbonate from the produced calcium carbonate. The disclosed process also fails to include procedures for purifying the incoming gypsum feedstock.

In the British patent, GB 437,278, a process is disclosed for the treatment of combustion and distillation gases from gas works and coke ovens by contacting the gases with calcium carbonate to recover calcium sulfate (gypsum) and react it with ammonia and carbon dioxide from the gases to make ammonium sulfate and calcium carbonate. However, the produced calcium carbonate is contaminated with calcium sulfate and the conversion of reactants to products is incomplete.

The German patent no. 610786 discloses a process for continuous conversion of calcium sulfate and ammonium carbonate to ammonium sulfate and calcium carbonate. This patent shows the difficulty in obtaining reaction products, such as calcium carbonate of high purity due to the difficulty of separating the small precipitated crystals of calcium carbonate from the ammonium sulfate. In this process, seed crystals of calcium carbonate are added to the produced ammonium sulfate solution to grow large crystals of calcium carbonate which can be more effectively filtered and removed from the ammonium sulfate product.

German patent no. 612806 disclosed a process for continuous conversion of calcium sulfate and ammonium carbonate to ammonium sulfate and calcium carbonate. Significantly, the disclosed process is co-current and not countercurrent as in one embodiment of the present invention and the time required for conversion is about five hours which is much slower than the conversion by the present countercurrent process which is about ten minutes. While the disclosed conversion yield is 97%, the conversion yield of the present countercurrent process is as high as approximately 100%.

BRIEF SUMMARY OF THE INVENTION

The present invention thus provides several embodiments including those which encompass an ammonium sulfate product and a calcium carbonate product and those embodiments which encompass a single stage continuous process and a multistage countercurrent continuous process for making the ammonium sulfate and calcium carbonate products.

The processes of the present invention combines FGD gypsum ($CaSO_4 \cdot 2H_2O$) with ammonium carbonate (($NH_4)_2CO_3$) to undergo a chemical reaction to produce ammonium sulfate solution (($NH_4)_2SO_4$) and calcium carbonate ($CaCO_3$) by the following reaction:

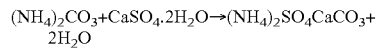

With respect to the embodiment of a multistage countercurrent continuous process, FGD gypsum ($CaSO_4 \cdot 2H_2O$) from a coal fired electric power plant was successfully converted to calcium carbonate ($CaCO_3$) and ammonium sulfate (($NH_4)_2SO_4$) at conversion rates of 97 to approximately 100% using the process of the present invention. The employed FGD gypsum crystalline particles had a physical structure that provided poor reactivity.

The countercurrent process achieved a conversion rate to ammonium sulfate and calcium carbonate of 97 to approximately 100% and higher conversion yields were also obtained of 98% to approximately 100%, 99% to approximately 100% and an achieved yield of approximately 100% conversion by employing two or more reactors in a continuous countercurrent flow process. The highest yields were from a countercurrent process that further includes a mixer in each of the reactor(s). The process of the present invention obtains an unusually quick and high yield while maintaining low reaction retention time, moderate temperature and less mixing action.

According to an embodiment of the present invention, the calcium carbonate product was produced in especially small particle size, of generally cubic shape which agglomerated into particle masses enabling quick and efficient separation from liquids to a solids cake of high purity.

FGD gypsum is produced at different power plants in the form of crystalline particles that have different physical characteristics. The present process achieves a high product yield even employing fairly unreactive FGD gypsum crystals. Such gypsum crystals are thicker and have less surface area compared to the flatter, more disc like crystals produced at other power plants.

According to another embodiment of the present invention, a single stage continuous process using a single reactor was sufficient to obtain a 90% yield of ammonium sulfate and calcium carbonate by employing a more reactive FGD gypsum. In contrast, employing a single stage reactor for a less reactive FGD gypsum was not sufficient, resulting in only a 30 to 50% yield and even using a larger reactor, only a 75% yield was achieved. Thus, the new single stage continuous process is sufficient for converting a more reactive gypsum and the present invention includes a single stage reactor for this purpose. However, it was necessary to develop a new countercurrent flow process to convert a less reactive gypsum.

Accordingly, embodiments of the process of the present invention include a single stage continuous process and also a multistage countercurrent continuous process wherein both provide high yields of high purity products employing more reactive FGD gypsum particles having greater reactive surface area. Further, embodiments of the process of the present invention include multistage countercurrent continuous processes that provide high yields of high purity products employing less reactive FGD gypsum particles from other FGD installations having less reactive surface area.

Embodiments of the process of the present invention further include processes for removal of contaminants from the FGD gypsum feed to the processes. Contaminants, including selenium, aluminum, magnesium and others are removed by an acid rinse removal process and a slurry tank reactor removal process. Both processes are highly effective in removing contaminants from the FGD gypsum and thus ensuring that the ammonium sulfate and calcium carbonate products of the present process are of a pure quality.

DETAILED DESCRIPTION OF THE INVENTION

Figure 1:
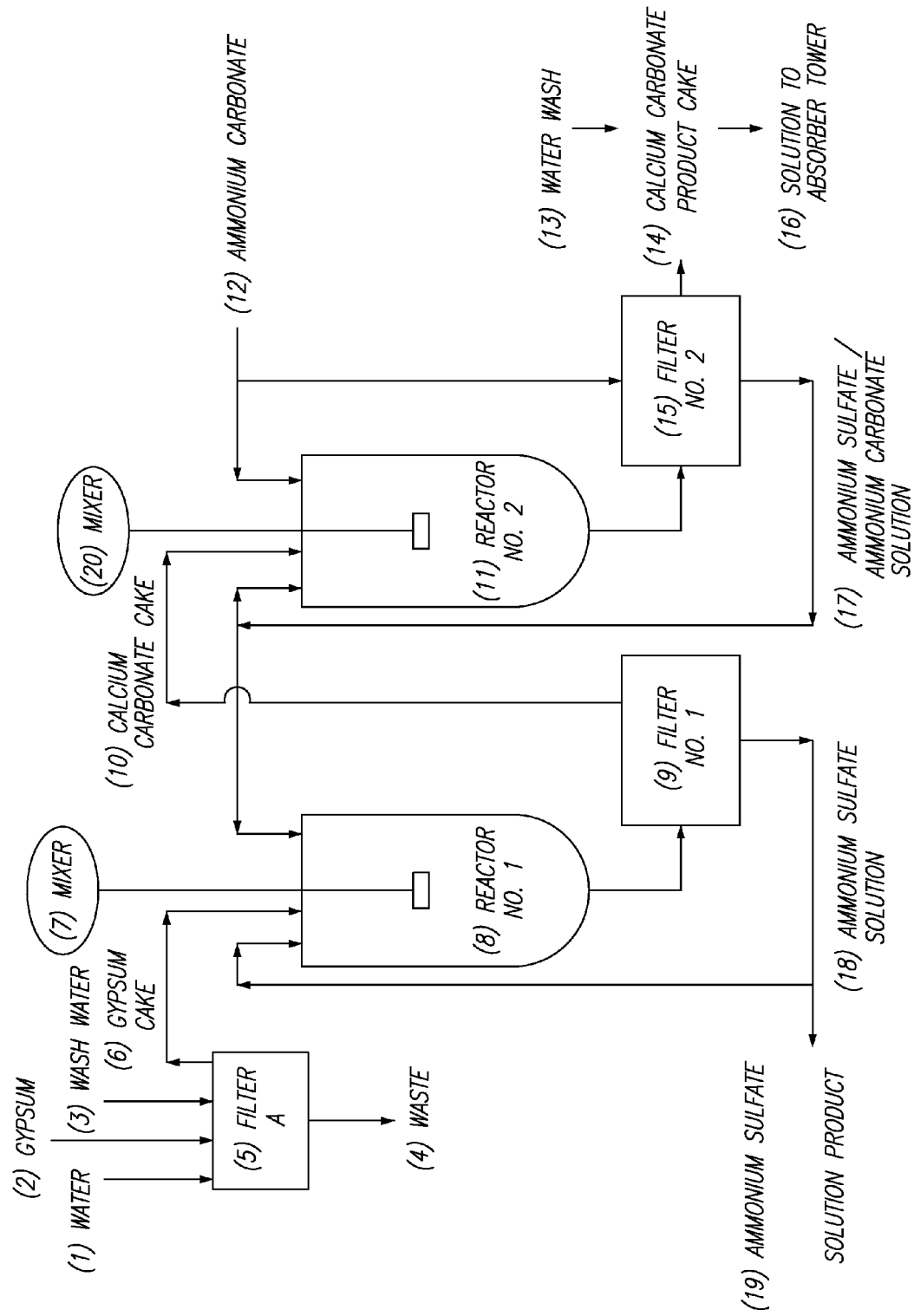
FIG. 1 shows a schematic of the first gypsum conversion countercurrent flow process of the invention.

The multistage countercurrent continuous process of the present invention employs two or more reactors in a continuous countercurrent flow process to convert FGD gypsum to ammonium sulfate and calcium carbonate at a maximum yield of approximately 100% and at least a yield of 97% with reaction of the gypsum according to the following chemical reaction:

$$(NH_4)_2CO_3 + CaSO_4 \cdot 2H_2O \rightarrow (NH_4)_2SO_4 + CaCO_3 + 2H_2O$$

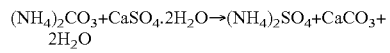

Initially a single stage continuous process employing a single reactor (Tennessee Valley Authority (TVA) converter) was employed with mixing of ammonium carbonate and calcium sulfate within the reactor and partial recirculation of the ammonium sulfate and calcium carbonate product stream. Typically, the FGD gypsum is hydrated, i.e., two moles water to a mole of calcium sulfate. When FGD gypsum was employed having crystalline structure of flat, disc shape, evincing a more highly reactive structure, the single stage reactor resulted in yields of 90% after 5 hours retention time.

However, when under the same conditions, FGD gypsum was employed having crystalline structure of thick, round shape, evincing a less reactive structure, the conversion rate was 75%. Even with longer retention times in the reactor at elevated temperatures with excess ammonium carbonate the single stage reactor only produced 90% yields of product. The longer retention times and more excess ammonium carbonate resulted in only slightly higher yields.

In order to convert the less reactive FGD gypsum to ammonium sulfate and calcium carbonate, a continuous multistage countercurrent flow process was developed employing at least two reactors. In another embodiment of the present process, up to four reactors may be employed in the continuous multistage countercurrent flow process.

Embodiments of the present invention include the following:

1) A continuous countercurrent flow process for converting FGD gypsum to ammonium sulfate and calcium carbonate including the following steps:
   separating an aqueous slurry of FGD gypsum to result in a FGD gypsum liquid residue and a FGD gypsum cake;
   combining the FGD gypsum cake with an ammonium carbonate solution and an ammonium sulfate solution in a first reactor to chemically react and form an ammonium sulfate solution containing a precipitated calcium carbonate and a FGD gypsum remnant and an ammonium carbonate remnant;
   separating the precipitated calcium carbonate from the ammonium sulfate solution to result in a product ammonium sulfate solution residue and an initial product calcium carbonate cake;
   employing a part of the product ammonium sulfate solution residue to retain as product ammonium sulfate solution and a remaining part to recycle back into the first reactor;
   combining the initial product calcium carbonate cake with a portion of the ammonium carbonate solution in a second reactor to chemically react and form an initial product ammonium sulfate solution;
   separating the initial product ammonium sulfate solution to result in an initial product ammonium sulfate solution residue and a final product calcium carbonate cake and retaining the final product calcium carbonate cake;
   washing the final product calcium carbonate cake with a portion of the ammonium carbonate solution, then with water to result in an ammonium carbonate wash residue;
   adding the ammonium carbonate wash residue to the second reactor; and
   employing part of the initial product ammonium sulfate solution residue to recycle to the first reactor and part of the initial product ammonium sulfate solution residue to recycle to the second reactor.

2) The process of 1), wherein the product ammonium sulfate solution contains ammonium sulfate and the product calcium carbonate cake contains calcium carbonate, with both ammonium sulfate and calcium carbonate in a yield of 97 to 100%.

3) The process of 1), wherein the product ammonium sulfate solution contains ammonium sulfate and the product calcium carbonate cake contains calcium carbonate, with both ammonium sulfate and calcium carbonate in a yield of 100%.

4) The process of 1), wherein the process has a total time of reaction being 8 to 12 minutes.

5) The process of 1), wherein the FGD gypsum is particulate crystals having less reactive surface area, being prism crystals of size 30×30×40 microns to 40×40×80 microns.

6) The process of 1), wherein the process is conducted at temperatures of 80 to 100° F.

7) The process of 1), further including mixing within the first reactor and the second reactor by a mixer selected from the group consisting of impeller mixer, paddle mixer, ultrasonic mixer and homogenizer.

8) The process of 7), wherein the ultrasonic mixer operates periodically at 2-20 seconds per minute of retention time in a reactor 9) The process of 1), wherein separating is by a centrifuge or a filter.

10) The process of 1), wherein contaminants are removed from the FGD gypsum by an acid rinse process comprising the steps of
   filtering the FGD gypsum slurry to result in a FGD gypsum filter cake;
   rinsing the FGD gypsum filter cake with an aqueous solution containing sulfuric acid from 0.01 to 10% concentration to result in a purified FGD gypsum filter cake; and
   rinsing the purified FGD gypsum filter cake with water to remove residual sulfuric acid solution to result in a final purified FGD gypsum filter cake.

11) The process of 10), wherein there is a reduction in selenium concentration of 71-73%, a reduction in magnesium of 46-91% and a reduction of aluminum of 18-36%.

12) The process of 10), wherein the waste filtrate is purified by a process comprising the steps of contacting the waste filtrate with active carbon to reduce the concentration of selenium to less than 4 ppm.

13) The process of 1), wherein contaminants are removed from the FGD gypsum by a slurry tank process comprising the steps of introducing the aqueous slurry of FGD gypsum to a reactor vessel;

introducing an aqueous solution of sulfuric acid from 0.01 to 10% concentration to the reactor vessel and mixing with the aqueous slurry of FGD gypsum to produce a reacted slurry containing contaminant products in solution; and filtering the reacted slurry to produce a filter cake of purified FGD gypsum and waste filtrate.

14) The process of 13), wherein there is a reduction in selenium concentration of 65-73%, a reduction in magnesium of 19-90% and a reduction of aluminum of 19-90%.

15) The process of 13), wherein the waste filtrate is purified by a process comprising the steps of contacting the waste filtrate with active carbon to reduce the concentration of selenium to less than 4 ppm.

16) The process of 1), wherein the step of combining the washed FGD gypsum cake with an ammonium carbonate solution, the amount of washed FGD gypsum and the amount of ammonium carbonate solution is regulated by adjusting the amount of recycled product ammonium sulfate solution to the first reactor and the amount of recycled initial product ammonium sulfate solution to the second reactor.

17) The process of 1), wherein the first reactor contains a solids concentration of reactants and the second reactor contains a solids concentration of reactants, and the solids concentration in the first reactor is regulated by adjusting a discharge flow from the first reactor and a recycle input flow to the first reactor, and the solids concentration in the second reactor is regulated by adjusting a discharge flow from the second reactor and a recycle input flow to the second reactor.

18) Calcium carbonate particles having substantially cubic shape and of a size ranging from 0.5 to 4.0 microns.

19) A continuous countercurrent flow process for converting FGD gypsum to ammonium sulfate and calcium carbonate comprising the following steps:

filtering an aqueous slurry of FGD gypsum to result in a FGD gypsum liquid filtrate and a FGD gypsum filter cake;

washing the FGD gypsum filter cake with water and disposing a wash water filtrate;

combining the washed FGD gypsum filter cake with an ammonium carbonate and an ammonium sulfate solution in a first reactor to chemically react and form an ammonium sulfate solution containing a precipitated calcium carbonate and a FGD gypsum remnant and an ammonium carbonate remnant;

filtering the precipitated calcium carbonate from the ammonium sulfate solution to result in a product ammonium sulfate solution filtrate and an initial product calcium carbonate filter cake;

employing a part of the product ammonium sulfate solution filtrate to retain as product ammonium sulfate solution and a remaining part to recycle back into the first reactor;

combining the initial product calcium carbonate filter cake with a portion of the ammonium carbonate solution in a second reactor to chemically react and form an initial product ammonium sulfate solution;

filtering the initial product ammonium sulfate solution to result in an initial product ammonium sulfate solution filtrate and a final product calcium carbonate cake and retaining the final product calcium carbonate cake;

washing the final product calcium carbonate cake with unreacted ammonium carbonate solution, then with water to result in an ammonium carbonate wash filtrate containing ammonium carbonate and calcium sulfate, and a clean final product calcium carbonate cake;

adding the ammonium carbonate wash filtrate to the second reactor;

employing part of the initial product ammonium sulfate solution filtrate to recycle to the first reactor and part of the initial product ammonium sulfate solution filtrate to recycle to the second reactor.

employing the ammonium carbonate wash filtrate as the absorbing liquid in an absorber tower and contacting the ammonium carbonate wash filtrate with ammonia and carbon dioxide to produce ammonium carbonate, and recycling the ammonium carbonate as a process reactant;

20) A continuous countercurrent flow process for converting FGD gypsum to ammonium sulfate and calcium carbonate comprising the following steps:

filtering an aqueous slurry of FGD gypsum on a continuous filter having two zones, zone A and zone B, where in zone A water is washed over the FGD gypsum to result in a FGD gypsum waste filtrate and a FGD gypsum filter cake and in zone B, the FGD gypsum filter cake is washed with an ammonium sulfate solution containing a residual ammonium carbonate to result in a purer ammonium sulfate solution as process product and a reacted FGD gypsum filter cake containing calcium carbonate;

combining the reacted FGD gypsum filter cake with an ammonium carbonate solution and an ammonium sulfate solution in a first reactor to chemically react and form an ammonium sulfate solution containing a precipitated calcium carbonate and a FGD gypsum remnant and an ammonium carbonate remnant;

separating the precipitated calcium carbonate from the ammonium sulfate solution to result in a product ammonium sulfate solution residue and an initial product calcium carbonate cake;

employing a part of the product ammonium sulfate solution residue to retain as product ammonium sulfate solution and a remaining part to recycle back into the first reactor;

combining the initial product calcium carbonate cake with a portion of the ammonium carbonate solution in a second reactor to chemically react and form an initial product ammonium sulfate solution;

filtering the initial product ammonium sulfate solution on a continuous filter having three zones, zone A, zone B and zone C, wherein the initial product ammonium sulfate solution is filtered in zone A to result in an initial product ammonium sulfate solution filtrate and a final product calcium carbonate filter cake containing a second FGD gypsum remnant and in zone B the final product calcium carbonate filter cake is washed with a second ammonium carbonate solution to remove the second FGD gypsum remnant, resulting in an ammonium carbonate filtrate that is recycled to the second reactor, and in zone C the final product calcium carbonate filter cake is washed with water to result in an ammonium carbonate wash filtrate and the final product calcium carbonate cake is retained as process product;

recycling the ammonium carbonate wash filtrate to the second reactor; and employing part of the initial product ammonium sulfate solution filtrate to recycle to the first reactor and part of the initial product ammonium sulfate solution filtrate to recycle to the second reactor.

First Gypsum Conversion Countercurrent Process

The countercurrent process of the present invention as shown in FIG. 1, is one embodiment of the present inventive process and consists of a two-step reactor process with pure ammonium carbonate solution entering the process at the Reactor No. 2 (11) and the unreacted gypsum entering the process at Reactor No. 1 (8). This ensures that already partially reacted gypsum is exposed to pure ammonium carbonate solution in the Reactor No. 2 (11) resulting in excess ammonium carbonate which enables approximately 100% conversion to ammonium sulfate and calcium carbonate. Based upon laboratory tested processes as described, for instance, in the below disclosed Examples, FIG. 1 simulates the multistage countercurrent continuous process of the present invention, but the process is not limited to the process shown in FIG. 1. While FIG. 1 shows two reactors, additional reactors may be added if necessary to ensure high purity and high yield products. Embodiments of the present process include a three reactor process and a four reactor process.

Thus, one embodiment of the present continuous multistage countercurrent process is shown in FIG. 1. The displayed process entails reacting Flue Gas Desulfurization (FGD) gypsum with ammonium carbonate to form ammonium sulfate and calcium carbonate. This is a unique countercurrent process with internal recycle of liquids to maximize the calcium carbonate and ammonium sulfate purity. Water (1) and Gypsum (2) are mixed to form a slurry then poured over Filter A (5) to form a cake. The Gypsum Cake (6) is then rinsed with Wash Water (3) to remove some contaminants. The Gypsum Cake (6) is fed to Reactor No. 1 (8) where it is mixed with Ammonium Sulfate Solution (18) recycled from Filter No. 1 (9). A Mixer (7) is used to agitate the contents of the Reactor No. 1 (8). The temperature in Reactor No. 1 (8) is maintained between 70° F. and 150° F., preferably 80° F. to 100° F. Also added to Reactor No. 1 (8) is filtrate of Ammonium Sulfate/Ammonium Carbonate Solution (17) from Filter No. 2 (15) which is primarily ammonium sulfate and ammonium carbonate solution. The ammonium carbonate reacts quickly in Reactor No. 1 (8) since there is an excess quantity of gypsum present. Ammonium Sulfate Solution Product (19) is removed from the process as a side stream. The ammonium sulfate solution is approximately 30%.

Effluent from Reactor No. 1 (8) is continuously filtered forming a Calcium Carbonate Cake (10) also containing gypsum residue which is fed to reactor No. 2 (11) which is agitated by a Mixer (20). Ammonium Carbonate Solution (12), ranging from 25 to 35% and preferably 33% at a temperature ranging from 110° F. to 120° F. and preferably at 115° F., is metered to Reactor No. 2 (11). Filtrate which contains Ammonium Sulfate/Ammonium Carbonate Solution (17) from Filter No. 2 (15) is continuously recycled to Reactor No. 2 (11). The temperature in reactor No. 2 (11) is maintained between 70° F. and 150° F., preferably 80° F. to 100° F. Effluent from Reactor No. 2 (11) is continuously filtered forming a Calcium Carbonate Product Cake (14). The filter cake is further purified by passing a portion of Ammonium Carbonate (12) over the filtered Calcium Carbonate Product Cake (14). The Calcium Carbonate Product Cake (14) is then rinsed with Water Wash (13) which becomes Solution To Absorber Tower (16) whereby ammonium carbonate is absorbed.

The following emphasizes above described steps of the present multistage countercurrent continuous flow process shown in FIG. 1:

1. FGD gypsum was mixed with water to form an aqueous slurry of about 15 to 25% gypsum, which was then filtered in (5) Filter A to remove possible physical contaminants in the gypsum. The inputs of (1) Water and (2) Gypsum to (5) Filter A are to indicate that an aqueous slurry of gypsum was employed.

2. The filter cake ((6) Gypsum Cake) from (5) Filter A is washed with water. Thus, wash water containing soluble contaminants in the FGD gypsum is the filtrate from (5) Filter A.

3. The filter cake from (5) Filter A is removed and charged to (8) Reactor No. 1.

4. Product ammonium sulfate solution from (9) Filter No. 1 is partially recycled to (8) Reactor No. 1. Product ammonium sulfate solution from (15) Filter No. 2 is partially recycled to (8) Reactor No. 1. Both partially recycled ammonium sulfate streams are mixed with (6) Gypsum cake from (5) Filter A, within (8) Reactor No. 1.

5. In one embodiment of the present process, a mixing unit operation is employed in (8) Reactor No. 1.

6. Product calcium carbonate filter cake from (8) Filter No. 1 is introduced to (11) Reactor No. 2.

7. Part of the recycled stream of product ammonium sulfate solution from (15) Filter No. 2 is introduced to (11) Reactor No. 2. In an optional embodiment of the process, a mixer may be present in (11) Reactor No. 2.

8. Ammonium carbonate ranging from 25% to 35% and preferably about 33% ammonium carbonate solution at a temperature of 75° F. to 120° F., preferably of 90° F. to 120° F. and most preferably of 110° F. to 120° F. is introduced to (11) Reactor No. 2 and mixed with the calcium carbonate and ammonium sulfate.

9. Calcium carbonate filter cake from (15) Filter No. 2 is removed and washed with incoming ammonium carbonate solution and then with water to result in clean product calcium carbonate. The used wash water may optionally be treated and cleaned in an absorber tower or more desirably to absorb ammonium carbonate and reintroduce to the process.

10. Product ammonium sulfate solution filtrate from (5) Filter A is stored or sent to a crystallizer. If stored, this solution can be optimally heated to 110-115° F. to keep crystallization from occurring. The crystallizer or alternatively, an evaporator, is employed in the process of the present invention to grow ammonium sulfate crystals for separation and removal as an easier to handle, more solid product.

The retention time in (8) Reactor No. 1 is 1 minute to 20 minutes, and preferably 5 minutes to 10 minutes. The retention time in (11) Reactor No. 2 is 1 minute to 20 minutes, and preferably 5 minutes to 10 minutes. The typical time of complete reaction for the process of the present invention is about 6-14 minutes and typically about 9-11 minutes.

The temperature in (8) Reactor No. 1 is 70° F. to 150° F. and more preferably 80° F. to 100° F.

The temperature in (11) Reactor No. 2 is 70° F. to 150° F. and more preferably 80° F. to 100° F.

In embodiments of the present process that employ a mixer in (8) Reactor No. 1 and/or (11) Reactor No. 2, the mixer may be an impeller mixer, paddle mixer, ultrasonic mixer or other type of mixer, or combination of mixers, that provide good agitation of reactants.

Mixing may be continuous such as for impeller type mixers. For ultrasonic mixer, mixing is usually periodic, being for example, 2-20 seconds per minute of retention time in a reactor and preferably 8-12 seconds per minute of retention time in a reactor.

Filtration may be by various means including gravity, pressure or vacuum filtration, employing filtration media such as glass fiber and porcelain sieve. Alternative means of separating solids from liquids such as centrifugation may be employed.

In embodiments of the present process that employ an absorber tower to recycle the product calcium carbonate cake wash water, the types of towers include packed bed, and spray tower absorbers. The calcium carbonate cake wash water will pass through the absorber along with ammonia and carbon dioxide from the power plant stack gases to produce ammonium carbonate. The ammonium carbonate will be recycled back into the process for use as a process reactant.

Figure 7:
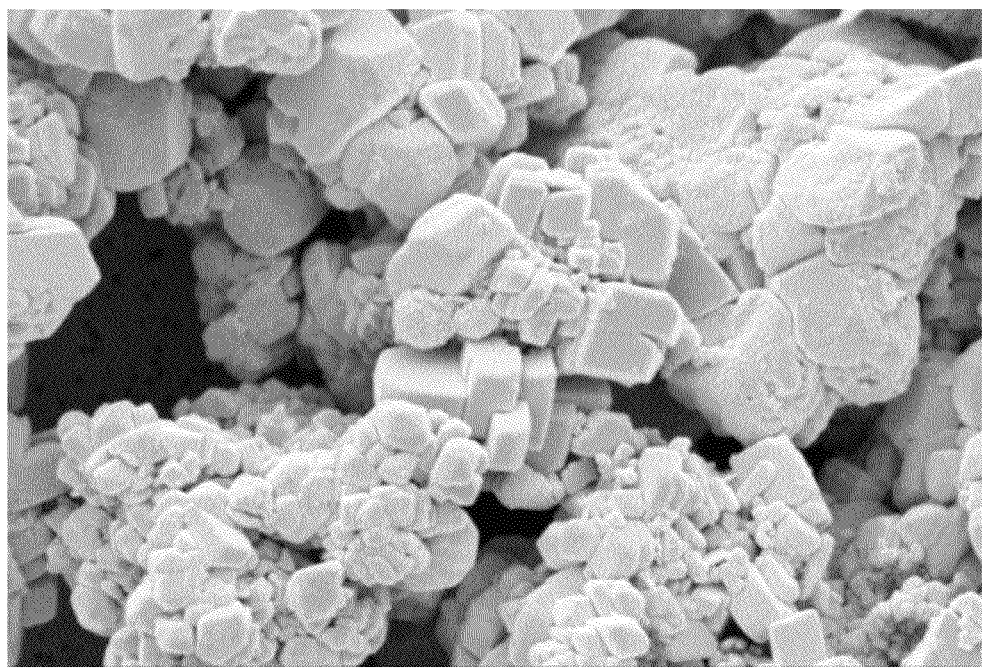
FIG. 7 shows product calcium carbonate crystals and agglomerated crystals at Mag=20.00 KX, WD=10 mm, Detector=SE1 and EHT=5.00 kV.

The calcium carbonate product of the present invention is composed of fine particles having a substantially cubic shape and of a size ranging from 0.5 to 4.0 microns with the majority being approximately 1.0 micron in size. These small sized particles of calcium carbonate agglomerate into larger clusters, presumably held together by van der Waals force. The cubic shape of the crystals and agglomerated clusters are shown in FIG. 7. The reaction of FGD gypsum and ammonium carbonate in the present process produces an aqueous mixture of product ammonium sulfate and calcium carbonate. The agglomerates of product calcium carbonate enable fast and efficient filtration of the calcium carbonate thus providing excellent removal from the ammonium sulfate solution product of the present process. The remaining filter cake of calcium carbonate can be easily broken and suspended in water or other liquid to enable use of the small sized unagglomerated particles.

Under best operating conditions, ammonium carbonate is directly added to Reactor No. 2 (11), with reference to FIG. 1, without being used as wash of the Calcium carbonate in Filter No. 2 (15). In converting particularly unreactive FGD gypsum, some ammonium carbonate is introduced into Reactor No. 1 (8) and is introduced into Reactor No. 2 (11) in excess of 5-500%, preferably 10-100% and most preferably 10-50%.

Process control of the above described continuous multistage countercurrent process as shown in FIG. 1 is amplified by the following description.

The process for conversion of FGD gypsum to ammonium sulfate and calcium carbonate by the reaction with ammonium carbonate is by a unique combination of countercurrent flows with internal recycle of liquids to maximize the purity of reaction products while minimizing the reaction time. The filters remove solids and thus enable the solids to pass through the process without recycle while liquid flows are controlled as countercurrent flows but with internal recycle within the system of a reactor, the filter for its discharge, and the pump which handles the prime filtrate of the filter. Circulation of liquids in embodiments of the present process may be induced by gravity, or one or more pumps, or by a combination of gravity and pump(s), or even by other means for inducing circulation of liquids. By this configuration, the concentration of the liquid reactants can be controlled within a reactor and the solids concentration within a reactor can be controlled. By controlling the concentration of liquid reactants the reactors can be run with major excesses of a particular reactant within a reactor thereby greatly influencing both the reaction time and reaction completeness with regard to the low concentration of another reactant. This means of operation also allows the solids concentration within a reactor to be controlled, which is also important in obtaining complete reaction of the solids in a minimum time.

With reference to FIG. 1, FGD Gypsum after being cleaned of impurities can be continuously charged to Reactor No. 1 (8) along with liquid consisting of ammonium sulfate and ammonium carbonate coming from the primary filtrate of Reactor No. 2 (11) and along with filtrate from the filter of Reactor No. 1 (8) consisting mainly of ammonium sulfate with a low concentration of ammonium carbonate. The filter cake resulting from Filter No. 1 (9) which filters discharge from Reactor No. 1 (8) is continuously fed to Reactor No. 2 (11) including the primarily ammonium sulfate solution which contains a low concentration of ammonium carbonate. As the slurry from Reactor No. 2 (11) is filtered and the cake is washed with incoming ammonium carbonate the first filtrate of primarily ammonium carbonate solution, containing some ammonium sulfate, is either recycled to Reactor No. 2 (11) or fed forward to Reactor No. 1 (8) while the ammonium carbonate being fed in, washes the filter cake from the discharge of Reactor No. 2 (11). This reacts with any remaining gypsum, thus providing a gypsum free calcium carbonate, and then is fed to Reactor No. 2 (11).

By controlling the rate of ammonium carbonate fed to Reactor No. 2 (11), the amount of discharge slurry from Reactor No. 2 (11) and the amount of filtrate recycled to Reactor No. 2 (11), then the amount of excess ammonium carbonate needed for reaction with incoming gypsum can be controlled so that the stoichiometric amount of ammonium carbonate for reaction with incoming gypsum can be in excess of 5 to 500% (preferably 10-100% and most preferably 10-50%) of that needed in Reactor No. 2 (11), and the solids in the discharge slurry can be controlled by similar stoichiometric regulation to result in total reaction of the incoming unconverted gypsum with results up to 100% conversion of gypsum to ammonium sulfate and calcium carbonate in the discharge slurry of Reactor No. 2 (11).

At the same time, Reactor No. 1 (8) can be controlled with a large excess of gypsum. This is enabled by taking incoming ammonium carbonate fed by removing only a portion of the Reactor No. 2 (11) filtrate containing ammonium sulfate produced in Reactor No. 2 (11) as well as unreacted ammonium carbonate, and feeding it into Reactor No. 1 (8). Again by controlling the rate of discharge slurry from Reactor No. 1 (8) and controlling the rate of filtrate returned from reactor one's (1) filter to Reactor No. 1 (8), both the solids concentration and ammonium carbonate concentration in the Reactor No. 1 (8) liquor, can be controlled. Thus in the Reactor No. 1 (8), the conversion of ammonium carbonate to ammonium sulfate can be maximized, while the time of conversion is minimized. This is because of the stoichiometric amount of gypsum needed for the reaction can be varied from 5 to 500% and may exceed 500% but is preferably 10 to 100% and most preferably 10 to 50% of that needed by controlling the recycle of the filtrate streams.

The test results of Tests 1-6 in Table 11 are from converting the less reactive gypsum to ammonium sulfate and calcium carbonate, and show that when Reactor No. 1 (8) was operated under conditions where ammonium carbonate was fed to Reactor No. 1 (8) at high rates such as in Test 1 and Test 4, the conversion of gypsum to calcium carbonate in Reactor No. 1 (8) was 53.58% for Test 1 and 53.85% for Test 4. (Note that the yield of product calcium carbonate is stoichiometrically the same as the yield of product ammonium sulfate.) The overall conversion of gypsum to calcium carbonate and ammonium sulfate after passing through both Reactor No. 1 (8) and Reactor No. 2 (11) was 98.97% for Test 1 and 98.96% for Test 4. The calculated conversion of gypsum to calcium carbonate in only Reactor No. 2 (11) was 45.39% for Test 1 and 43.11% for Test 4.

By altering the flow of liquids in Test 3 and Test 6, most of the reaction occurred in Reactor No. 2 (11) such that it resulted in the conversion of gypsum to calcium carbonate in Reactor No. 1 (8) being only 5.21% for Test 3 and 4.91% for Test 6. However, the overall conversion of gypsum to ammonium sulfate and calcium carbonate was 97.47% for Test 3 and 99.07% for Test 6. The calculated conversion of gypsum to calcium carbonate in only Reactor No. 2 (11) was 92.26% for Test 3 and 94.16% for Test 6.

The best results were obtained in Test 2 and Test 5 wherein liquids were maintained such that the conversion in Reactor No. 1 (8) to calcium carbonate was 29.92% for Test 2 and 31.91% for Test 5. The overall conversion of gypsum to calcium carbonate was 99.43% for Test 2 and 99.53% for Test 5. The calculated conversion of gypsum to calcium carbonate in only Reactor No. 2 (11) was 69.51% for Test 2 and 67.62% for Test 5.

Thus, the continuous multistage countercurrent process of the present invention can be operationally controlled by employing up to large differences in stoichiometric chemistry by using reactants in stoichiometric excess in Reactor No. 1 (8) or Reactor No. 2 (11). This enables internal recycle of liquids for process control and solids recycle is not a factor due to their removal by the presence of Filter No. 1 (9) and Filter No. 2 (15).

If four reactors are used (e.g., reactors A B C D) pursuant to another embodiment of the present invention, then concentrations of the reactants and the density of the slurry could be adjusted to eliminate the need for final polishing filters by moving the reaction to the two middle reactors (e.g., reactors B and C) primarily and using the beginning reactor (e.g., reactor A) and end reactor (e.g., reactor D) only as polishing reactors to obtain 99.9% to 100% conversion of the gypsum to ammonium sulfate and calcium carbonate. Where polishing at one end of the series of reactors is not required, then three reactors are employed according to another embodiment of the present invention.

A series of laboratory tests were performed as described in Example 3 to test the countercurrent flow process designed to use two reactors with fresh ammonium carbonate being introduced in the second reactor and raw, unreacted FGD gypsum introduced in the first reactor. The test was performed using an ultrasonic mixer intermittently in the first reactor with a stir bar in the second reactor, and using stir bars in both reactors.

Retention times of 5 and 10 minutes in both reactors were employed and 10% excess ammonium carbonate beyond stoichiometric requirements was used. In all tests, regardless of agitation type and retention times, 97 to approximately 100% conversion of gypsum to calcium carbonate was achieved and higher conversion yields were also obtained of 98% to approximately 100%, as well as an achieved yield of approximately 100% conversion. This shows that the countercurrent process works efficiently and is very flexible in converting gypsum to calcium carbonate. With the lower retention times and lesser amounts of excess ammonium carbonate, the reactors can be smaller and reagent use will decrease.

Second Gypsum Conversion Countercurrent Process

Figure 2:
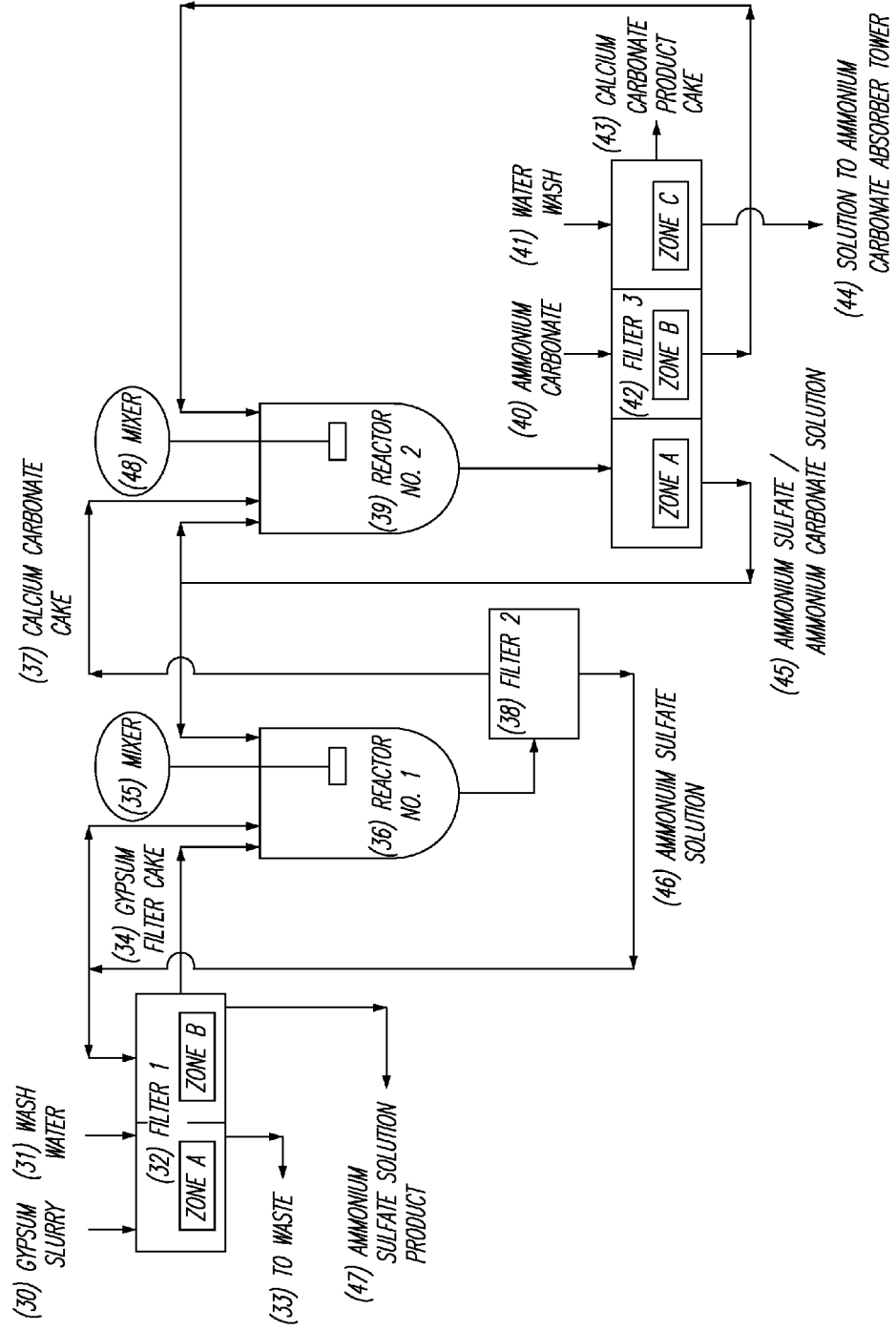
FIG. 2 shows a schematic of the second gypsum conversion countercurrent flow process of the invention.

The process flow diagram shown in FIG. 2 shows another embodiment of the present inventive process for converting FGD gypsum to ammonium sulfate and calcium carbonate by reacting ammonium carbonate with the FGD gypsum. This embodiment is a second continuous multistage countercurrent process.

Referring to FIG. 2, Gypsum Slurry (30) from a flue gas scrubber, having composition ranging from 15 to 25% gypsum, is continuously metered to a continuous belt Filter 1 (32). The Filter 1 (32) has multiple zones, Zone A and Zone B, to enable multiple rinse steps. Zone A of Filter 1 (32) is used to remove water from the slurry and rinse with Wash Water (31). Filtrate from Zone A goes to Waste (33) or to a waste treatment process. The Gypsum Filter Cake (34) formed, is rinsed in Zone B of Filter 1 (32) with the Ammonium Sulfate Solution (46) recycled from Filter 2 (38). The Ammonium Sulfate Solution (46) may contain a small fraction of un-reacted ammonium carbonate. This step will allow any un-reacted ammonium carbonate to react with gypsum.

Gypsum Filter Cake (34) is continuously fed to Reactor No. 1 (36), which is agitated by a Mixer (35). The temperature in Reactor No. 1 (36) is maintained between 70° F. and 150° F., and preferably 80° F. to 100° F. Ammonium Sulfate Solution (46) from Filter No. 2 (38), which is primarily ammonium sulfate solution and un-reacted ammonium carbonate solution, is also fed to Reactor No. 1 (36). Effluent from Reactor No. 1 (36) is continuously fed to Filter No. 2 (38) which may be selected from various filters including a belt filter. Ammonium sulfate solution from Filter No. 2 (38) is continuously recycled to Reactor No. 1 (36). Calcium Carbonate Cake (37) continuously discharges to Reactor 2 (39). The Calcium Carbonate Cake (37) contains some un-reacted gypsum at this point. Ammonium Sulfate/Ammonium Carbonate solution (45) from Filter No. 3 (42) is continuously recirculated to Reactor No. 2 (39) which is agitated by a Mixer (48). Ammonium Carbonate (40) solution ranging from 25% to 35% and preferably about 33% ammonium carbonate, at a temperature ranging from 75° F. to 120° F., preferably 110° F. to 120° F. and most preferably about 115° F., is introduced to the process by first passing through the filter cake of calcium carbonate at Zone B of Filter No. 3 (42). Filter No. 3 (42) is a continuous belt filter having multiple zones, Zone A, Zone B and Zone C, to enable multiple rinse steps. This step is to convert any un-reacted gypsum to calcium carbonate. Effluent from Reactor 2 (39) is continuously filtered by Filter No. 3 (42) to form Calcium Carbonate Product Cake (43). Filtrate from Zone A of Filter No. 3 (42) is continuously recycled to Reactor No. 2 (39). Zone B of Filter No. 3 (42) is a finishing step with ammonium carbonate reacting with remaining unreacted gypsum and the filtrate is recycled back to Reactor No. 2 (39). Zone C of Filter No. 3 (42) is a final Water Wash (41) step. Filtrate from Zone C of Filter No. 3 (42) is solution sent to the Ammonium Carbonate Absorber Tower (44) for absorption of ammonium carbonate.

Ammonium carbonate is produced from carbon dioxide from the flue discharge stack by reacting ammonia with the carbon dioxide.

Mercury is often present in coal combustion gases and may contaminate the FGD gypsum. For example FGD gypsum may contain 1 to 2 ppm mercury. For such a FGD gypsum, the ammonium sulfate product of the present process has less than 0.01 ppm in the ammonium sulfate solutions, which is consistent with commercially available typical granular ammonium sulfate which was also tested.

Figure 3:
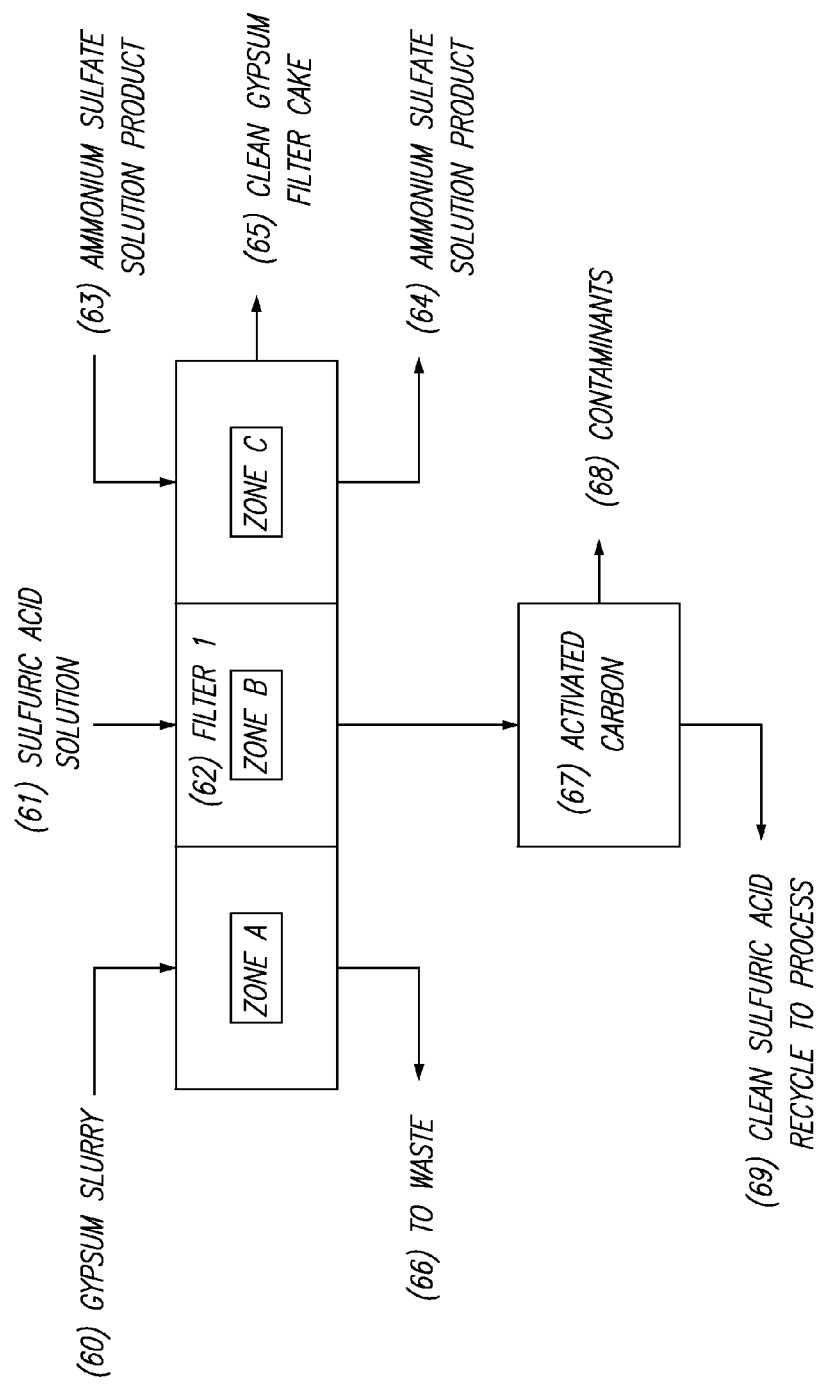
FIG. 3 shows the contaminant removal acid rinse process of the invention.

Processes were developed to remove selenium and other possible metal contaminants from FGD gypsum. The processes ensure that the process of the present invention produces ammonium sulfate and calcium carbonate products having high purity with few contaminants. The processes were an acid rinse contaminant removal process and a slurry tank reactor contaminant removal process. The acid rinse process as shown in FIG. 3 reduced tested contaminants as follows:

Acid Rinse Contaminant Removal Process

Se—71 to 73% reduction, and approximately 100% reduction can be achieved.

Mg—46 to 91% reduction

Al—18 to 36% reduction

Based upon the results from the acid rinse contaminant removal process the process operates as follows:

Mix water with FGD gypsum if necessary to ensure a solids content of 15 to 25% and preferably of 20% solids. At ambient temperature (20-25° C.), introduce the FGD gypsum slurry to a gravity or vacuum filter and filter the gypsum slurry to result in a filter cake. Rinse the filter cake with an aqueous solution containing sulfuric acid from 0.01 to 10% concentration and preferably 0.1 to 5% concentration, discarding the filtrate or saving it for purification. Rinse the resulting filter cake with water, to remove any residual sulfuric acid solution and discard the rinse water or save it for purification. The dilute sulfuric acid filtrate can be recycled and cleaned using activated carbon to remove the contaminants.

With reference to FIGS. 1, 2 and 3, the acid rinse purification process, if required, is integrated with the countercurrent process to be one process wherein the gypsum filter cake that is formed on FIG. 1, Filter A (5) or FIG. 2, Filter 1 (32) Zone A, after the initial water wash, is rinsed with dilute sulfuric acid. This requires a filter that is capable of two separate washes and the capability to keep the two filtrate streams separate.

The clean, purified gypsum filter cake would contain some residual sulfuric acid, however, this would not cause any problems downstream because the sulfuric acid will react with ammonium carbonate to form product ammonium sulfate.

Figure 4:
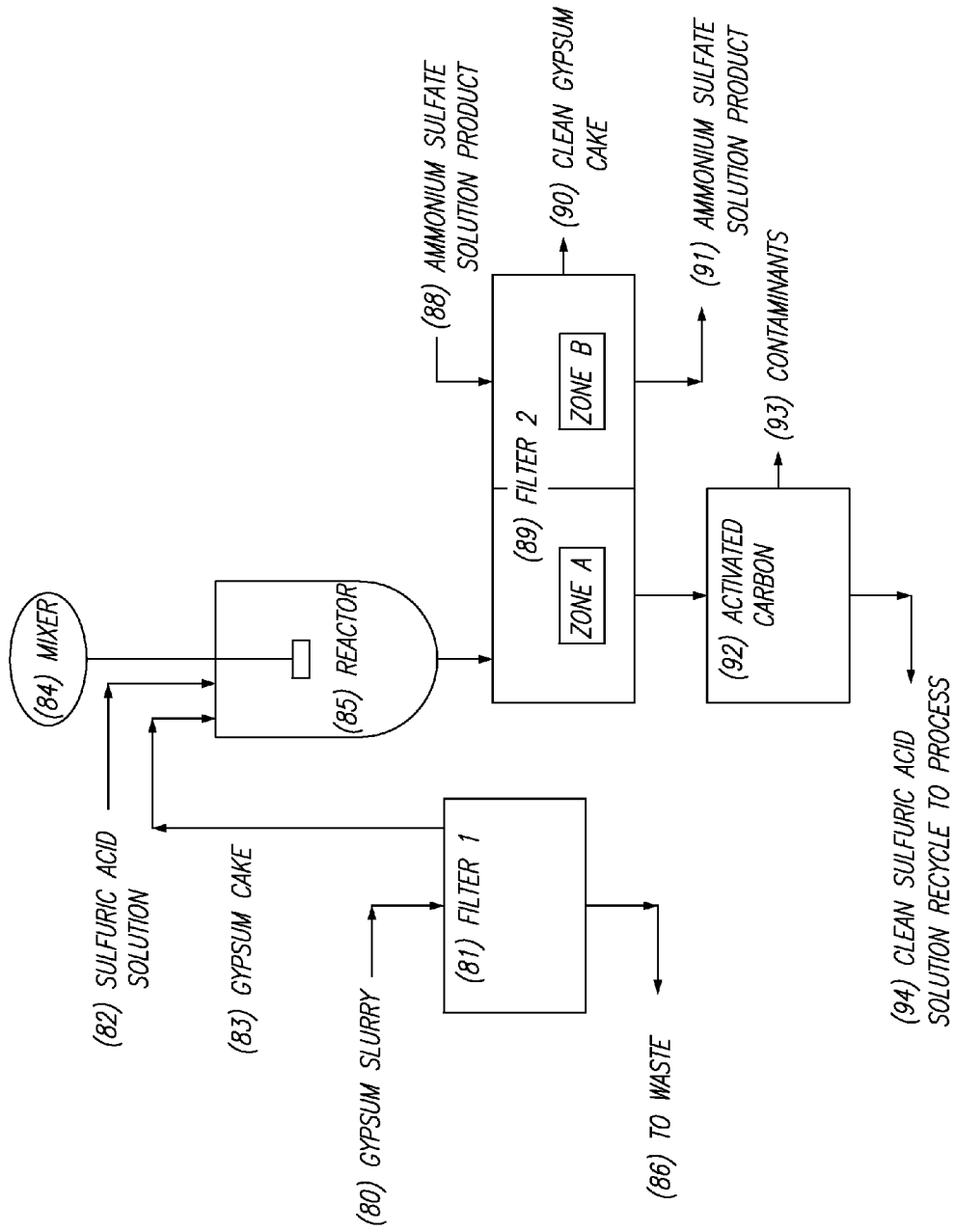
FIG. 4 shows the contaminant removal slurry tank reactor process of the invention.
Figure 5:
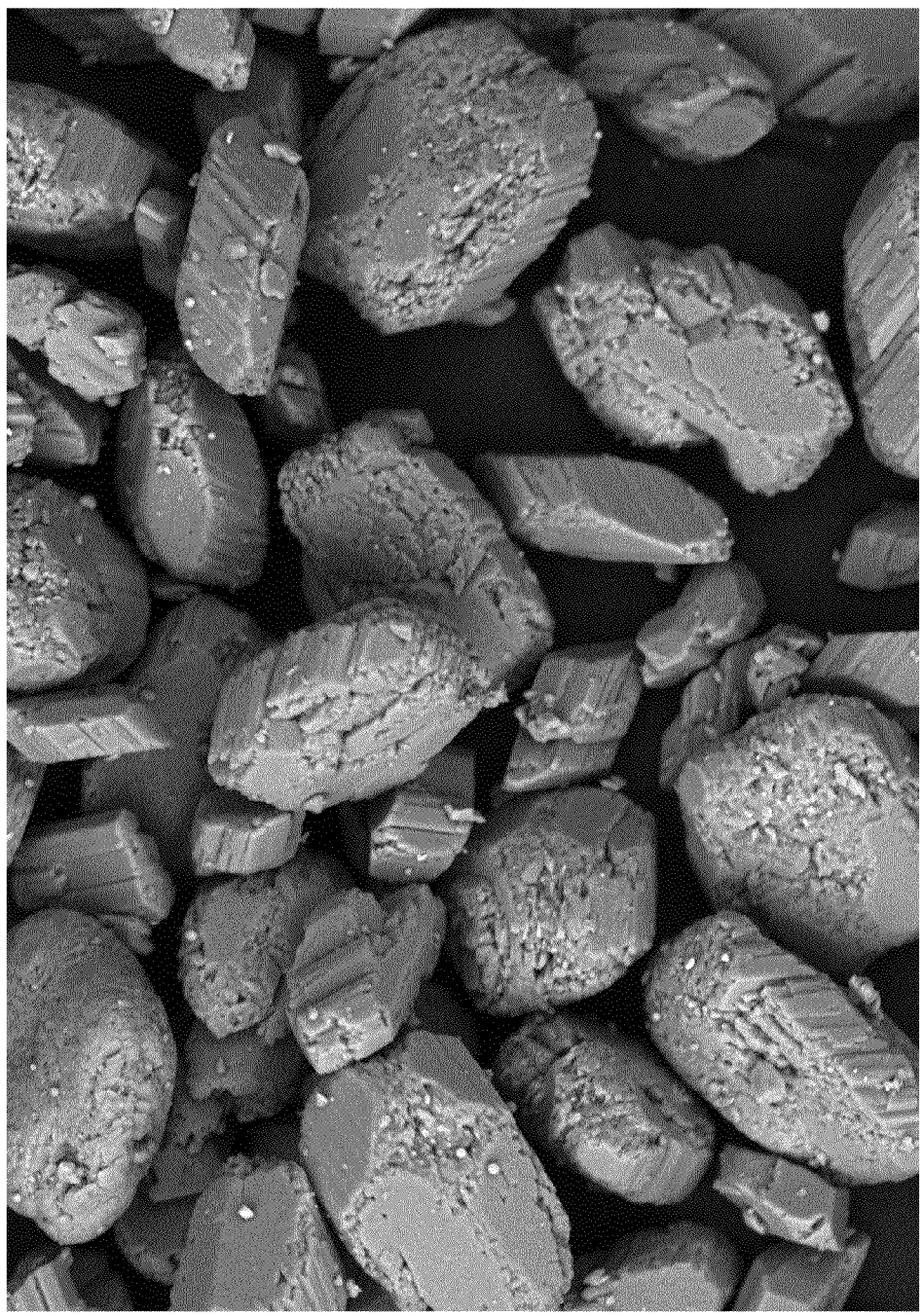
FIG. 5 shows less reactive FGD Gypsum A crystals, SEM Image, 500×.
Figure 6:
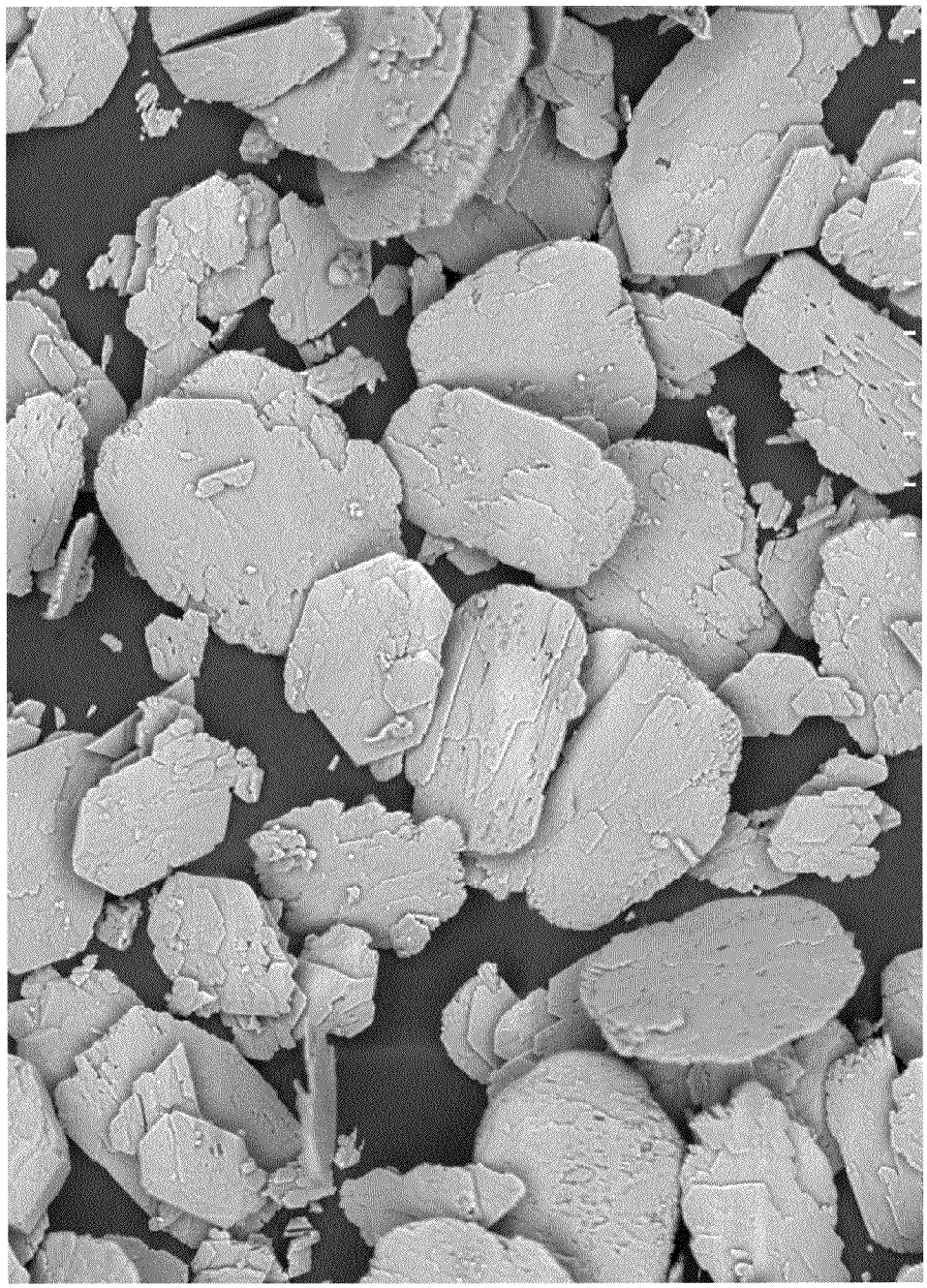
FIG. 6 shows highly reactive FGD Gypsum B crystals, SEM Image, 500×.

The slurry tank reactor process as shown in FIG. 4 reduced tested contaminants as follows:
Slurry Tank Contaminant Removal Process—Large Volume Vessel
Se—65 to 73% reduction, and approximately 100% reduction can be achieved.
Mg—19 to 90% reduction
Al—19 to 90% reduction Based upon the results from the slurry tank contaminant removal process the process operates as follows:

Mix water with FGD gypsum if necessary to ensure a solids content of 15 to 25% and preferably of 20% solids. At ambient temperature (20-25° C.), introduce the FGD gypsum slurry to a reactor vessel and introduce aqueous solution of sulfuric acid from 0.01 to 10% concentration and preferably 0.1 to 5% concentration to the vessel and mix by means including a paddle, screw, impeller or agitator mixer for a time of 5 to 20 minutes (preferably 15 minutes) for adequate reaction. Introduce the resulting reacted slurry to a gravity or vacuum filter to produce a filter cake and discard the filtrate. Rinse the resulting filter cake with water to remove any residual sulfuric acid solution.

With reference to FIGS. 1, 2 and 4, the slurry tank purification process would be integrated with the countercurrent process to be one process wherein a belt filter is employed as FIG. 1, Filter A (5) or FIG. 2, Filter 1 (32) to remove water from the gypsum slurry then a water wash is applied to the gypsum filter cake. The gypsum filter cake is then added to an additional reactor where it would be mixed with sulfuric acid solution to react with and remove contaminants. Then an additional filter would be used to separate the clean gypsum from the filtrate. A small water rinse may also be required to remove dilute sulfuric acid, which contains the contaminants. The clean gypsum would then enter reactor No. 1. The dilute sulfuric acid filtrate can be recycled and cleaned using activated carbon to remove the contaminants.

The clean, purified gypsum filter cake would contain some residual sulfuric acid, however, this would not cause any problems downstream because the sulfuric acid will react with ammonium carbonate to form ammonium sulfate.

The use of activated carbon was tested as a process for removing selenium from the sulfuric acid filtrate resulting from both the acid rinse and slurry tank contaminant removal processes. Both single pass and double pass tests were performed with selenium reduced in a single pass to less than 4 ppm and magnesium was also significantly reduced. The amount of selenium could have been even less because 4 ppm is the lower limit of quantitative detection.

EXAMPLES

Example 1

Pilot Plant Testing

The continuous single stage process of the present invention, employing a single reactor, was demonstrated in pilot plant testing during February, 2012 and during September, 2011.

During the latter part of February, 2012, twelve barrels of FGD gypsum material were received from the William Crawford Gorgas Electric Generating Plant, Parrish, Ala. Eleven of the barrels contained gypsum collected from this plant (herein after referenced as "FGD gypsum A") as water slurry and one barrel contained relatively dry gypsum collected from the settling pond. The contents of the slurry barrels had separated out with gypsum cake on the bottom and liquid on top. Samples were taken from each barrel and each sample examined under microscope to look for any differences in the gypsum crystal structure. Observations are recorded in the following Table 1.

From the James H. Miller, Jr. Electric Generating Plant, West Jefferson, Ala., a sample of FGD gypsum (herein after referenced as "FGD gypsum B") had been previously obtained and microscopically observed. Differences in structure were observed between the FGD gypsum A crystals and the FGD gypsum B crystals. The gypsum B crystals were observed to be very flat and disc like. The gypsum A crystals were thicker and more spherical. Scanning electron microscope observation of samples from each power plant confirmed this difference in form. See FIG. 2 showing FGD gypsum A crystals and see FIG. 3 showing FGD gypsum B crystals. Pursuant to the following Table 1, the gypsum B crystals are described as being plate crystals 2×30×30 microns up to 10×100×100 microns. From Table 1, the gypsum A crystals are described as prism crystals 30×30×40 microns up to 40×40×80 microns.

The gypsum B plate crystals ranged from 2 to 10 microns thick, whereas the gypsum A crystals were much thicker at 30 to 40 microns thick.

The reaction occurs on the surface of the gypsum and penetrates the crystals surface. Veneers of calcium carbonate were observed that would form on the surface of the FGD gypsum A crystals and then break off. Here, the rate limiting step is due to the crystal thickness. Thus, the thicker gypsum A crystals require deeper penetration of the ammonium carbonate solution employed in the present process. Penetration is not linear because deeper penetration of the solution is increasingly more difficult to achieve unless, as with using an ultrasonic mixer, the reacted part of the granule is vibrated off the remaining particle.

The thicker and more spherical form of the FGD gypsum A led to the conclusion that the gypsum A crystals had less surface area and would be less chemically reactive. Conversely, the thin plate form of the FGD gypsum B led to the conclusion that gypsum B crystals had more surface area and would be more chemically reactive.

Additionally, because the gypsum B crystals are flatter, they also settle slower, thus providing more time for chemical reactions to occur.

TABLE 1

FGD Gypsum Microscopic Crystallography Characteristics
Microscopic Evaluation of Stack Gas Scrubber Solids from
Power Plants Producing FGD Gypsum A and FGD Gypsum B 1. FGD Gypsum A: Sample 2-9-12, 1:25 pm, 1 Hr. Decant
   The bulk fraction of these solids is $CaSO_4 \cdot 2H_2O$ as uniform prisms between
   $30 \times 30 \times 40\mu$ up to $40 \times 40 \times 80\mu$ with an effective upper size of $40 \times 40 \times 70$. About 1-5%
   of the sample is unreacted dolomite $(Ca,Mg,Fe) CO_3$ as 2 to $80\mu$ particles.
   About 1-2% of the sample is micron size particles that may be more dolomite.
   No fly ash was detected.
2. FGD Gypsum A: 1 Hr. Sample, 1:25 pm, 2-9-12 + 1 ½ Hr. Decant
   The bulk fraction is prismatic crystals of $CaSO_4 \cdot 2H_2O$ from $10 \times 10 \times 10\mu$ up to
   $50 \times 50 \times 100\mu$. Undissolved dolomite $(Ca,Mg,Fe) CO_3$ crystals from 10 to $50\mu$
   constitute 2-5% of the sample. A grainy $1\mu$ size phase constitutes about 0.1%.
3. FGD Gypsum A: 4 Hr. 1:20 pm, 2-9-12, 1 Hr 10 Min. Decant
   The bulk fraction is $CaSO_4 \cdot 2H_2O$ prismatic crystals from $20\mu$ up to $40 \times 40 \times 80\mu$ in
   size. Residual Dolomite crystals range up to $40 \times 40 \times 80\mu$ and constitute about 5-7%
   of the sample. The 1-$2\mu$ particles are less than 1% of the sample and
   possibly are more dolomite.
4. FGD Gypsum A: 1 Hr. Sample, 1:25 pm, 2-9-12 & 2 Hr. Decant
   Crystals of $CaSO_4 \cdot 2H_2O$ constitute the bulk fraction of this sample as crystals
   from 20 to $40 \times 40 \times 80\mu$ with one or two reaching $100\mu$ in length. The undissolved
   dolomite and micron sized units are similar to those in the previous samples.
5. FGD Gypsum B: Sample Gypsum, 9-21-2011, Bottom of Barrel
   The bulk fraction of this sample is thin plate crystals of $CaSO_4 \cdot 2H_2O$ as units
   from $2 \times 30 \times 30\mu$ up to $10 \times 100 \times 100\mu$ (No prisms of gypsum are present).
   Undissolved dolomite $(Ca,Mg,Fe) CO_3$ constitute 1-5% of the sample up to
   $60 \times 60 \times 60\mu$ in size.
6. FGD Gypsum A: 9-20-11, 14:30, Slurry Filter Cake
   The bulk of this sample is 1-$2\mu$ size crystals of $CaCO_3$ most of which are present
   as soft agglomerates up to $150 \times 150 \times 250\mu$ in size. Residual dolomite is still
   carried over and constitutes about 5% of the sample The separated liquid was decanted from all of the slurry barrels and the settled FGD gypsum cakes from the bottom of the barrels were combined. These cakes along with the dry pond FGD gypsum were put in flat pans and allowed to dry in open air with fans blowing across them over two days before pilot operations were commenced. Samples were taken of the combined cakes and the settling pond gypsum in order to determine the moisture content. The moisture balance method was used to calculate 20.71% moisture for the barrel cakes and 22.66% moisture for the settling pond gypsum. It was determined that the pilot plant operations would be conducted using the combined gypsum cakes.

Apparatus Description
Premixing Apparatus
Ammonium Carbonate Premix Tank and Pump A 33% ammonium carbonate solution was pre-mixed in a 36 gallon capacity 304-stainless steel steam jacketed tank. The tank was 17.5 inches in diameter and 34.5 inches in height. The tank was heated using low pressure steam controlled by a conventional steam regulator, valves, traps, and piping to aid in producing the ammonium carbonate solution. The tank was equipped with a single speed Chemineer 0.5 HP Motor® and 1 inch stainless steel agitator shaft that was 32 inches in length. Two (2)-three blade stainless steel 4 inch diameter impellers were placed 19 inches apart on the mixer shaft to achieve good mixing. The lower impeller was positioned approximately 2.5 inches off of the bottom on the tank. The ammonium carbonate solution was metered to the process at a pre-determined rate using a Master flex variable speed peristaltic pump® and tubing.

FGD Gypsum/Ammonium Sulfate Premix Tank and Pump

A 35% FGD gypsum/33% ammonium sulfate slurry was made by being pre-mixed in a 5 gallon capacity 304 stainless steel pump tank. The pump tank was 9 inches in diameter and 17 inches in height. The tank was equipped with a variable speed Tonson V2 0.93 HP Air Motorized Agitator® equipped with a ½ inch stainless steel agitator shaft that was 16 inches in length. Two (2)-three blade stainless steel 6 inch diameter impellers were placed 9 inches apart on the mixer shaft to achieve good mixing. The lower impeller was positioned approximately 1 inch off of the bottom on the tank. The gypsum/ammonium sulfate slurry was metered to the process at a pre-determined rate using a Master flex variable speed peristaltic pump and tubing.

Ammonium Carbonate/Gypsum/Ammonium Sulfate Mix Tank and Pump

The ammonium carbonate solution and FGD gypsum/ammonium sulfate slurry were metered simultaneously to a 0.32 gallon bottom discharge stainless steel premix tank. The premix tank was 4 inches in diameter and 6 inches in height. Later, to add more retention time, the tank was replaced with a tank 7¼ inches tall and 8¾ inches in height. The tank was equipped with a variable speed IKA Agitator® containing a ⅜ inch stainless steel agitator shaft that was 8 inches in length. One (1)-four blade stainless steel 3 inch diameter impeller was located approximately ½ inch off the bottom of the tank to achieve good mixing. Another six blade stainless steel 3 inch diameter impeller was located about 2 inches off of the tank bottom to aid in mixing. The premix tank was piped directly to the suction of the slurry feed pump. The slurry feed pump used during the testing was a Seepex Progressive Cavity Pump Model MD003-Z4®. The progressive cavity pump casing, rotor, and stator were constructed of 316 stainless steel. The pump was equipped with a 0.5 HP Nord Geared Motor® and variable frequency dive in a NEMA 4 Enclosure®.

Gypsum Converter and Pumps

The reaction of ammonium carbonate solution with FGD gypsum to produce ammonium sulfate and calcium carbonate was carried out in the gypsum converter. The gypsum converter was 6.25 inches in diameter and 92 inches tall. The converter was fabricated from acrylic to allow visual observation of the contents during operation. A 2 inch diameter reaction tube 24 inches in length was inserted in the center of the gypsum converter for the purpose of charging the reactants to a pre-determined location inside the acrylic tube. The converter was equipped with a slow moving, 30-degree pitched blade, paddle type agitator and a rake to prevent accumulation of solids in the bottom of the vessel. The agitator shaft was constructed using a ¾ inch schedule 40 stainless steel pipe. The agitator was driven by a 0.5 HP Baldor Motor® equipped with a variable frequency drive. The paddle type agitator was positioned approximately 1 inch off of the bottom on the tank. Recycle liquor is drawn off near the liquid level in the gypsum converter using a Master Flex Variable Speed Peristaltic Pump® and tubing and circulated through a stainless steel ITT Standard Fixed Bundle Tube Heat Exchanger® and returned to the vessel through holes drilled in the agitator shaft. Approximately 14.5 inches from the bottom of the gypsum reactor were two (2)-½ inch holes located in the agitator shaft. Heat was supplied to the vessel using a single U-tube heat exchanger positioned inside the converter. The U-tube heat exchanger was constructed of ½ inch stainless steel tubing and 45 inches in length. Heat was supplied to the U-shaped heating tube and heat exchanger using a Budzar Model 1WT-9-75-25CS460 MTC hot water system with an operating range of 40-250° F. Product slurry was removed from the gypsum converter using a Seepex Progressive Cavity Pump Model MD003-Z4®. The progressive cavity pump casing, rotor, and stator were constructed of 316 stainless steel. The pump was equipped with a 0.5 HP Nord Geared Motor® and variable frequency dive in a NEMA 4 Enclosure®.

Process Description

On Mar. 5, 2012, 85.5 pounds of a 36% ammonium sulfate solution and 4.5 pounds of a 33% ammonium carbonate solution were made, mixed together, and added to the converter as starter material for the pilot plant run. The solution was very murky when first added to the converter so the converter agitator was allowed to run overnight at 3 rpm. Also, a 215 pound batch of 33% ammonium carbonate solution was pre-mixed in a 36 gallon stainless steel steam jacketed tank. The tank was heated using low pressure steam controlled by a conventional steam regulator, valves, traps, and piping to aid in producing the ammonium carbonate solution. The 33% ammonium carbonate solution was heated to approximately 160-170° F. to aid in dissolving the ammonium carbonate crystals. Some boiling and heavy bubbling occurred and ammonia was given off. The tank was agitated to achieve a homogenous solution. Once a clear solution was obtained the steam was turned off and the 33% ammonium carbonate solution was allowed to cool to room temperature (approximately 65-70° F.) and the agitator was turned off.

After sitting overnight in the converter, the ammonium sulfate/ammonium carbonate slurry became much clearer. The solution was circulated through the hot water heat exchanger to bring the solution temperature up to 120° F. Overnight, the ammonium carbonate solution premixed in the carbonate tank had settled out due to cold temperatures (low of 25° F.). The tank was reheated with steam and the agitator was also used to bring the ammonium carbonate back into solution. The mixture was allowed to warm to about 131° F., and when the solution became clear then the steam was turned off. There was more boiling and bubbling of the solution and a strong odor of ammonia was detected then and throughout the entire pilot run. The agitator continued to run.

Forty pound batches of 35% gypsum/33% ammonium sulfate slurry were hand mixed in a 5-gallon bucket and then charged to the 5-gallon stainless steel pump tank equipped with a motorized agitator. The gypsum contained numerous lumps that had to be broken up. The agitator speed was approximately 1750 rpm. The homogenous gypsum/ammonium sulfate slurry was metered to the ammonium carbonate/gypsum/ammonium sulfate pump tank at a pre-determined rate of 41.4 lbs/hr using a Master flex variable speed peristaltic pump® and tubing. The ammonium carbonate solution was metered to the ammonium carbonate/gypsum/ammonium sulfate pump tank at a pre-determined rate of 26.9 lbs/hr using a Master flex variable speed peristaltic pump® and tubing.

Just before 10 AM on Mar. 6, 2012, the gypsum/ammonium sulfate/ammonium carbonate slurry was pumped to the converter from the pump tank. The goal of the run was to operate under the same conditions as the previous run in September 2011 with the FGD gypsum B to determine if the FGD gypsum A would react the same. Below are descriptions of pilot tests employing the continuous single stage reactor of the present invention using FGD gypsum B and FGD gypsum A.

Pilot Tests Employing a Continuous Single Stage Reactor Using FGD Gypsum B

Using FGD gypsum B (a more reactive FGD gypsum), a continuous process was employed for converting gypsum ($CaSO_4 \cdot 2H_2O$) to calcium carbonate ($CaCO_3$) and ammonium sulfate solution (($NH_4)_2SO_4$) using a small scale, 40 lb/hour continuous pilot plant single-stage converter (reactor). The pilot plant was operated during the week of Sep. 19-23, 2011. The single stage converter was successful at converting the FGD gypsum into calcium carbonate of high chemical purity with a conversion rate of approximately 90% after 5 hours of operation. Hence, the conversion into ammonium sulfate would have a stoichiometrically similar yield.

In general, the pilot plant system comprised a gypsum/ammonium sulfate/ammonium carbonate slurry mix tank and an ammonium carbonate solution mix tank, both of which feed into a single converter/reactor, a recycle of gypsum/ammonium sulfate/ammonium carbonate slurry from the convertor back to the gypsum/ammonium sulfate/ammonium carbonate mix tank and a discharge from the converter of product ammonium sulfate/calcium carbonate slurry.

To charge the gypsum to the pilot plant as slurry, a 40 pound batch of 35% gypsum/33% ammonium sulfate slurry was pre-mixed in a pump tank equipped with an agitator. The homogenous gypsum/ammonium sulfate slurry was metered to the ammonium carbonate/gypsum/ammonium sulfate mix tank.

Prior to the operation of the gypsum converter a batch of 33% ammonium carbonate solution was pre-mixed in a steam jacketed tank.

Gypsum/ammonium sulfate slurry and ammonium carbonate solution were fed directly into the agitated premix tank. The slurry of FGD gypsum/ammonium sulfate/ammonium carbonate was metered to the converter.

During the pilot plant tests the ammonium carbonate feed rate frequently exceeded 105% of the stoichiometric requirements.

The converter was operated similarly to a clarifier to maintain a clear liquid layer in the upper zone of the vessel. During some runs there was foaming and bubbling with a lesser retention time, resulting in a thick, heavy layer of foam in the upper zone of the vessel and requiring the addition of a surfactant.

The larger, heavier calcium carbonate crystals settled to the bottom of the converter where they were continuously removed as thickened slurry. The thick slurry contained calcium carbonate, ammonium sulfate, and residual ammonium carbonate and was removed from the converter at a rate of 65 lbs/hr.

Samples of the slurry being removed from the converter were collected for testing throughout the duration of the pilot run.

A slurry filter cake analysis summary is presented in Table 2. The slurry filtrate and filter cake rinse solution analysis summary is shown in Table 3.

TABLE 2

| Date | Time | Sample | Hours of Operation | % Ca | % S | pH | % N |
|---|---|---|---|---|---|---|---|
| Sep. 20, 2011 | 13:00 | Slurry Filter Cake | 4 | 37.62 | 7.248 | 7.58 | 0.228 |
| Sep. 20, 2011 | 14:00 | Slurry Filter Cake | 5 | 38.77 | 5.660 | 7.61 | 0.259 |
| Sep. 20, 2011 | 14:30 | Slurry Filter Cake | 5½ | 40.39 | 4.537 | 7.63 | 0.250 |
| Sep. 20, 2011 | 14:45 | Slurry Filter Cake | 5¾ | 39.99 | 4.402 | 7.67 | 0.192 |

Note:
1. All slurry samples were filtered using 10 micron polypropylene filter cloth
2. All slurry filter cakes were dried in lab ovens overnight before being analyzed
3. All slurry filter cakes were analyzed for total calcium and sulfur using the ICP
4. All slurry filter cakes were analyzed for total nitrogen using combustion analysis

TABLE 3

| Date | Time | Sample | Hours of Operation | ppm Ca | ppm S | pH |
|---|---|---|---|---|---|---|
| Sep. 20, 2011 | 13:00 | Slurry filtrate solution | 4 | 1727 | 79710 | 7.98 |
| Sep. 20, 2011 | 13:00 | Slurry filter cake rinse solution | 4 | 889.4 | 16570 | 7.78 |
| Sep. 20, 2011 | 14:00 | Slurry filtrate solution | 5 | 1594 | 72860 | 7.9 |
| Sep. 20, 2011 | 14:00 | Slurry filter cake rinse solution | 5 | 858.1 | 14200 | 7.66 |
| Sep. 20, 2011 | 14:30 | Slurry filtrate solution | 5½ | 1636 | 73990 | 7.87 |
| Sep. 20, 2011 | 14:30 | Slurry filter cake rinse solution | 5½ | 853.7 | 11550 | 7.58 |

Note:
1. All slurry filtrate solutions collected after the slurry filtrations were analyzed using the ICP
2. All filter cakes were rinsed with distilled water after filtration and solution analyzed using ICP Pilot Tests Employing a Continuous Single Stage Reactor Using FGD Gypsum A Using FGD gypsum A (a less reactive FGD gypsum), the temperature of the gypsum/ammonium sulfate/ammonium carbonate slurry was approximately 75-85° F. due to the reaction being exothermic. Approximately 65 lbs/hr of slurry was metered to the 2 inch diameter reaction tube located in the center of the gypsum convertor for the purpose of charging the reactant slurry to a pre-determined location below the liquid level in the vessel. The converter was operated similarly to a clarifier to maintain a clear liquid layer in the upper zone of the vessel. Process data was recorded throughout the run and key data points are shown in the following Table 4.

TABLE 4

Test Date: Mar. 6, 2012

| Operating Conditions | 10:00 | 11:00 | 12:00 | 13:00 | 15:00 | 16:30 |
|---|---|---|---|---|---|---|
| Gypsum Mix Tank | | | | | | |
| Gypsum/Ammonium Sulfate Slurry | 44.3 | 40.4 | — | 42.3 | — | — |
| 33% Ammonium Carbonate solution | 28.0 | 29.7 | — | 26.4 | — | — |
| Slurry Temperature (° F.) | 85 | 86 | 85 | 82 | 79 | 72 |
| Gypsum Converter Feed Pump | | | | | | |
| Feed Rate To Gypsum Converter | 77.3 | 67.6 | 73.5 | 71.2 | 69.0 | 69.9 |
| Gypsum Converter Recycle Pump | | | | | | |
| Recycle Rate To Gypsum Converter | — | — | 133.2 | 89.6 | 13.7 | 67.5 |
| Recycle Liquid Temperature (° F.) | 160 | 130 | 130 | 150 | 150 | 90 |
| Gypsum Converter | | | | | | |
| Slurry Temperature (° F.) | 116 | 116 | 116 | 118 | 117 | 92 |
| Agitator Speed (rpm) | 3 | 3 | 3 | 3 | 3 | 3 |
| Gypsum Converter Discharge Pump | | | | | | |
| Feed Rate Out Of Gypsum Converter ( | 62.4 | 66.9 | 64.4 | 69.0 | 69.7 | 71.0 |
| Slurry Temperature (° F.) | 62 | 104 | 107 | 108 | 106 | 88 |

Notes:
1. Began pumping slurry to converter at 9:53 am
2. Charged converter with 90 lbs of 36% ammonium sulfate/33% ammonium carbonate solution. The solution was composed of 95% AMSO4 and 5% AmCO3
3. Gassing from converter was first observed at 12:10 hours Immediately, crystals began to form and fall out of solution with good separation being achieved. About a 2 inch heavy layer of crystals accumulated at the bottom of the converter and a clear liquid layer formed at the top. In between, there was a murky region where crystal formation was taking place. By 10:45 AM, the clear layer on top had become murky. At 10:40 AM, the first product slurry sample was collected and the solids were examined after filtration for appearance and for estimating conversion to calcium carbonate. Observation was conducted all day on the product samples and resulting comments and conversion estimates are contained in the following Table 5. At 11:30 AM, observation of a product sample indicated that most of the filtered solids were gypsum crystals and not calcium carbonate (there was a conversion rate of approximately 30%). The results showed that the FGD gypsum A (about 30% conversion) was not reacting as quickly as in the FGD gypsum B pilot run (about 90% conversion) under the same conditions

TABLE 5

Mar. 6, 2012
Microscopic Characterization of $CaSO_4 \cdot H_2O \rightarrow CaCO_3$ Pilot Plant Products
These solids comprise $CaCO_3$ as 1-2μ crystals agglomerated as soft particles and eroded crystals of $CaSO_4 \cdot 2H_2O$ ranging up to 80μ.

| | Residual $CaSO_4 \cdot 2H_2O$ | | $CaCO_3$ | |
|---|---|---|---|---|
| Sample | Max. Crystal Size (μ) | Wt. % | Max. Agglomerate Size (μ) | Wt. % |
| Product 10:40 AM | 70 | 40 | 60 | 60 |
| Slurry 11:00 AM | 70 | 90 | 1-2 | 10 |
| Recycle 11:00 AM | 70 | 60 | 60 | 40 |
| Product 11:00 AM | 70 | 70 | 100 | 30 |
| After Higher Recyce/Higher Retention Times | | | | |
| Product 11:45 AM | 60 | 50 | 100 | 50 |
| Recycle 11:45 AM | 60 | 50 | 100 | 50 |
| Slurry 11:45 AM | 60 | 50 | 100 | 50 |
| Product 1:00 PM | 50 | 30 | 60 | 70 |
| Recycle 1:00 PM | 70 | 30 | 60 | 70 |
| Slurry 1:00 PM | 50 | 25 | 60 | 75 |
| Overflow 1:20 PM | 40 | 2-5 | 80 | 95+ |
| Product 2:45 PM | 60 | 40 | 60 | 60 |
| Product 3:00 PM | 50 | 20-25 | 70 | 75 |

TABLE 5-continued

Mar. 6, 2012
Microscopic Characterization of CaSO$_4$•H$_2$O → CaCO$_3$ Pilot Plant Products
These solids comprise CaCO$_3$ as 1-2μ crystals agglomerated as soft particles and eroded crystals of CaSO$_4$•2H$_2$O ranging up to 80μ.

| Sample | Residual CaSO$_4$•2H$_2$O | | CaCO$_3$ | |
|---|---|---|---|---|
| | Max. Crystal Size (μ) | Wt. % | Max. Agglomerate Size (μ) | Wt. % |
| Product 4:00 PM | 60 | 25 | 60 | 75 |
| Product 5:00 PM | 60 | 25 | 150 | 75 |

Scale on inside of Monel beaker: These solids consist of single crystals of CaSO$_4$•2H$_2$O that were trapped on the metallic surface and then converted in place to CaCO$_3$; i.e. CaCO$_3$ pseudomorphs after CaSO$_4$•2H$_2$O. About 1/3 of the pseudomorphs have a core of residual CaSO$_4$•2H$_2$O.
Mar. 6, 2012: 11:00 AM recycle sample was acidified with HCl from pH 7.8 to pH 7.5. This neutralization appears to have dissolved the smaller crystals of CaSO$_4$•2H$_2$O. The residual gypsum ranges from 20-50μ.
Pond Gypsum: This sample consists of single prismatic crystals of CaSO$_4$•2H$_2$O up to 60 × 100μ. A slurry of this sample had a pH of approximately 7.85.
Settled Gypsum: Consists of single, prismatic crystals of CaSO$_4$•2H$_2$O up to 50 × 50μ range. A slurry of this sample had a pH of approximately 8.62.

In an attempt to increase retention time and convert the FGD gypsum A, the recirculation rate of the converter solution was increased by speeding up the recirculation pump. This would help hold up the solution in the converter longer and give the reaction more time to conclude before the solution was discharged as product. Also, the gypsum/ammonium sulfate/ammonium carbonate pump tank was allowed to fill completely up. This increased the retention time by about three times from around 2 minutes to 6 minutes. Still, no visible signs of reaction were observed in the tank unlike during the FGD gypsum B run when there was foaming and bubbling with the lesser retention time again showing that the FGD gypsum A is less reactive.

The conversion rate did not improve significantly (~50%) and only large crystals were forming. Because of that, at 12:15 PM, the recirculation rate was lowered. It was also observed that a layer of the unreacted gypsum coated the inside of the converter making visibility low through the clear converter tube. A steady stream of gas bubbles began migrating to the top of the column and caused fizzing on top of the solution. It was assumed that the gas was carbon dioxide. There was not a thick, heavy layer of foam as there was during the FGD gypsum B test run, but a thinner bubbling layer like that of a carbonated drink indicative of significant gassing.

At 1:10 PM, the level in the converter dropped dramatically suddenly and foam began to come out of the top of the center agitator tube. Surfactant defoamer was poured into the pump tank and into the top of the center agitator tube. The defoamer helped alleviate the foam some but not entirely. The operation had to be shut down to pump some material out of the converter. Some of the foam overflow was collected in a sample bottle and filtered in the lab. The filtered solids were examined and it was estimated that over 95% of the gypsum had been converted to calcium carbonate. It seemed that that the solution in the converter was giving off gas and holding up the solution being recycled through the agitator shaft and not allowing it to exit the shaft. The rest of the converter top was sealed so when the gas pressure became great enough in the converter, it pushed the solution up and out of the agitator shaft. So, a ½ inch diameter hole was drilled into the outside of the converter tube near the top to allow the gas to escape and prevent the pressure from building up. Also, a larger pump tank was installed to allow for more retention time to hopefully achieve greater conversion of the gypsum.

The process was restarted at 2:10 PM and run continuously until 5 PM. There was less fizzing of the converter solution at the top due to the vent hole and no overflow of foam occurred again. At 3:10 PM, the recirculation rate was increased again to increase the holdup and retention time in the converter. At 3:30 PM, the recirculation temperature was lowered to 90° F. which brought the converter temperature down to 92° F. This was done to observe the effect of lower converter temperature on the conversion rate. Product slurry was continuously pumped out of the converter at a rate of approximately 65 lb/hr into a sealed plastic drum. Periodically, samples were collected in 500 mL polypropylene bottles. These samples were filtered in the lab and the solids were examined.

Examination of the product samples showed that despite all of the changes made during operations to increase conversion, the highest estimated conversion rate to product during the run was approximately 75%. This was much lower than the 90%+ conversion achieved in the pilot run using the FGD gypsum B. A 5-gallon bucket of product slurry was collected for possible further examination and the process was shut down and cleaned out at 5 PM.

The pilot test results showed that conversion of the FGD gypsum A to calcium carbonate and ammonium sulfate was lower than with the FGD gypsum B. This result occurred despite the ammonium carbonate being at least added at 5% over the stoichiometric quantity needed for the reaction.

The same single stage reactor was used for converting the FGD gypsum A and FGD gypsum B in the pilot plant and under the same operating conditions, the FGD gypsum A was converted to ammonium sulfate and calcium carbonate with only 30 to 50% yield. Only after a larger reactor was employed in the test conversions of FGD gypsum A was there a yield of up to 75%.

The lower conversion rate using the FGD gypsum A was believed to be caused by the gypsum being less reactive due to its crystal shape and the presently employed pilot plant system being a single stage continuous process was not sufficient to convert it fully to calcium carbonate and ammonium sulfate.

Example 2

Laboratory Studies

A series of laboratory studies were undertaken to determine the optimum parameters for the conversion of FGD gypsum A (less reactive FGD gypsum) to calcium carbonate employing the continuous single stage process of the present invention, using a single reactor. The measurement of produced calcium carbonate would stoichiometrically indicate the same conversion rate to produced ammonium sulfate. The goal of the lab studies was to determine the effect of retention time, reaction temperature, and amount of excess ammonium carbonate required for complete conversion of the FGD gypsum A to calcium carbonate. During the series of studies, the following parameters were evaluated:

2 minute retention time
   10% excess ammonium carbonate
   20% excess ammonium carbonate
   50% excess ammonium carbonate
10 minute retention time
   10% excess ammonium carbonate
   20% excess ammonium carbonate
   50% excess ammonium carbonate
20 minute retention time
   10% excess ammonium carbonate
   20% excess ammonium carbonate
   50% excess ammonium carbonate The gypsum was combined with a 36% ammonium sulfate solution in a 400 mL beaker (reactor). Once a slurry of gypsum and water was made, the beaker was placed on a hotplate/stirrer and agitated with a magnetic stir bar. The calculated amount of ammonium carbonate solution was weighed and added to the gypsum slurry. A stopwatch was used to measure the retention time. The temperature of the slurry was monitored and recorded during the reaction. Visual observations were also recorded regarding foaming or color change. After the desired retention time, the slurry was filtered, using vacuum, on a Buchner funnel with a Whatman 541 filter®. The filtrate was collected for further observation. The filter cake was immediately washed with distilled water to stop the reaction. The filter cake was then collected for analysis.

Each product filter cake was examined and the amount of calcium carbonate conversion was estimated. The conversion summary results are listed in the following Table 6. Related observations and notes are listed in the following Table 7A and 7B.

The laboratory studies ("beaker studies") results show that longer retention times and more excess ammonium carbonate helped convert the FGD gypsum A to calcium carbonate at a rate of approximately 100%. A higher reaction temperature was beneficial as well.

TABLE 6

AMT GYPSUM LABORATORY TESTING SUMMARY - Mar. 9, 2012

| Gypsum Source | Sample Description | Excess Ammonium Carbonate (%) | Reaction Retention Time (min) | Slurry Reaction Temperature (°F.) | Calcium Carbonate Filtercake (%) |
|---|---|---|---|---|---|
| FGD Gypsum A | Beaker Study | 10 | 2 | 85-90 | 5 |
| FGD Gypsum A | Beaker Study | 20 | 2 | 85-90 | 20 |
| FGD Gypsum A | Beaker Study | 50 | 2 | 85-90 | 70 |
| FGD Gypsum A | Beaker Study | 10 | 10 | 85-90 | 75 |
| FGD Gypsum A | Beaker Study | 20 | 10 | 85-90 | >85 |
| FGD Gypsum A | Beaker Study | 50 | 10 | 85-90 | >85 |
| FGD Gypsum A | Beaker Study | 10 | 20 | 85-90 | >85 |
| FGD Gypsum A | Beaker Study | 20 | 20 | 85-90 | >90 |
| FGD Gypsum A | Beaker Study | 50 | 20 | 85-90 | 95 |
| FGD Gypsum A | Beaker Study | 10 | 10 | 120 | 60 |
| FGD Gypsum A | Beaker Study | 20 | 10 | 120 | 75 |
| FGD Gypsum A | Beaker Study | 50 | 10 | 120 | 96 |
| FGD Gypsum A | Beaker Study | 10 | 20 | 120 | 65 |
| FGD Gypsum A | Beaker Study | 20 | 20 | 120 | 80 |
| FGD Gypsum A | Beaker Study | 50 | 20 | 120 | >90 |
| FGD Gypsum B | Beaker Study | 10 | 2 | 85-90 | 20 |
| FGD Gypsum A | Beaker Study (additional | 10 | 10 | 120 | 60 |
| FGD Gypsum A | Pilot Plant Study | 10 | 2 | 90-95 | 75 |
| FGD Gypsum B | Pilot Plant Study | 10 | 2 | 85-95 | >90 |

Note:
All Calcium Carbonate Filtercake percentages were determined using crystallography.
Bill Frazier, NFDC crystallographer, identified and estimated the percentages of Calcium carbonate formed in each experiment.

Table 7

TABLE 7A

Mar. 8, 2012
Microscopic Evaluation of $CaSO_4 \cdot 2H_2O \rightarrow CaCO_3$ Reactivity Tests In these tests, gypsum A prismatic crystals of $CaSO_4.2H_2O$ (~20-70μ in size) were reacted with a basic $(NH_4)_2CO_3$ solution at increasingly stronger conditions. The concentration of $(NH_4)_2CO_3$ and retention times were increased. The results show that $CaCO_3$ crystals formed at the surface of the $CaSO_4.2H_2O$ crystals which resulted in $CaCO_3$ pseudomorphs after the $CaSO_4.2H_2O$.

At harsher conditions, the veneers got thicker, more fragile and began to break into pieces. This resulted in a product of mostly veneer pieces of $CaCO_3$ with some loose single crystals up to 4μ in size and 10-15% newly exposed $CaSO_4.2H_2O$ as 30-50μ eroded crystals.

With continued reaction, new more stable veneers formed on the residual $CaSO_4.2H_2O$ and this slowed any further reaction. This below table below gives an estimate of the extent of conversion.

TABLE 7B

Ammonium Carbonate Evaporation Tests:

| % Excess $(NH_4)_2CO_3$ | Retention Time (min.) | % CaCO3 Formed | % CaCO3 as Veneers | % CaCO3 Broken Veneers | Comments |
|---|---|---|---|---|---|
| 10 | 2 | 5 | 98 | 2 | Stable veneers |
| 20 | 2 | 20 | >95 | <5 | Stable veneers |

TABLE 7B-continued

Ammonium Carbonate Evaporation Tests:

| % Excess $(NH_4)_2CO_3$ | Retention Time (min.) | % $CaCO_3$ Formed | % $CaCO_3$ as Veneers | % $CaCO_3$ Broken Veneers | Comments |
|---|---|---|---|---|---|
| 50 | 2 | 70 | >95 | <5 | Stable veneers |
| 10 | 10 | 75 | 20 | 80 | Broken veneers, new veneer forming |
| 20 | 10 | >85 | 5 | 95 | Stable veneers on residual $CaSO_4 \cdot 2H_2O$ |
| 50 | 10 | >85 | 2-5 | 95+ | 30-50μ $CaSO_4 \cdot 2H_2O$ - stable veneers |
| 10 | 20 | >85 | 4-5 | 95+ | 30-50μ $CaSO_4 \cdot 2H_2O$ - stable veneers |
| 20 | 20 | >90 | 5 | 95 | 30-50μ $CaSO_4 \cdot 2H_2O$ - stable veneers |
| 50 | 20 | 95 | 2-4 | 97 | 30-50μ $CaSO_4 \cdot 2H_2O$ - stable veneers |

Ammonium Carbonate Evaporation Tests (Observations):

The original $(NH_4)_2CO_3$ material contained two types of particles; both ranging up to 600μ in size.
1. Single crystals of $(NH_4)_2CO_3$ showing very little erosion.
2. Polycrystalline agglomerates that appear to have gone through 2 phase changes.

These coarse agglomerates have 100μ thick surface veneer of sub-microscopic particles with a larger core of 1-2μ size crystals (too small to positively identify). It appeared that the original precipitated coarse crystals rapidly decomposed at the surface to form the thick veneer which slowed the further reaction and allowed the core crystals to grow larger.

The single crystals of $(NH_4)_2CO_3$ showed no surface reaction indicating the other particles were originally something else.

Conditions of 115° F., 130° F., 150° F. and 176° F. (Observations):

The residues from all of these tests are $(NH_4)_2CO_3$ as coarse air eroded (sublimed) crystals. The only apparent difference is that there was less residue as the temperature increased.

FGD Gypsum B Sample at 10% Excess and 2 min. Retention (Observations):

This sample consisted of ~80% as plate crystals of $CaSO_4.2H_2O$ ranging up to 3×50×70μ with no veneers of reaction product. About 20% was present as 1-3μ crystals of $CaCO_3$.

Pilot Plant ~2:00 PM Mar. 8, 2012 (Observations):

Residual $CaSO_4.2H_2O$ up to 50×50×80μ with no veneers comprised ~25% of the sample. The $CaCO_3$ was mostly agglomerated into units of about the same size as the original $CaSO_4.2H_2O$.

Microscopic Report for $CaSO_4.2H_2O+(NH_4)_2CO_3 \rightarrow CaCO_3$ Mar. 9, 2012
(Observations)

These samples comprised $CaCO_3$ as 1-8μ crystals agglomerated into fairly stable units up to 40μ. The residual $CaSO_4.2H_2O$ was present as 30-60μ solution eroded crystals with no veneer formation. The following Table 8 shows the sample variations.

TABLE 8

| % Excess $(NH_4)_2CO_3$ | Retention Time (min.) | % $CaCO_3$ Formed | % $CaSO_4 \cdot 2H_2O$ |
|---|---|---|---|
| 10 | 10 | 60 | 40 |
| 20 | 10 | 75 | 25 |

TABLE 8-continued

| % Excess $(NH_4)_2CO_3$ | Retention Time (min.) | % $CaCO_3$ Formed | % $CaSO_4 \cdot 2H_2O$ |
|---|---|---|---|
| 50 | 10 | 96 | 4 |
| 10 | 20 | 65 | 35 |
| 20 | 20 | 80 | 20 |
| 50 | 20 | 90+ | 7 |
| ? + $NH_3$ | 10 | 60 | 40 |

The 50-20 sample inexplicably had more residual $CaSO_4 \cdot 2H_2O$. A second sampling of each gave the same results.

The above ammonium carbonate evaporation test observations indicated that the reaction at the lower retention times was impeded by calcium carbonate forming on the outside of the gypsum crystals and locking the remaining gypsum inside the core to thus prevent it from reacting.

Agitation Tests

Tests were performed to determine the benefits of agitation which would separate the calcium carbonate first formed from the inner core gypsum, exposing it to be reacted. Additional beaker studies were performed to investigate this idea. The goal of this series of tests was to determine the effect of high agitation and type of agitation on the conversion with regard to retention time and excess ammonium carbonate. The types of agitation evaluated were (1) ultrasonic mixer and (2) ultrasonic homogenizer compared to gentle agitation using a (3) magnetic stir bar. During the series of lab studies, the following parameters were evaluated:

Ultrasonic Mixer
    10 minute retention time, 10% excess ammonium carbonate
    2 minute retention time, 10% excess ammonium carbonate
    2 minute retention time, 20% excess ammonium carbonate
    2 minute retention time, 50% excess ammonium carbonate
    5 minute retention time, 10% excess ammonium carbonate
  Homogenizer
    10 minute retention time, 10% excess ammonium carbonate
    10 minute retention time, 20% excess ammonium carbonate
    10 minute retention time, 50% excess ammonium carbonate
    20 minute retention time, 10% excess ammonium carbonate 20 minute retention time, 20% excess ammonium carbonate 20 minute retention time, 50% excess ammonium carbonate The FGD gypsum was combined with a 36% ammonium sulfate solution in a 400 ml beaker. Once the gypsum was made into an ammonium sulfate-water slurry, the beaker was placed on a hotplate/stirrer and agitated with a magnetic stir bar. The calculated amount of ammonium carbonate solution was weighed and added to the gypsum slurry. The ultrasonic mixer or homogenizer was placed in the beaker and turned on. A stopwatch was used to measure the retention time. The temperature of the slurry was monitored and recorded during the reaction. Visual observations were also recorded as to foaming or color change. After the desired retention time, the slurry was filtered, using vacuum, on a Buchner funnel with a Whatman 541 filter®. The filtrate was collected for further observation. The filter cake was immediately washed with distilled water to stop the reaction. The filter cake was then collected for analysis. The product filter cakes were examined to determine crystal structure characteristics and conversion rate. Observations and conversion estimates are set forth in the following Table 9 (Tests 1-22) and see Table 10 for summary chart for Tests 1-22.

TABLE 9

Mar. 20, 2012
Microscopic Evaluation of $CaSO_4 \cdot 2H_2O \rightarrow CaCO_3$ Reactivity Tests 1. Homogenizer, retention time 10 min., 50% excess $(NH_4)_2CO_3$, 37.9% $H_2O$
   Estimated conversion to be 60% $CaSO_4 \cdot 2H_2O$ as single crystals from $10 \times 30$ to $40 \times 60\mu$. The $CaCO_3$ at ~40% was single, somewhat agglomerated crystals at 1-8$\mu$ in size.
2. Homogenizer, retention time 10 min., 20% excess $(NH_4)_2CO_3$, 33.86% $H_2O$
   Very similar results to Test No. 1 above.
3. Homogenizer, retention time 10 min., 10% excess $(NH_4)_2CO_3$, 33.20% $H_2O$
   About a 90:10% mixture of $CaSO_4 \cdot 2H_2O:CaCO_3$ (10% yield $CaCO_3$)
4. Homogenizer, retention time 20 min., 50% excess $(NH_4)_2CO_3$, 40.88% $H_2O$
   Residual $CaSO_4 \cdot 2H_2O$ as single crystals up to $30 \times 50\mu$ are about 20% with $CaCO_3$ yield being ~80%.
5. Homogenizer, retention time 20 min., 20% excess $(NH_4)_2CO_3$, 37.25% $H_2O$
   About 80% as $CaSO_4 \cdot 2H_2O$ crystals from $5 \times 5\mu$ to $50 \times 100\mu$ with an occasional crystal reaching $100 \times 150\mu$. Yield of $CaCO_3$ was ~20%.
6. Homogenizer, retention time 20 min., 10% excess $(NH_4)_2CO_3$, 37.35% $H_2O$
   About 75% $CaSO_4 \cdot 2H_2O$ and 25% yield $CaCO_3$
7. Ultrasonic, retention time 10 min., 10% excess $(NH_4)_2CO_3$, 28% $H_2O$
   ~40% $CaSO_4 \cdot 2H_2O$ and 60% yield $CaCO_3$
8. Ultrasonic, retention time 5 min., 10% excess $(NH_4)_2CO_3$, 32.70% $H_2O$
   ~50:50 $CaSO_4 \cdot 2H_2O:CaCO_3$ (50% yield $CaCO_3$). This sample contained several crystals of $CaSO_4 \cdot 2H_2O$ up to 2 mm $\times$ 4 mm as if a scale has broken loose into this system. These coarse crystals comprised 1.5% of sample.
9. Ultrasonic, retention time 2 min., 20% excess $(NH_4)_2CO_3$, 40.77% $H_2O$
   Estimated to be 45:55 $CaSO_4 \cdot 2H_2O:CaCO_3$ (55% yield $CaCO_3$)
10. Ultrasonic, retention time 2 min., 10% excess $(NH_4)_2CO_3$, 36% $H_2O$
    Estimated to be 60:40 $CaSO_4 \cdot 2H_2O:CaCO_3$ (40% yield $CaCO_3$); no pseudomorphs
11. Ultrasonic, retention time 2 min., 50% excess $(NH_4)_2CO_3$, 44.6% $H_2O$
    About 60:40 $CaSO_4 \cdot 2H_2O:CaCO_3$ (40% yield $CaCO_3$); no pseudomorphs
12. Ultrasonic, retention time 2 min., 10% excess $(NH_4)_2CO_3$
    About 60:40 $CaSO_4 \cdot 2H_2O:CaCO_3$ (40% yield $CaCO_3$); no pseudomorphs
13. Ultrasonic, retention time 2 min., 20% excess $(NH_4)_2CO_3$
    Very little gypsum remained. The $CaCO_3$ was present as 1-5$\mu$ crystals agglomerated into soft agglomerates 50-60$\mu$ $CaSO_4 \cdot 2H_2O$ as pseudomorphs after gypsum crystals. The residual $CaSO_4$ was about ¼ of the sample. The gypsum was present mostly as cores of the larger crystals.
14. Ultrasonic, retention time 2 min., 50% excess $(NH_4)_2CO_3$
    $CaCO_3$ were 1-5$\mu$ crystals somewhat agglomerated. $CaSO_4 \cdot 2H_2O$ were pseudomorphs after gypsum crystals. Residual $CaSO_4 \cdot 2H_2O$ was present as the $40 \times 80\mu$ crystals at ~1-3%. $CaSO_4 \cdot 2H_2O$ + $CaSO_4 \cdot \frac{1}{2}H_2O$ = ~25% of the sample.
15. Ultrasonic, retention time 5 min., 10% excess $(NH_4)_2CO_3$
    About 55% $CaSO_4 \cdot \frac{1}{2}H_2O$ and 40% yield $CaCO_3$ and 5% gypsum.
16. Ultrasonic, retention time 10 min., 10% excess $(NH_4)_2CO_3$
    About 60% $CaSO_4 \cdot 2H_2O$ and 40% yield $CaCO_3$. A few of the gypsum crystals were converted to $CaSO_4 \cdot \frac{1}{2}H_2O$.
17. Homogenizer, retention time 20 min., 10% excess $(NH_4)_2CO_3$
    ~50:50 $CaSO_4 \cdot 2H_2O:CaCO_3$ (50% yield $CaCO_3$). About ⅔ (30% of total) of the $CaSO_4$ was present as the hemihydrates and ⅓ (20% of total) was still gypsum.
18. Homogenizer, retention time 20 min., 20% excess $(NH_4)_2CO_3$
    A few coarse crystals with N>1.60 (unknown) constituted up to 1% of the $CaCO_3$. May be coarse limestone. Sample was ~60% yield $CaCO_3$ and 40% gypsum and hemihydrate.
19. Homogenizer, retention time 20 min., 50% excess $(NH_4)_2CO_3$
    ~95% yield $CaCO_3$ - a few coarse crystals of $CaSO_4 \cdot 2H_2O$ were <5%.
20. Homogenizer, retention time 10 min., 10% excess $(NH_4)_2CO_3$
    About 50:50 $CaSO_4 \cdot 2H_2O$ + $CaCO_3$ (50% yield $CaCO_3$).
21. Homogenizer, retention time 10 min., 20% excess $(NH_4)_2CO_3$
    About 55:45 $CaCO_3$: $CaSO_4 \cdot 2H_2O$ (45% yield $CaCO_3$).
22. Homogenizer, retention time 10 min., 50% excess $(NH_4)_2CO_3$
    About 80:20 $CaCO_3$: $CaSO_4 \cdot 2H_2O$ (20% yield $CaCO_3$) with about ⅓ of the gypsum to hemihydrate.

TABLE 9-continued

Mar. 20, 2012
Microscopic Evaluation of $CaSO_4 \cdot 2H_2O \rightarrow CaCO_3$ Reactivity Tests 23. Test 1 product cake with stirrer only Mar. 20, 2012
    All fine grained $CaCO_3$.
24. Test 2 product cake with stirrer only Mar. 20, 2012
    All $CaCO_3$.
25. Test 3 product cake with stirrer only Mar. 20, 2012
    All $CaCO_3$ - some crystals were as large as 15μ i.e. most crystals were 1-2μ; about 1% were at 10-20μ.

TABLE 10

SUMMARY CHART for Tests 1-22: all $CaCO_3$.

| Test | Mixing | Retention Time (min.) | % Excess $(NH_4)_2CO_3$ | % $H_2O$ | Estimated % $CaSO_4 \cdot 2H_2O$ | Estimated % $CaCO3$ |
|---|---|---|---|---|---|---|
| 1 | Homogenizer | 10 | 50 | 37.90 | 60 | 40 |
| 2 | Homogenizer | 10 | 20 | 33.86 | 60 | 40 |
| 3 | Homogenizer | 10 | 10 | 33.20 | 90 | 10 |
| 4 | Homogenizer | 20 | 50 | 40.88 | 20 | 80 |
| 5 | Homogenizer | 20 | 20 | 37.25 | 80 | 20 |
| 6 | Homogenizer | 20 | 10 | 37.35 | 75 | 25 |
| 7 | Ultrasonic | 10 | 10 | 28.00 | 40 | 60 |
| 8 | Ultrasonic | 5 | 10 | 32.70 | 50 | 50 |
| 9 | Ultrasonic | 2 | 20 | 40.77 | 45 | 55 |
| 10 | Ultrasonic | 2 | 10 | 36.00 | 60 | 40 |
| 11 | Ultrasonic | 2 | 50 | 44.60 | 40 | 60 |
| 12 | Ultrasonic | 2 | 10 | | 60 | 40 |
| 13 | Ultrasonic | 2 | 20 | | 25 (as hemihydrate) | 75 |
| 14 | Ultrasonic | 2 | 50 | | 25 (gyp. and hemi.) | 75 |
| 15 | Ultrasonic | 5 | 10 | | 60 (gyp. and hemi.) | 40 |
| 16 | Ultrasonic | 10 | 10 | | 60 (min. hemihydrate) | 40 |
| 17 | Homogenizer | 20 | 10 | | 50 (gyp. and hemi.) | 50 |
| 18 | Homogenizer | 20 | 20 | | 40 (gyp. and hemi.) | 60 |
| 19 | Homogenizer | 20 | 50 | | <5 | 95 |
| 20 | Homogenizer | 10 | 10 | | 50 | 50 |
| 21 | Homogenizer | 10 | 20 | | 45 | 55 |
| 22 | Homogenizer | 10 | 50 | | 20 (gyp. and hemi.) | 80 |

Based upon the test data and observation results in the above Table 9, the results were mixed wherein conversions to calcium carbonate as high as 95% were achieved but required long retention time (20 minutes) and a lot of excess ammonium carbonate (50%). Most of the tests resulted in significantly less conversion (10-80%). Tests with the homogenizer and the ultrasonic mixer both produced lots of foaming. The ultrasonic mixer was rougher on the calcium carbonate product solids. Some of the crystals passed through the filter because of attrition caused by the ultrasonic while this did not occur with the homogenizer. Use of the ultrasonic mixer also caused a significant temperature rise in the solution which continued to increase as the mixer was operated. Intermittent use of the ultrasonic would be necessary in continuous operations.

Confirmation Lab Tests

To confirm the estimates of the gypsum conversion in Table 10, further lab analyses were performed on some of the product filter cake samples. The samples were analyzed for nitrogen and sulfate sulfur. The nitrogen came from ammonium sulfate formed from the reaction between the gypsum and the ammonium carbonate. The amount of sulfate sulfur connected to the nitrogen in the ammonium sulfate was calculated and subtracted from the total sulfate sulfur. The remainder of the sulfate sulfur would come from residual gypsum in the filter cake. The ammonium sulfate and gypsum percentages were added together and subtracted from 100% to back calculate the calcium carbonate percentage in the product filter cake. The conversions reasonably agreed with the estimates in Table 10 and ranged from 50 to 90% with the longer retention times and higher excess ammonium carbonate concentrations producing the higher conversion rates.

The results of these analyses are included in the top portion of below Table 11. This procedure was performed on some of the samples produced using the magnetic stir bar. The results are shown in the second section of Table 11. In those tests, the conversion rates obtained were quite a bit lower than those estimated in Table 10. They also showed, when comparing them to those produced using the ultrasonic mixer and homogenizer, that the more strenuous methods of mixing produced significantly greater conversion rates at the same retention times and amounts of excess ammonium carbonate.

TABLE 11

CONFIRMATION TESTS FOR CALCULATED CaCO$_3$ CONVERSIONS

| Sample Description | CaCO$_3$ Conversion (%) |
|---|---|
| Ultrasonic 2 min. RT 10% Excess | 51.57 |
| Ultrasonic 2 min. RT 20% Excess | 60.71 |
| Ultrasonic 2 min. RT 50% Excess | 72.18 |
| Ultrasonic 5 min. RT 10% Excess | 53.89 |
| Ultrasonic 10 min. RT 10% Excess | 52.33 |
| Homogenizer 10 min RT 10% Excess | 50.91 |
| Homogenizer 10 min RT 20% Excess | 52.79 |
| Homogenizer 10 min RT 50% Excess | 63.75 |
| Homogenizer 20 min RT 10% Excess | 62.94 |
| Homogenizer 20 min RT 20% Excess | 66.23 |
| Homogenizer 20 min RT 50% Excess | 91.36 |
| Magnetic Stirred 2 min 10% Excess | 5.76 |
| Magnetic Stirred 2 min 20% Excess | 0.74 |
| Magnetic Stirred 2 min 50% Excess | 21.03 |
| Magnetic Stirred 10 min 10% Excess | 17.56 |
| Magnetic Stirred 10 min 20% Excess | 32.85 |
| Magnetic Stirred 10 min 50% Excess | 36.18 |
| Magnetic Stirred 20 min 10% Excess | 47.68 |
| Magnetic Stirred 20 min 20% Excess | 56.10 |
| Magnetic Stirred 20 min 50% Excess | 77.13 |
| Counter Current Test 1 Product (Stirrer) (10 min. RT) | 98.97 |
| Counter Current Test 2 Product (Stirrer) (10 min. RT) | 99.43 |
| Counter Current Test 3 Product (Stirrer) (10 min. RT) | 97.47 |
| Counter Current Test 4 Product (Ultrasonic) (10 min. RT) | 98.96 |
| Counter Current Test 5 Product (Ultrasonic) (10 min. RT) | 99.53 |
| Counter Current Test 6 Product (Ultrasonic) (10 min. RT) | 99.07 |
| Counter Current Test 7 Product (Stirrer) (5 min. RT) | 99.48 |
| Counter Current Test 8 Product (Stirrer) (5 min. RT) | 99.06 |
| Counter Current Test 9 Product (Stirrer) (5 min. RT) | 99.03 |
| Counter Current Test 10 Product (Ultrasonic) (5 min. RT) | 99.32 |
| Counter Current Test 11 Product (Ultrasonic) (5 min. RT) | 99.10 |
| Counter Current Test 12 Product (Ultrasonic) (5 min. RT) | 97.54 |
| Counter Current Test 1 Reactor 1 Cake (Stirrer) (10 min. RT) | 53.58 |
| Counter Current Test 2 Reactor 1 Cake (Stirrer) (10 min. RT) | 29.92 |
| Counter Current Test 3 Reactor 1 Cake (Stirrer) (10 min. RT) | 5.21 |
| Counter Current Test 4 Reactor 1 Cake (Ultrasonic) (10 min. RT) | 59.89 |
| Counter Current Test 5 Reactor 1 Cake (Ultrasonic) (10 min. RT) | 31.91 |
| Counter Current Test 6 Reactor 1 Cake (Ultrasonic) (10 min. RT) | 4.91 |
| Counter Current Test 7 Reactor 1 Cake (Stirrer) (5 min. RT) | No Data |
| Counter Current Test 8 Reactor 1 Cake (Stirrer) (5 min. RT) | 0.15 |
| Counter Current Test 9 Reactor 1 Cake (Stirrer) (5 min. RT) | 2.86 |
| Counter Current Test 10 Reactor 1 Cake (Ultrasonic) (5 min. RT) | 39.79 |
| Counter Current Test 11 Reactor 1 Cake (Ultrasonic) (5 min. RT) | 26.96 |
| Counter Current Test 12 Reactor 1 Cake (Ultrasonic) (5 min. RT) | 10.17 |

Example 3

Continuous Multistage Countercurrent Process

The single stage continuous process of the present invention, including a single reactor, was sufficient to obtain a 90% yield of ammonium sulfate and calcium carbonate by employing FGD gypsum B (a more reactive gypsum). In contrast, the single stage continuous reactor process for the FGD gypsum A (a less reactive gypsum) was not sufficient, resulting in only a 30 to 50% yield and even using a larger reactor, only a 75% yield was achieved. Thus, the single stage reactor was sufficient for converting a less reactive gypsum but it was necessary to develop a new process which is a continuous multistage countercurrent flow process to convert a less reactive gypsum such as gypsum A.

A laboratory scale continuous countercurrent flow process was designed and tested for conversion of FGD gypsum to ammonium sulfate and calcium carbonate. This multistage countercurrent continuous process design of Example 3 stands in contrast to the single stage continuous process pilot plant converter/reactor and laboratory test studies described in the above Example 1 and Example 2, respectively.

As shown in FIG. 1, the countercurrent process of the present invention includes a two-step reactor continuous countercurrent process with pure Ammonium Carbonate solution entering the process at the second reactor (Reactor No. 2) and the unreacted Gypsum entering the process at the first reactor (Reactor No. 1). This ensures that already partially reacted gypsum is exposed to pure Ammonium Carbonate solution in the Reactor No. 2 resulting in excess ammonium carbonate which enables a approximate 100% conversion.

A laboratory scale countercurrent flow process was designed and tested to simulate a continuous countercurrent flow system shown in FIG. 1. FGD gypsum A (less reactive) was employed as the feed Gypsum. In the testing, the following operating conditions were evaluated:

Effects of mixing
    Ultrasonic—10 seconds per minute of retention time in reactor 1
    Magnetic stirrer—continuous gentle agitation in reactors 1 and 2
Temperature of solutions—ambient
Excess ammonium carbonate—10% excess
Retention time 10 minutes per reactor 5 minute per reactor For each operating condition evaluated, a series of 3 tests were performed to reach equilibrium of the counter-current system. The steps of the test counter-current flow processes to simulate the countercurrent process of the present invention shown in FIG. 1, were:

1. FGD gypsum A was slurried with distilled water and filtered using a Whatman 541 filter paper® to remove any possible contaminants in the gypsum.
2. For the tests, the filtrate solution labeled (Gypsum Wash Water) was collected and stored for further evaluation.
3. The filter cake (Gypsum Cake) was washed with 36% ammonium sulfate solution during the first test sequence. This solution was used to simulate Reactor No. 1 filtrate that was used in the second and third test of each operating condition.
4. The filtrate collected during the above step 3 was labeled "Ammonium Sulfate Product Solution" and set aside for further evaluation.
5. The filter cake was separated from the Whatman 541 filter paper® and charged to Reactor No. 1 (1000 mL beaker).
6. In the first test, a 33% ammonium carbonate solution (Temp.=115° F.) and 36% ammonium sulfate solution (Temp.=82° F.) were combined with the filter cake and allowed to stir (using a magnetic stirrer) and react for the desired retention time. In the second and third tests, Reactor No. 2 filtrate was combined with the filter cake. In the test using ultrasonic, the ultrasonic was turned on for 10 seconds per minute during the desired retention time.
7. The continents of Reactor 1 were filtered using a Whatman 541 filter paper®. There was no problem with filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2". A small sample of the filter cake was collected and labeled "Reactor 1 cake" and set aside for analysis.
11. In the first test, a 33% ammonium carbonate solution was charged to the reactor. This solution was used to simulate a solution "A/C cake wash filtrate" that was added in the second and third tests.
12. Once the contents of Reactor 2 were combined the temperature was measured at 90-100° F. The contents of the reactor were continuously stirred for the desired retention time using a magnetic stirrer. The mixture foamed immediately.
13. The contents of Reactor 2 were filtered using a Whatman 541 filter®. The filtrate was collected and labeled "Reactor 2 Filtrate".
14. The filter cake obtained from Reactor 2 was washed with a 33% ammonium carbonate solution in an effort to react any residual gypsum.
15. The filtrate from the ammonium carbonate wash was labeled as "A/C Cake Wash Filtrate". Note: This solution was heated to 110-115° F. to keep crystallization from occurring.
16. Distilled water was used to rinse any residual chemicals from the filter cake. The filtrate was collected and labeled "Final Wash to Absorber Tower" and set aside for further evaluations.
17. The filter cake was collected and labeled "Product Filter Cake."

Twelve tests employing the continuous countercurrent process were performed and are described below in Tests 3.1 to 3.12 to simulate the countercurrent process of the present invention shown in FIG. 1. The procedures for each of the twelve tests performed including specific weights of materials used and observations during testing are the following.

Test 3.1—Continuous Magnetic Stirring Test 1. 175.7 grams of FGD gypsum A was slurried with distilled water and filtered using a Whatman 541 filter paper® to remove any possible contaminants in the gypsum.
2. The filtrate solution labeled (Gypsum Wash Water) was collected and stored for further evaluation.
3. The filter cake (Gypsum Cake) was washed with 367 grams of 36% ammonium sulfate solution during the first test sequence. This solution was used to simulate a later solution labeled (Ammonium Sulfate Product Solution) that would eventually be present as the process approached equilibrium.
4. The filtrate collected during the $3^{rd}$ step was labeled "Ammonium Sulfate Product Solution" and set aside for further evaluation.
5. The filter cake was separated from the Whatman 541 filter paper® and charged to Reactor 1 (1000 mL beaker).
6. 256 grams of 33% ammonium carbonate solution (Temp.=115° F.) and 367 grams of 36% ammonium sulfate solution (Temp.=82° F.) were combined with the filter cake and allowed to stir (using a magnetic stirrer) and react for 10 minutes. After 5 minutes the solution temperature was 92° F. After 10 minutes the solution temperature was 90° F. Note: Foaming occurred after 5 minutes of stirring and continued for 2 additional minutes.
7. The continents of Reactor 1 were filtered using a Whatman 541 filter paper®. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. 320.3 grams of 33% ammonium carbonate solution was charged to the reactor. This solution was used to simulate a solution "A/C cake wash filtrate" that will be produced in later tests once the system reaches equilibrium.
12. Once the contents of Reactor 2 were combined the temperature was measured at 94° F. The contents of the reactor were continuously stirred for 10 minutes using a magnetic stirrer. The mixture foamed immediately. The foaming reduced after 3 minutes of continuous stirring. At 5 minutes, no foaming was present but reaction bubbles continued to surface to the top of the slurry. After 10 minutes the slurry temperature was 94° F.

13. The contents of Reactor 2 were filtered using a Whatman 541 filter®. The filtrate was collected and labeled "Reactor 2 Filtrate". This solution will be used during the next experiment.
14. The filter cake obtained from Reactor 2 was washed with 320.3 grams of 33% ammonium carbonate solution in an effort to react any residual gypsum.
15. The filtrate from the ammonium carbonate wash was labeled as "A/C Cake Wash Filtrate". This solution will be used in the next experiment. Note: This solution must be heated to 110-115° F. to keep crystallization from occurring.
16. Distilled water was used to rinse any residual chemicals from the filter cake. The filtrate with rinse water was collected and labeled "Final Wash To Absorber Tower" and set aside for further evaluations.
17. The filter cake was collected and labeled "Test 1 Product Filter Cake."

Test 3.2—Continuous Magnetic Stirring Test

In an effort to evaluate the effect of gypsum conversion to calcium carbonate when using continuous magnetic stirring in Reactors 1 and 2 this set of conditions was utilized to simulate equilibrium condition in the counter current process.

1. 175.7 grams of FGD gypsum A was slurried with distilled water and filtered using a Whatman 541 filter paper® to remove any possible contaminants in the gypsum.
2. The filtrate solution labeled (Gypsum Wash Water) was collected and stored for further evaluation.
3. The filter cake (Gypsum Cake) was washed with Reactor 1 Filtrate for the purpose of removing any contaminants from the ammonium sulfate solution.
4. The filtrate collected during the above step 3 was labeled "Ammonium Sulfate Product Solution" and set aside for further evaluation.
5. The filter cake was separated from the Whatman 541 filter paper® and charged to Reactor 1 (1000 mL beaker).
6. Reactor 2 Filtrate was combined with the filter cake and allowed to continuously stir using a magnetic stirrer. The overall retention time in Reactor 1 was 10 minutes. After 5 minutes the solution temperature was 75° F. After 10 minutes the solution temperature was 70° F. Note: Foaming occurred after 7 minutes of stirring and continued for an additional 2 minutes.
7. The continents of Reactor 1 were filtered using a Whatman 541 filter paper®. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. A/C cake wash filtrate was charged to the reactor.
12. Once the contents of Reactor 2 were combined the temperature was measured at 99° F. The contents of the reactor were continuously stirred for 10 minutes using a magnetic stirrer. The mixture foamed immediately. The foaming reduced after 3 minutes of continuous stirring, Temp=98° F. At 6 minutes, no foaming was present but reaction bubbles continued to surface to the top of the slurry, Temp=98° F. After 10 minutes the slurry temperature was 98° F.

13. The contents of Reactor 2 were filtered using a Whatman 541 filter®. The filtrate was collected and labeled "Reactor 2 Filtrate". This solution will be used during the next experiment.
14. The filter cake obtained from Reactor 2 was washed with 320.3 grams of 33% ammonium carbonate solution in an effort to react any residual gypsum.
15. The filtrate from the ammonium carbonate wash was labeled as "A/C Cake Wash Filtrate". This solution would be used in the next experiment, Test 3.3. Note: This solution was heated to 110-115° F. to keep crystallization from occurring.
16. Distilled water was used to rinse any residual chemicals from the filter cake. The filtrate with rinse water was collected and labeled "Final Wash To Absorber Tower" and set aside for further evaluations.
17. The filter cake was collected and labeled "Test 2 Product Filter Cake."

Test 3.3—Continuous Magnetic Stirring Test

In an effort to evaluate the effect of gypsum conversion to calcium carbonate when using continuous magnetic stirring in Reactor 1 and 2 this set of condition was utilized to simulate equilibrium condition in the counter current process.

1. 175.7 grams of FGD gypsum A was slurried with distilled water and filtered using a Whatman 541 filter paper® to remove any possible contaminants in the gypsum.
2. The filtrate solution labeled (Gypsum Wash Water) was collected and stored for further evaluation.
3. The filter cake (Gypsum Cake) was washed with Reactor 1 Filtrate for the purpose of removing any contaminants from the ammonium sulfate solution.
4. The filtrate collected during the $3^{rd}$ step was labeled "Ammonium Sulfate Product Solution" and set aside for further evaluation.
5. The filter cake was separated from the Whatman 541 filter paper® and charged to Reactor 1 (1000 mL beaker).
6. Reactor 2 Filtrate was combined with the filter cake and allowed to continuously stir using a magnetic stirrer. The overall retention time in Reactor 1 was 10 minutes. After 5 minutes the solution temperature was 76° F. After 10 minutes the solution temperature was 76° F. Note: Foaming occurred after 6 minutes of stirring and continued for an additional 3 minutes.
7. The continents of Reactor 1 were filtered using a Whatman 541 filter paper®. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. A/C cake wash filtrate was charged to the reactor.
12. Once the contents of Reactor 2 were combined the temperature was measured at 98° F. The contents of the reactor were continuously stirred for 10 minutes using a magnetic stirrer. The mixture foamed immediately. The foaming reduced after 4 minutes of continuous stirring, Temp=96° F. At 6 minutes, no foaming was present but reaction bubbles continued to surface to the top of the slurry, Temp=98° F. After 10 minutes the slurry temperature was 96° F.

13. The contents of Reactor 2 were filtered using a Whatman 541 filter®. The filtrate was collected and labeled "Reactor 2 Filtrate". This solution would be used during the next experiment, Test 3.4.
14. The filter cake obtained from Reactor 2 was washed with 320.3 grams of 33% ammonium carbonate solution in an effort to react any residual gypsum.
15. The filtrate from the ammonium carbonate wash was labeled as "A/C Cake Wash Filtrate". This solution will be used in the next experiment. Note: This solution was heated to 110-115° F. to keep crystallization from occurring.
16. Distilled water was used to rinse any residual chemicals from the filter cake. The filtrate with rinse water was collected and labeled "Final Wash To Absorber Tower" and set aside for further evaluations.
17. The filter cake was collected and labeled "Test 3 Product Filter Cake."

Test 3.4—Ultrasonic Stirring Test

In an effort to evaluate the effect of converting gypsum to calcium carbonate when using the Ultrasonic mixer in Reactor 1 this set of condition was utilized in an effort to react equilibrium condition in the counter current process.
 1. 175.7 grams of FGD gypsum A was slurried with distilled water and filtered using a Whatman 541 filter paper of the test counter-current flow processes to simulate the countercurrent process of the present invention shown in FIG. 1 to remove any possible contaminants in the gypsum.
 2. The filtrate solution labeled (Gypsum Wash Water) was collected and stored for further evaluation.
 3. The filter cake (Gypsum Cake) was washed with 367 grams of 36% ammonium sulfate solution during the first test sequence. This solution was used to simulate a later solution labeled (Reactor 1 Filtrate) that would eventually be present as the process approached equilibrium.
 4. The filtrate collected during the above step 3 was labeled "Ammonium Sulfate Product Solution" and set aside for further evaluation.
 5. The filter cake was separated from the Whatman 541 filter paper® and charged to Reactor 1 (1000 mL beaker).
 6. 256 grams of 33% ammonium carbonate solution (Temp.=115° F.) and 367 grams of 36% ammonium sulfate solution (Temp.=82° F.) were combined with the filter cake and allowed to continuously stir using a magnetic stirrer. The Ultrasonic mixer was used in an intermittent fashion. The Ultrasonic was inserted in the reactor and allowed to operate for 10 seconds/minute of reaction time. The overall retention time in Reactor 1 was 10 minutes. The Ultrasonic produced ten-10 seconds stirring cycles during this reaction step. After 5 minutes the solution temperature was 99° F. After 10 minutes the solution temperature was 99° F. Note: Foaming occurred after 2 minutes of stirring and continued for an additional 5 minutes.
 7. The continents of Reactor 1 were filtered using a Whatman 541 filter paper®. There was no problem when filtering the slurry.
 8. The filtrate was collected and labeled (Reactor 1 Filtrate).
 9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. 320.3 grams of 33% ammonium carbonate solution was charged to the reactor. This solution was used to simulate a solution "A/C cake wash filtrate" that will be produced in later tests once the system reaches equilibrium.
12. Once the contents of Reactor 2 were combined the temperature was measured at 94° F. The contents of the reactor were continuously stirred for 10 minutes using a magnetic stirrer. The mixture foamed immediately. The foaming reduced after 2 minutes of continuous stirring, Temp=99° F. At 7 minutes, no foaming was present but reaction bubbles continued to surface to the top of the slurry, Temp=96° F. After 10 minutes the slurry temperature was 95° F.
13. The contents of Reactor 2 was filtered using a Whatman 541 filter®. The filtrate was collected and labeled "Reactor 2 Filtrate". This solution would be used during the next experiment, Test 3.5.
14. The filter cake obtained from Reactor 2 was washed with 320.3 grams of 33% ammonium carbonate solution in an effort to react any residual gypsum.
15. The filtrate from the ammonium carbonate wash was labeled as "A/C Cake Wash Filtrate". This solution would be used in the next experiment, Test 3.5. Note: This solution was heated to 110-115° F. to keep crystallization from occurring.
16. Distilled water was used to rinse any residual chemicals from the filter cake. The filtrate with rinse water was collected and labeled "Final Wash To Absorber Tower" and set aside for further evaluations.
17. The filter cake was collected and labeled "Test 4 Product Filter Cake."

Test 3.5 Ultrasonic Stirring Test

In an effort to evaluate the effect of gypsum conversion to calcium carbonate when using the Ultrasonic mixer in Reactor 1 this set of condition was utilized in an effort to reach equilibrium condition in the counter current process.
 1. 175.7 grams of FGD gypsum A was slurried with distilled water and filtered using a Whatman 541 filter paper® to remove any possible contaminants in the gypsum.
 2. The filtrate solution labeled (Gypsum Wash Water) was collected and stored for further evaluation.
 3. The filter cake (Gypsum Cake) was washed with Reactor 1 Filtrate for the purpose of removing any contaminants from the ammonium sulfate solution.
 4. The filtrate collected during the $3^{rd}$ step was labeled "Ammonium Sulfate Product Solution" and set aside for further evaluation.
 5. The filter cake was separated from the Whatman 541 filter paper® and charged to Reactor 1 (1000 mL beaker).
 6. Reactor 2 Filtrate was combined with the filter cake and allowed to continuously stir using a magnetic stirrer. The Ultrasonic mixer was used in an intermittent fashion. The Ultrasonic was inserted in the reactor and allowed to operate for 10 seconds/minute of reaction time. The overall retention time in Reactor 1 was 10 minutes. The Ultrasonic produced ten-10 seconds stirring cycles during this reaction step. After 5 minutes the solution temperature was 80° F. After 10 minutes the solution temperature was 80° F. Note: Foaming occurred after 2 minutes of stirring and continued for an additional 5 minutes.

7. The continents of Reactor 1 were filtered using a Whatman 541 filter paper®. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. A/C cake wash filtrate was charged to the reactor.
12. Once the contents of Reactor 2 were combined the temperature was measured at 99° F. The contents of the reactor were continuously stirred for 10 minutes using a magnetic stirrer. The mixture foamed immediately. The foaming reduced after 2 minutes of continuous stirring, Temp=99° F. At 7 minutes, no foaming was present but reaction bubbles continued to surface to the top of the slurry, Temp=99° F. After 10 minutes the slurry temperature was 98° F.
13. The contents of Reactor 2 were filtered using a Whatman 541 filter®. The filtrate was collected and labeled "Reactor 2 Filtrate". This solution would be used during the next experiment, Test 3.6.
14. The filter cake obtained from Reactor 2 was washed with 320.3 grams of 33% ammonium carbonate solution in an effort to react any residual gypsum.
15. The filtrate from the ammonium carbonate wash was labeled as "A/C Cake Wash Filtrate". This solution would be used in the next experiment, Test 3.6. Note: This solution was heated to 110-115° F. to keep crystallization from occurring.
16. Distilled water was used to rinse any residual chemicals from the filter cake. The filtrate with rinse water was collected and labeled "Final Wash To Absorber Tower" and set aside for further evaluations.
17. The filter cake was collected and labeled "Test 5 Product Filter Cake."

Test 3.6—Ultrasonic Stirring Test

In an effort to evaluate the effect of gypsum conversion to calcium carbonate when using the Ultrasonic mixer in Reactor 1 this set of condition was utilized in an effort to reach equilibrium condition in the counter current process.
1. 175.7 grams of FGD gypsum A was slurried with distilled water and filtered using a Whatman 54.1 filter paper® to remove any possible contaminants in the gypsum.
2. The filtrate solution labeled (Gypsum Wash Water) was collected and stored for further evaluation.
3. The filter cake (Gypsum Cake) was washed with Reactor 1 Filtrate for the purpose of removing any contaminants from the ammonium sulfate solution.
4. The filtrate collected during the $3^{rd}$ step was labeled "Ammonium Sulfate Product Solution" and set aside for further evaluation.
5. The filter cake was separated from the Whatman 541 filter paper® and charged to Reactor 1 (1000 mL beaker).
6. Reactor 2 Filtrate was combined with the filter cake and allowed to continuously stir using a magnetic stirrer. The Ultrasonic mixer was used in an intermittent fashion. The Ultrasonic was inserted in the reactor and allowed to operate for 10 seconds/minute of reaction time. The overall retention time in Reactor 1 was 10 minutes. The Ultrasonic produced ten-10 seconds stirring cycles during this reaction step. After 5 minutes the solution temperature was 81° F. After 10 minutes the solution temperature was 83° F. Note: Foaming occurred after 2 minutes of stirring and continued for an additional 6 minutes.
7. The continents of Reactor 1 were filtered using a Whatman 541 filter paper®. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. NC cake wash filtrate was charged to the reactor.
12. Once the contents of Reactor 2 were combined the temperature was measured at 95° F. The contents of the reactor were continuously stirred for 10 minutes using a magnetic stirrer. The mixture foamed immediately. The foaming reduced after 4 minutes of continuous stirring, Temp=93° F. At 8 minutes, no foaming was present but reaction bubbles continued to surface to the top of the slurry, Temp=91° F. After 10 minutes the slurry temperature was 90° F.
13. The contents of Reactor 2 were filtered using a Whatman 541 filter paper®. The filtrate was collected and labeled "Reactor 2 Filtrate". This solution would be used during the next experiment, Test 3.7.
14. The filter cake obtained from Reactor 2 was washed with 320.3 grams of 33% ammonium carbonate solution in an effort to react any residual gypsum.
15. The filtrate from the ammonium carbonate wash was labeled as "NC Cake Wash Filtrate". This solution would be used in the next experiment Test 3.7. Note: This solution was heated to 110-115° F. to keep crystallization from occurring.
16. Distilled water was used to rinse any residual chemicals from the filter cake. The filtrate with rinse water was collected and labeled "Final Wash To Absorber Tower" and set aside for further evaluations.
17. The filter cake was collected and labeled "Test 6 Product Filter Cake."

Test 3.7 Continuous Magnetic Stirring Test
1. 175.7 grams of FGD gypsum A was slurried with distilled water and filtered using a Whatman 541 filter paper® to remove any possible contaminants in the gypsum.
2. The filtrate solution labeled (Gypsum Wash Water) was collected and stored for further evaluation.
3. The filter cake (Gypsum Cake) was washed with 367 grams of 36% ammonium sulfate solution during the first test sequence. This solution was used to simulate a later solution labeled (Ammonium Sulfate Product Solution) that would eventually be present as the process approached equilibrium.
4. The filtrate collected during the $3^{rd}$ step was labeled "Ammonium Sulfate Product Solution" and set aside for further evaluation.
5. The filter cake was separated from the Whatman 541 filter paper® and charged to Reactor 1 (1000 mL beaker).
6. 256 grams of 33% ammonium carbonate solution (Temp.=115° F.) and 367 grams of 36% ammonium sulfate solution (Temp.=82° F.) were combined with the filter cake and allowed to stir (using a magnetic stirrer) and react for 5 minutes. After 1 minute the solution temperature was 85° F. After 5 minutes the solution temperature was 85° F. Note: No foaming occurred during this reaction step.
7. The continents of Reactor 1 were filtered using a Whatman 541 filter paper®. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. 320.3 grams of 33% ammonium carbonate solution was charged to the reactor. This solution was used to simulate a solution "A/C cake wash filtrate" that will be produced in later tests once the system reaches equilibrium.
12. Once the contents of Reactor 2 were combined the temperature was measured at 95° F. The contents of the reactor were continuously stirred for 5 minutes using a magnetic stirrer. The mixture foamed immediately. At 3 minutes, no foaming was present but reaction bubbles continued to surface to the top of the slurry. After 5 minutes the slurry temperature was 91° F.
13. The contents of Reactor 2 were filtered using a Whatman 541 filter paper®. The filtrate was collected and labeled "Reactor 2 Filtrate". This solution would be used during the next experiment, Test 3.8.
14. The filter cake obtained from Reactor 2 was washed with 320.3 grams of 33% ammonium carbonate solution in an effort to react any residual gypsum.
15. The filtrate from the ammonium carbonate wash was labeled as "A/C Cake Wash Filtrate". This solution would be used in the next experiment, Test 3.8. Note: This solution was heated to 110-115° F. to keep crystallization from occurring.
16. Distilled water was used to rinse any residual chemicals from the filter cake. The filtrate with rinse water was collected and labeled "Final Wash To Absorber Tower" and set aside for further evaluations.
17. The filter cake was collected and labeled "Test 7 Product Filter Cake."

Test 3.8—Continuous Magnetic Stirring Test

In an effort to evaluate the effect of gypsum conversion to calcium carbonate when using continuous magnetic stirring in Reactor 1 and 2 this set of condition was utilized to simulate equilibrium condition in the counter current process.
1. 175.7 grams of FGD gypsum A was slurried with distilled water and filtered using a Whatman 541 filter paper® to remove any possible contaminants in the gypsum.
2. The filtrate solution labeled (Gypsum Wash Water) was collected and stored for further evaluation.
3. The filter cake (Gypsum Cake) was washed with Reactor 1 Filtrate for the purpose of removing any contaminants from the ammonium sulfate solution.
4. The filtrate collected during the $3^{rd}$ step was labeled "Ammonium Sulfate Product Solution" and set aside for further evaluation.
5. The filter cake was separated from the Whatman 541 filter paper® and charged to Reactor 1 (1000 mL beaker).
6. Reactor 2 Filtrate was combined with the filter cake and allowed to continuously stir using a magnetic stirrer. The overall retention time in Reactor 1 was 5 minutes. After 1 minute the solution temperature was 76° F. After 5 minutes the solution temperature was 76° F. Note: Foaming occurred after 3 minutes of stirring and continued for an additional 2 minutes.
7. The continents of Reactor 1 were filtered using a Whatman 541 filter paper. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. NC cake wash filtrate was charged to the reactor.
12. Once the contents of Reactor 2 were combined the temperature was measured at 80° F. The contents of the reactor were continuously stirred for 5 minutes using a magnetic stirrer. The mixture foamed after 3 minutes of stirring. The temperature of the solution was 85° F. After 5 minutes the slurry temperature was 81° F.
13. The contents of Reactor 2 were filtered using a Whatman 541 filter paper®. The filtrate was collected and labeled "Reactor 2 Filtrate". This solution would be used during the next experiment, Test 3.9.
14. The filter cake obtained from Reactor 2 was washed with 320.3 grams of 33% ammonium carbonate solution in an effort to react any residual gypsum.
15. The filtrate from the ammonium carbonate wash was labeled as "NC Cake Wash Filtrate". This solution would be used in the next experiment, Test 3.9. Note: This solution was heated to 110-115° F. to keep crystallization from occurring.
16. Distilled water was used to rinse any residual chemicals from the filter cake. The filtrate with rinse water was collected and labeled "Final Wash To Absorber Tower" and set aside for further evaluations.
17. The filter cake was collected and labeled "Test 8 Product Filter Cake."

Test 3.9—Continuous Magnetic Stirring Test

In an effort to evaluate the effect of gypsum conversion to calcium carbonate when using continuous magnetic stirring in Reactor 1 and 2 this set of conditions was utilized to simulate equilibrium condition in the counter current process.
1. 175.7 grams of FGD gypsum A was slurried with distilled water and filtered using a Whatman 541 filter paper® to remove any possible contaminants in the gypsum.
2. The filtrate solution labeled (Gypsum Wash Water) was collected and stored for further evaluation.
3. The filter cake (Gypsum Cake) was washed with Reactor 1 Filtrate for the purpose of removing any contaminants from the ammonium sulfate solution.
4. The filtrate collected during the $3^{rd}$ step was labeled "Ammonium Sulfate Product Solution" and set aside for further evaluation.
5. The filter cake was separated from the Whatman 541 filter paper® and charged to Reactor 1 (1000 mL beaker).
6. Reactor 2 Filtrate was combined with the filter cake and allowed to continuously stir using a magnetic stirrer. The overall retention time in Reactor 1 was 5 minutes. After 1 minute the solution temperature was 73° F. After 5 minutes the solution temperature was 72° F. Note: No Foaming occurred during this reaction step.

7. The continents of Reactor 1 were filtered using a Whatman 541 filter paper®. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. A/C cake wash filtrate was charged to the reactor.
12. Once the contents of Reactor 2 were combined the temperature was measured at 100° F. The contents of the reactor were continuously stirred for 5 minutes using a magnetic stirrer. The mixture foamed after 1 minutes of stirring. The temperature of the solution was 96° F. After 5 minutes the slurry temperature was 92° F.
13. The contents of Reactor 2 were filtered using a Whatman 541 filter paper. The filtrate was collected and labeled "Reactor 2 Filtrate". This solution would be used during the next experiment, Test 3.10.
14. The filter cake obtained from Reactor 2 was washed with 320.3 grams of 33% ammonium carbonate solution in an effort to react any residual gypsum.
15. The filtrate from the ammonium carbonate wash was labeled as "A/C Cake Wash Filtrate". This solution would be used in the next experiment, Test 3.10. Note: This solution was heated to 110-115° F. to keep crystallization from occurring.
16. Distilled water was used to rinse any residual chemicals from the filter cake. The filtrate with rinse water was collected and labeled "Final Wash To Absorber Tower" and set aside for further evaluations.
17. The filter cake was collected and labeled "Test 9 Product Filter Cake."

Test 3.10—Ultrasonic Stirring Test

In an effort to evaluate the effect of gypsum conversion to calcium carbonate when using the Ultrasonic mixer in Reactor 1 this set of conditions was utilized to simulate equilibrium condition in the counter current process.

1. 175.7 grams of FGD gypsum A was slurried with distilled water and filtered using a Whatman 541 filter paper® to remove any possible contaminants in the gypsum.
2. The filtrate solution labeled (Gypsum Wash Water) was collected and stored for further evaluation.
3. The filter cake (Gypsum Cake) was washed with 367 grams of 36% ammonium sulfate solution during the first test sequence. This solution was used to simulate a later solution labeled (Reactor 1 Filtrate) that would eventually be present as the process approached equilibrium.
4. The filtrate collected during the $3^{rd}$ step was labeled "Ammonium Sulfate Product Solution" and set aside for further evaluation.
5. The filter cake was separated from the Whatman 541 filter paper® and charged to Reactor 1 (1000 mL beaker).
6. 256 grams of 33% ammonium carbonate solution (Temp.=115° F.) and 367 grams of 36% ammonium sulfate solution (Temp.=82° F.) were combined with the filter cake and allowed to continuously stir using a magnetic stirrer. The Ultrasonic mixer was used in an intermittent fashion. The Ultrasonic was inserted in the reactor and allowed to operate for 10 seconds/minute of reaction time. The overall retention time in Reactor 1 was 5 minutes. The Ultrasonic produced five-10 seconds stirring cycles during this reaction step. After 5 minutes the solution temperature was 99° F. After 10 minutes the solution temperature was 99° F. Note: Foaming occurred after 2 minutes of stirring and continued for the 5 minute test duration.
7. The continents of Reactor 1 were filtered using a Whatman 541 filter paper®. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. 320.3 grams of 33% ammonium carbonate solution was charged to the reactor. This solution was used to simulate a solution "A/C cake wash filtrate" that will be produced in later tests once the system reaches equilibrium.
12. Once the contents of Reactor 2 were combined the temperature was measured at 94° F. The contents of the reactor were continuously stirred for 5 minutes using the magnetic stirrer. The mixture foamed immediately. The foaming reduced after 2 minutes of continuous stirring, Temp=99° F. After 5 minutes the slurry temperature was 95° F.
13. The contents of Reactor 2 was filtered using a Whatman 541 filter paper®. The filtrate was collected and labeled "Reactor 2 Filtrate". This solution would be used during the next experiment, Test 3.11.
14. The filter cake obtained from Reactor 2 was washed with 320.3 grams of 33% ammonium carbonate solution in an effort to react any residual gypsum.
15. The filtrate from the ammonium carbonate wash was labeled as "A/C Cake Wash Filtrate". This solution would be used in the next experiment, Test 3.11. Note: This solution was heated to 110-115° F. to keep crystallization from occurring.
16. Distilled water was used to rinse any residual chemicals from the filter cake. The filtrate from the rinse was collected and labeled "Final Wash To Absorber Tower" and set aside for further evaluations.
17. The filter cake was collected and labeled "Test 10 Product Filter Cake."

Test 3.11—Ultrasonic Stirring Test

In an effort to evaluate the effect of gypsum conversion to calcium carbonate when using the Ultrasonic mixer in Reactor 1 this set of conditions was utilized in an effort to simulate equilibrium condition in the counter current process.

1. 175.7 grams of FGD gypsum A was slurried with distilled water and filtered using a Whatman 541 filter paper® to remove any possible contaminants in the gypsum.
2. The filtrate solution labeled (Gypsum Wash Water) was collected and stored for further evaluation.
3. The filter cake (Gypsum Cake) was washed with Reactor 1 Filtrate for the purpose of removing any contaminants from the ammonium sulfate solution.
4. The filtrate collected during the $3^{rd}$ step was labeled "Ammonium Sulfate Product Solution" and set aside for further evaluation.
5. The filter cake was separated from the Whatman 541 filter paper® and charged to Reactor 1 (1000 mL beaker).

6. Reactor 2 Filtrate was combined with the filter cake and allowed to continuously stir using a magnetic stirrer. The Ultrasonic mixer was used in an intermittent fashion. The Ultrasonic was inserted in the reactor and allowed to operate for 5 seconds/minute of reaction time. The overall retention time in Reactor 1 was 5 minutes. The Ultrasonic produced five-10 seconds stirring cycles during this reaction step. After 5 minutes the solution temperature was 80° F. After 5 minutes the solution temperature was 80° F. Note: Foaming occurred after 2 minutes of stirring and continued for the remaining 5 minute test duration.
7. The continents of Reactor 1 were filtered using a Whatman 541 filter paper®. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. A/C cake wash filtrate was charged to the reactor.
12. Once the contents of Reactor 2 were combined the temperature was measured at 99° F. The contents of the reactor were continuously stirred for 10 minutes using a magnetic stirrer. The mixture foamed immediately. The foaming reduced after 2 minutes of continuous stirring, Temp=99° F. After 5 minutes the slurry temperature was 98° F.
13. The contents of Reactor 2 were filtered using a Whatman 541 filter paper®. The filtrate was collected and labeled "Reactor 2 Filtrate". This solution would be used during the next experiment, Test 3.12.
14. The filter cake obtained from Reactor 2 was washed with 320.3 grams of 33% ammonium carbonate solution in an effort to react any residual gypsum.
15. The filtrate from the ammonium carbonate wash was labeled as "A/C Cake Wash Filtrate". This solution would be used in the next experiment, Test 3.12. Note: This solution must be heated to 110-115° F. to keep crystallization from occurring.
16. Distilled water was used to rinse any residual chemicals from the filter cake. The filtrate from the rinse was collected and labeled "Final Wash To Absorber Tower" and set aside for further evaluations.
17. The filter cake was collected and labeled "Test 11 Product Filter Cake."

Test 3.12—Ultrasonic Stirring Test

In an effort to evaluate the effect of gypsum conversion to calcium carbonate when using the Ultrasonic mixer in Reactor 1 this set of conditions was utilized in an effort to simulate equilibrium condition in the counter current process.

1. 175.7 grams of FGD gypsum A was slurried with distilled water and filtered using a Whatman 541 filter paper® to remove any possible contaminants in the gypsum.
2. The filtrate solution labeled (Gypsum Wash Water) was collected and stored for further evaluation.
3. The filter cake (Gypsum Cake) was washed with Reactor 1 Filtrate for the purpose of removing any contaminants from the ammonium sulfate solution.
4. The filtrate collected during the 3$^{rd}$ step was labeled "Ammonium Sulfate Product Solution" and set aside for further evaluation.
5. The filter cake was separated from the Whatman 541 filter paper® and charged to Reactor 1 (1000 mL beaker).
6. Reactor 2 Filtrate was combined with the filter cake and allowed to continuously stir using a magnetic stirrer. The Ultrasonic mixer was used in an intermittent fashion. The Ultrasonic was inserted in the reactor and allowed to operate for 10 seconds/minute of reaction time. The overall retention time in Reactor 1 was 5 minutes. The Ultrasonic produced five-10 seconds stirring cycles during this reaction step. After 5 minutes the solution temperature was 81° F. Note: Foaming occurred after 2 minutes of stirring and continued for an additional 5 minutes.
7. The continents of Reactor 1 were filtered using a Whatman 541 filter paper®. There was no problem when filtering the slurry.
8. The filtrate was collected and labeled (Reactor 1 Filtrate).
9. The filter cake from Reactor 1 was rinsed with distilled water to stop the reaction for the purpose of analyzing the cake. This filtrate solution was labeled "Reactor 1 Water Wash" and set aside for further evaluations.
10. The filter cake was removed from the filter and charged to a 1000 mL beaker labeled "Reactor 2".
11. NC cake wash filtrate was charged to the reactor.
12. Once the contents of Reactor 2 were combined the temperature was measured at 95° F. The contents of the reactor were continuously stirred for 5 minutes using a magnetic stirrer. The mixture foamed immediately. After 5 minutes the slurry temperature was 90° F.
13. The contents of Reactor 2 were filtered using a Whatman 541 filter paper®. The filtrate was collected and labeled "Reactor 2 Filtrate".
14. The filter cake obtained from Reactor 2 was washed with 320.3 grams of 33% ammonium carbonate solution in an effort to react any residual gypsum.
15. The filtrate from the ammonium carbonate wash was labeled as "NC Cake Wash Filtrate". Note: This solution was heated to 110-115° F. to keep crystallization from occurring.
16. Distilled water was used to rinse any residual chemicals from the filter cake. The filtrate from the rinse was collected and labeled "Final Wash To Absorber Tower" and set aside for further evaluations.
17. The filter cake was collected and labeled "Test 12 Product Filter Cake."

The product cakes resulting from the above Tests 3.1-3.12 were examined for amount of conversion of FGD gypsum and ammonium carbonate to calcium carbonate and found that all Tests showed approximately 100% conversion to calcium carbonate. The amount of conversion to ammonium sulfate is stoichiometrically determined from the amount of conversion to calcium carbonate. The following are the observation results:

Tests 3.1, 3.2, 3.3, 3.4, and 3.5 product cake slurry: all these solids were pure $CaCO_3$ with about 1% of the crystals up to 10-15µ in size.

These samples contained residual plate crystals of $CaSO4$ from 10×30 to 50×100µ in size. In some oven dried samples, part of the $CaSO_4.2H_2O$ was converted to pseudomorphs and $CaSO_4.½H_2O$. The $CaCO3$ was present as 1-8µ crystals somewhat agglomerated to soft units up to 80µ.

Confirmation tests and analyses were made as described above under "Confirmation Lab Tests" to determine calcium carbonate, and they confirmed the 97 to approximately 100% conversion of gypsum to calcium carbonate was achieved and higher conversion yields were also obtained of 98% to approximately 100%, 99% to approximately 100% and an achieved yield of approximately 100% conversion. This was true with both ultrasonic and stir-bar mixing and at both retention times. Cake samples were also collected from filtering after the first reactor and were analyzed for comparison. These showed conversion rates from 0 to 60%. These results are shown in the bottom two sections of the above Table 7.

Contaminants and Trace Metals in FGD Gypsum and Process Products

Test 1

Contaminants and Trace Metals in Calcium Carbonate and Ammonium Sulfate Products and the FGD Gypsum To determine the level of impurities and trace metals in the calcium carbonate and ammonium sulfate solution products and the gypsum raw material, samples were run through an ICP (Inductively Coupled Plasma) analyzer. The FGD gypsum samples were from the previously referenced Miller Power Plant, Alabama and Gorgas Power Plant, Alabama. No significant or inordinate amounts of any metals were shown except for mercury which was analyzed at a high concentration. The ICP was re-calibrated and the samples were retested and showed no mercury.

Because of this inconsistency, the samples were tested a third time for mercury, this time analyzed via the Cold Vapor Absorption Method. The results showed a small amount of mercury, 1 to 2 ppm, in the gypsum and less than 0.01 ppm in the ammonium sulfate solutions, which is consistent with typical granular ammonium sulfate which was also tested.

The resulting impurity and trace metal data is shown in the below Table 12.

Further note that at the time of measuring the concentration of selenium in the samples, the analytical methodology had not been developed sufficiently to provide reliable measurements. The data described in the following Test 2 was obtained after rigorous method development, identifying and masking possible interferences that could introduce error in the results, and standardizing equipment for the best possible analytical results.

TABLE 12

CONTAMINANT AND TRACE METAL ANALYSIS (RAW GYPSUM AND PROCESS PRODUCTS)

| Sample Name | Sample Weight (g) | Sample Vol (mL) | Al PPM | Sb PPM | As PPM | B PPM | Ba PPM | Be PPM | Cd PPM | Co PPM | Cr PPM | Cu PPM | Fe PPM | K PPM |
|---|---|---|---|---|---|---|---|---|---|---|---|---|---|---|
| Gorgas Settled | 1.0033 | 1000 | 960.3 | 2.294 | 0 | 110.6 | 94.33 | 0.096 | 0.09 | 0 | 3.331 | 2.906 | 495.6 | 511.6 |
| Gorgas Settled 2 | 1.0435 | 1000 | 667.8 | 26.63 | 0 | 127.3 | 69.06 | 5.337 | 4.342 | 4.778 | 9.578 | 9.906 | 372 | 368.5 |
| Gorgas Settled 3 | 1.0275 | 1000 | 622.4 | 0 | 0 | 118 | 64.73 | 1.023 | 0 | 1.27 | 4.137 | 3.991 | 409.3 | 282.3 |
| Gorgas Pond | 1.0374 | 1000 | 906.3 | 0 | 13.37 | 110.2 | 102.8 | 2.782 | 2.26 | 4.099 | 14.33 | 8.2 | 643.2 | 375.7 |
| Miller | 1.0237 | 1000 | 962.2 | 11.54 | 16.41 | 0 | 133.5 | 0 | 0.183 | 0 | 2.558 | 3.346 | 1556 | 325.7 |
| CounterCurrent Test 1 (Stirrer) | 1.0817 | 1000 | 1397 | 0 | 0 | 19.55 | 240.5 | 0.291 | 0 | 0 | 8.18 | 2.837 | 737.2 | 438.6 |
| CounterCurrent Test 2 (Stirrer) | 1.0451 | 1000 | 1409 | 0 | 40.37 | 12.82 | 239.3 | 0.051 | 0.104 | 0.569 | 6.802 | 3.59 | 765.9 | 438 |
| CounterCurrent Test 3 (Stirrer) | 1.0924 | 1000 | 1579 | 0 | 0 | 3.675 | 237.2 | 0 | 0 | 1.2 | 9.228 | 3.678 | 786.2 | 435.7 |
| CounterCurrent Test 4 (Ultrasonic) | 1.0631 | 1000 | 1037 | 0 | 20.82 | 0 | 205.9 | 0 | 0 | 0.479 | 5.687 | 2.19 | 494.5 | 399.9 |
| CounterCurrent Test 5 (Ultrasonic) | 1.0440 | 1000 | 1152 | 0 | 0 | 0 | 199.1 | 0 | 0 | 0 | 4.919 | 2.732 | 512.1 | 457.3 |
| CounterCurrent Test 6 (Ultrasonic) | 1.0845 | 1000 | 982.8 | 0 | 0 | 0 | 198.8 | 0 | 0 | 0.557 | 3.962 | 3.955 | 521.3 | 382 |
| Counter Current Test 7 (Stirrer) | 1.0136 | 1000 | 943.6 | 0 | 0 | 0 | 218.1 | 0 | 0 | 0 | 4.77 | 1.311 | 541.3 | 399.2 |
| Counter Current Test 8 (Stirrer) | 1.0667 | 1000 | 955.8 | 0 | 27.33 | 0 | 207.9 | 0 | 0 | 1.295 | 4.986 | 2.54 | 542.9 | 342.3 |
| Counter Current Test 9 (Stirrer) | 1.0110 | 1000 | 914.7 | 0 | 13.31 | 0 | 195 | 0 | 0 | 0 | 5.876 | 2.307 | 480 | 338.8 |
| Counter Current Test 10 (Ultrasonic) | 1.0369 | 1000 | 962.3 | 0 | 0.232 | 0 | 214.4 | 0 | 0 | 0.794 | 4.635 | 2.727 | 500 | 331 |
| Counter Current Test 11 (Ultrasonic) | 1.0477 | 1000 | 1002 | 0 | 0 | 0 | 217.7 | 0 | 0 | 1.827 | 4.212 | 5.161 | 499.6 | 376.1 |
| Counter Current Test 12 (Ultrasonic) | 1.0354 | 1000 | 980.7 | 0 | 0 | 0 | 215 | 0 | 0 | 1.211 | 5.525 | 3.52 | 510.6 | 342.2 |
| Commercially Available Ammonium Sulfate | 1.0403 | 1000 | 0 | 0 | 34.93 | 0 | 3.514 | 5.28 | 4.044 | 3.478 | 7.75 | 9.445 | 43.57 | 62.69 |

CONTAMINANT AND TRACE METAL ANALYSIS (FGD GYPSUM AND PROCESS PRODUCTS)

| Sample Name | Sample Weight (g) | Sample Vol (mL) | Mg PPM | Mn PPM | Mo PPM | Na PPM | Ni PPM | Pb PPM |
|---|---|---|---|---|---|---|---|---|
| Gorgas Settled | 1.0033 | 1000 | 2768 | 7.622 | 10.75 | 403 | 4.471 | 0 |
| Gorgas Settled 2 | 1.0435 | 1000 | 2249 | 10.78 | 102 | 261.3 | 9.422 | 11.73 |
| Gorgas Settled 3 | 1.0275 | 1000 | 2149 | 7.934 | 36.18 | 249.1 | 3.918 | 3.703 |
| Gorgas Pond | 1.0374 | 1000 | 2559 | 11 | 39.75 | 330.3 | 8.891 | 7.695 |
| Miller | 1.0237 | 1000 | 2550 | 12.38 | 6.463 | 322.3 | 2.521 | 1.09 |
| CounterCurrent Test 1 (Stirrer) | 1.0817 | 1000 | 3365 | 13.2 | 13.23 | 378.3 | 2.255 | 0 |
| CounterCurrent Test 2 (Stirrer) | 1.0451 | 1000 | 3353 | 12.59 | 10.54 | 395.9 | 2.021 | 0 |

TABLE 12-continued

| | | | | | | | | |
|---|---|---|---|---|---|---|---|---|
| CounterCurrent Test 3 (Stirrer) | 1.0924 | 1000 | 3456 | 18.83 | 4.529 | 372.1 | 4.8 | 0 |
| CounterCurrent Test 4 (Ultrasonic) | 1.0631 | 1000 | 2821 | 6.722 | 4.264 | 326.5 | 1.519 | 0 |
| CounterCurrent Test 5 (Ultrasonic) | 1.0440 | 1000 | 2955 | 6.339 | 0.707 | 298.4 | 2.641 | 0 |
| CounterCurrent Test 6 (Ultrasonic) | 1.0845 | 1000 | 2862 | 6.126 | 1.965 | 343.9 | 0 | 0 |
| Counter Current Test 7 (Stirrer) | 1.0136 | 1000 | 2820 | 6.753 | 0 | 358.8 | 1.677 | 0 |
| Counter Current Test 8 (Stirrer) | 1.0667 | 1000 | 2994 | 6.528 | 2.352 | 290.4 | 1.555 | 0 |
| Counter Current Test 9 (Stirrer) | 1.0110 | 1000 | 2738 | 6.221 | 1.123 | 350.1 | 1.825 | 0 |
| Counter Current Test 10 (Ultrasonic) | 1.0369 | 1000 | 2818 | 7.38 | 2.411 | 334.3 | 2.215 | 0 |
| Counter Current Test 11 (Ultrasonic) | 1.0477 | 1000 | 2880 | 6.956 | 2.552 | 386 | 0.498 | 0 |
| Counter Current Test 12 (Ultrasonic) | 1.0354 | 1000 | 3156 | 6.923 | 0 | 335.9 | 2.455 | 0 |
| Commercially Available Ammonium Sulfate | 1.0403 | 1000 | 110.9 | 6.138 | 61.63 | 144.5 | 5.763 | 10.53 |

CONTAMINANT AND TRACE METAL ANALYSIS (FGD GYPSUM AND PROCESS PRODUCTS)

| Sample Name | Se PPM | Si PPM | Ti PPM | Tl PPM | V PPM | Zn PPM | Hg PPM |
|---|---|---|---|---|---|---|---|
| Gorgas Settled | 0 | 334.4 | 0 | 0 | 13.44 | 21.55 | no analysis |
| Gorgas Settled 2 | 20.39 | 676.5 | 0 | 0.69 | 10.11 | 20.37 | 1.23* |
| Gorgas Settled 3 | 0 | 547.1 | 0 | 0 | 8.747 | 14.04 | 1.28* |
| Gorgas Pond | 0 | 582.2 | 0 | 0 | 17.25 | 16.34 | 1.27* |
| Miller | 0 | 761 | 0 | 0 | 15.35 | 9.345 | 2.38* |
| CounterCurrent Test 1 (Stirrer) | 0 | 573.8 | 0 | 0 | 22.17 | 251.3 | no analysis |
| CounterCurrent Test 2 (Stirrer) | 0 | 316.7 | 0 | 0 | 26.71 | 311.4 | no analysis |
| CounterCurrent Test 3 (Stirrer) | 0 | 182.8 | 0 | 0 | 28.48 | 677.1 | no analysis |
| CounterCurrent Test 4 (Ultrasonic) | 0 | 172.9 | 0 | 0 | 16.75 | 14.85 | no analysis |
| CounterCurrent Test 5 (Ultrasonic) | 0 | 139.6 | 0 | 0 | 16.34 | 15.88 | no analysis |
| CounterCurrent Test 6 (Ultrasonic) | 0 | 150.8 | 0 | 3.242 | 16.8 | 31.87 | no analysis |
| Counter Current Test 7 (Stirrer) | 0 | 110.1 | 0 | 0 | 16.96 | 35.76 | no analysis |
| Counter Current Test 8 (Stirrer) | 14.56 | 20.39 | 0 | 0 | 17.83 | 16.96 | no analysis |
| Counter Current Test 9 (Stirrer) | 0 | 8.601 | 0 | 9.733 | 17.46 | 16.03 | no analysis |
| Counter Current Test 10 (Ultrasonic) | 0 | 239.7 | 0 | 0 | 18.75 | 16.29 | no analysis |
| Counter Current Test 11 (Ultrasonic) | 11.9 | 154.8 | 0 | 0 | 18.89 | 17.76 | no analysis |
| Counter Current Test 12 (Ultrasonic) | 0 | 35.19 | 0 | 0 | 18.39 | 14.53 | no analysis |
| Commercially Available Ammonium Sulfate | 0 | 0 | 0 | 7.751 | 4.485 | 32.8 | 0.00250* |

Note:
Samples containing an * indicated they were tested by Southern Environmental Testing using Cold Vapor Absorption Method for Mercury. Information provided by Miller Plant personnel indicates that the mercury level in the sample was atypical and the normal level is about 1.2 ppm.

TABLE 12

CONTAMINANT AND TRACE METAL ANALYSIS (AMMONIUM SULFATE PRODUCT SOLUTIONS)

| Sample Name | Al PPM | Sb PPM | As PPM | B PPM | Ba PPM | Be PPM | Ca PPM | Cd PPM | Co PPM | Cr PPM | Cu PPM | Fe PPM | K PPM |
|---|---|---|---|---|---|---|---|---|---|---|---|---|---|
| Test # 5 Ammonium Sulfate Product Solution | 0.102 | 0.013 | 0.154 | 9.213 | 0.008 | 0.002 | 310 | 0.011 | 0.005 | 0 | 0.03 | 0 | 1.504 |
| Test # 6 Ammonium Sulfate Product Solution | 0.061 | 0.013 | 0.284 | 10.45 | 0.006 | 0 | 133.7 | 0.16 | 0.003 | 0 | 0.026 | 0.006 | 1.458 |
| Test # 11 Ammonium Sulfate Product Solution | 0.228 | 0.034 | 0.169 | 15.21 | 0.018 | 0.001 | 33.99 | 0.008 | 0.004 | 0 | 0.029 | 0.096 | 1.035 |

TABLE 12-continued

CONTAMINANT AND TRACE METAL ANALYSIS (AMMONIUM SULFATE PRODUCT SOLUTIONS)

| Test # 12 Ammonium Sulfate Product Solution | 0.428 | 0.029 | 0.393 | 19.4 | 0.027 | 0 | 70.1 | 0.017 | 0.003 | 0.001 | 0.04 | 0.212 | 2.017 |

| Sample Name | Mg PPM | Mm PPM | Mo PPM | Na PPM | Ni PPM | Pb PPM | Se PPM | Si PPM | Ti PPM | Tl PPM | V PPM | Zn PPM | Hg PPM |
|---|---|---|---|---|---|---|---|---|---|---|---|---|---|
| Test # 5 Ammonium Sulfate Product Solution | 7.474 | 0.002 | 0.042 | 0.702 | 0.015 | 0.008 | 0.598 | 0.51 | 0 | 0 | 0.032 | 0.021 | 0.007* |
| Test # 6 Ammonium Sulfate Product Solution | 9.06 | 0 | 0.035 | 0.45 | 0.006 | 0.009 | 1.037 | 1.578 | 0 | 0 | 0.06 | 0.069 | 0.00249* |
| Test # 11 Ammonium Sulfate Product Solution | 3.754 | 0.001 | 0.033 | 0.666 | 0.011 | 0.004 | 0.294 | 1.539 | 0.04 | 0 | 0.021 | 0.005 | 0.00503* |
| Test # 12 Ammonium Sulfate Product Solution | 16.19 | 0.002 | 0.037 | 0.79 | 0.009 | 0.009 | 1.585 | 3.071 | 0.067 | 0 | 0.096 | 0.048 | 0.0041* |

Note:
Samples containing an * indicated they were tested by Southern Environmental Testing using Cold Vapor Absorption Method for Mercury Test 2
Process for Removal of Selenium and Other Metals from the FGD Gypsum Employed by the Process of the Present Invention Processes were developed to remove selenium and other possible metal contaminants from FGD gypsum. The processes ensure that the process of the present invention produces ammonium sulfate and calcium carbonate products having high purity with few contaminants.

The FGD gypsum samples were obtained from the previously referenced Miller Power Plant, Alabama. Product samples of calcium carbonate and ammonium sulfate solution were produced by a multistage countercurrent continuous process which simulates the process as shown in FIG. 1.

FGD gypsum samples were collected from various locations in the gypsum storage building at the Miller Plant. These, along with a slurry gypsum sample collected from the slurry pipe line from the scrubber before filtration, were analyzed for selenium using an ICP-OES (Inductively-Coupled Plasma-Optical Emission Spectrometer) machine. Selenium concentrations in the gypsum samples ranged from <4 to 19 ppm. Magnesium and aluminum concentrations were spot checked in the gypsum sample containing the highest concentration of selenium and were analyzed at 544 and 919 ppm respectively. Barium and mercury concentrations was also spot checked for two gypsum samples that contained the highest concentration of selenium and the analysis ranged from 73-148 ppm barium and 1.35-2.05 ppm mercury respectively. The samples contained no significant levels of arsenic, cadmium, chromium, nickel, or lead.

Preparation of Samples

FGD gypsum samples were collected at the Miller Plant from various locations in the storage building. Also, a gypsum slurry sample was obtained from the slurry line before filtration. A small portion of each gypsum sample collected was dried in a laboratory oven at 50° C. overnight. The moisture content of each sample was calculated. The dried portion of each sample was used in the determination of selenium and other possible metal contaminants (See below Table 13A and Table 13B). The slurry sample, however, was handled slightly differently. The liquid portion was decanted off and collected in a separate container. The solid portion was sampled and placed in the laboratory oven at 50° C. overnight. The dried solid portion was analyzed for selenium and other possible metal contaminants (See Table 13A and Table 13B).

Table 13

TABLE 13A

Miller FGD Gypsum Samples Analysis Summary

| Sample Name | Percent Moisture (%) | Selenium (ppm Se) | Aluminum (ppm Al) | Magnesium (ppm Mg) |
|---|---|---|---|---|
| 6-4 or 5-13 Product | 12.83 | 10.98 | | |
| 6-5&6-13 Product | 15.08 | 12.74 | | |
| 6-6-13 Product | 13.01 | 10.83 | | |
| 6-6 or 7-13 Product | 13.72 | 9.649 | | |
| 6-7-13 Product | 13.13 | 5.254 | | |
| 6-8-13 Product | 13.80 | 13.24 | | |
| 6-9-13 Product | 12.62 | <4 | | |
| 6-10 or 11-13 Product | 13.47 | 14.66 | 544.3 | 918.7 |
| 6-12-13 Morning | 14.05 | 9.654 | | |
| 6-12-13 Today | 13.98 | 8.476 | | |
| Oldest Material in Barn 1 | 13.42 | 9.953 | | |
| Oldest Material in Barn 2 | 13.39 | 10.94 | | |
| Belt | 14.71 | 8.906 | | |
| 6-12-13 Slurry Solids | 37.90 | 19.24 | | |
| 6-12-13 Slurry Liquid | N/A | <4 | | |

Note
4 ppm of selenium in sulfuric acid is the detection limit of the ICP machine due to interference of the argon carrier gas with selenium.

TABLE 13B

Miller FGD Gypsum Samples Analysis Summary

| Sample Name | Arsenic (ppm As) | Cadmium (ppm Cd) | Chromium (ppm Cr) | Nickel (ppm Ni) | Lead (ppm Pb) | Barium (ppm Ba) | Mercury (ppm Hg) |
|---|---|---|---|---|---|---|---|
| 6-10or11-13 Product | 0.000 | 0.146 | 2.637 | 2.042 | 0.000 | 73.90 | 1.35 |
| 6-12-13 Slurry Solids | 0.000 | 0.477 | 2.456 | 1.846 | 0.000 | 148.0 | 2.05 |
| 6-12-13 Slurry Liquid | 0.000 | 0.219 | 0.363 | 0.583 | 0.000 | 4.297 | 0.00549 |

Acid Rinse Process to Remove Contaminants

Filter Rinse Test:

The filter rinse test was performed by first producing a filter cake, rinsing the filter cake with a solution containing sulfuric acid, rinsing the filter cake with water, and finally analyzing the filter cake and the sulfuric acid rinse solution for selenium. The gypsum sample with the highest concentration of selenium, sample labeled Jun. 10 or 11, 2013 Product, was selected to be used in the production of the filter cakes.

The filter cake was produced by adding a known amount of water, approximately 100 grams, to a known amount of gypsum (June-10 or 11-2013 Product), approximately 40 grams, and mixing with a stir rod to produce a slurry. The slurry was then filtered using a Buchner funnel, a GFA filter paper (pore size=8 microns), a filter flask, and a laboratory vacuum pump to produce a filter cake of gypsum approximately 0.25 in. thickness. The liquid in the filter flask was collected for analysis of aluminum, magnesium, and selenium. The results are shown in the table on the next page (See Table 14B).

The next step in the process was to rinse the filter cake with a sulfuric acid solution. The concentrations of the sulfuric acid solutions were varied to determine the ideal sulfuric acid solution concentration for the maximum removal of selenium from the gypsum. The approximately 865 ml of sulfuric acid solution used was determined by maintaining the sample to acid ratio used in an acid digestion of the material (1 g sample=25 ml acid solution). The filter cake was rinsed with the sulfuric acid solution by pouring a small portion of the solution into the Buchner funnel containing the filter cake without vacuum to ensure complete filter cake coverage. Then, the vacuum was applied, and the entire solution was poured through the filter cake. Again, the liquid was collected for analysis (See Table 14A).

Finally, the filter cake was rinsed with deionized water to remove any residual sulfuric acid solution. The amount of water used to rinse the sample was approximately 865 ml. The deionized water was poured into the Buchner funnel without vacuum to ensure complete filter cake coverage. Then, the vacuum was applied, and the entire solution was vacuumed through the filter cake. The liquid in the filter flask was collected and saved for analysis. In the initial tests, the filter cake was rinsed a second time using the same method. After analysis of the water rinse solutions, it was decided that a single rinse was sufficient to remove the sulfuric acid solution for the filter cake in the later tests due to the fact that no metals were detected.

The filter cake was then carefully removed from the Buchner funnel. The filter cake was placed in a laboratory oven at 50° C. overnight. Once the filter cake was dried, it was digested with nitric acid and analyzed for selenium (Se), aluminum (Al) and magnesium (Mg) using the Inductively-Coupled Plasma-Optical Emission Spectrometer (ICP-OES) (See Table 14A).

Table 14

TABLE 14A

Filter Rinse Test Summary

| Test Number | Sulfuric Acid Solution (%) | Filter Cake ppm Se | Sulfuric Acid Filtrate ppm Se | Filter Cake ppm Al | Filter Cake ppm Mg |
|---|---|---|---|---|---|
| 062513-05 | 0 | 12.99 (11) | N/A | N/A | N/A |
| 062513-01 | 0.1 | 4.213 (71) | 7.415 | 446.5 (18) | 495.5 (46) |
| 062713-01 | 0.5 | <4 (>73) | 11.280 | 358.0 (34) | 162.8 (82) |
| 062713-02 | 1 | <4 (>73) | 10.12 | 382.6 (30) | 110.6 (88) |

TABLE 14A-continued

Filter Rinse Test Summary

| Test Number | Sulfuric Acid Solution (%) | Filter Cake ppm Se | Sulfuric Acid Filtrate ppm Se | Filter Cake ppm Al | Filter Cake ppm Mg |
|---|---|---|---|---|---|
| 062713-03 | 2 | <4 (>73) | 10.44 | 402.7 (26) | 294.1 (68) |
| 062713-04 | 3 | <4 (>73) | 10.83 | 376.0 (31) | 230.3 (75) |
| 062713-05 | 4 | <4 (>73) | 11.99 | 360.1 (34) | 96.65 (89) |
| 062513-02 | 5 | <4 (>73) | 10.84 | N/A | N/A |
| 062713-06 | 5 | <4 (>73) | 12.39 | 346.3 (36) | 83.43 (91) |

Note 4 ppm of selenium in sulfuric acid is the detection limit of the ICP machine due to interference of the argon carrier gas with selenium.

Percent reduction from the original gypsum sample is shown in parentheses.

TABLE 14B

Water From Filter Cake Preparation Analysis

| Test Number | Water Rinse ppm Al | Water Rinse ppm Mg | Water Rinse ppm Se |
|---|---|---|---|
| 062513FC02 | 3.346 | 30.88 | 0.007 |
| 062513FC03 | 0.675 | 25.21 | 0.009 |
| 062513FC04 | 2.030 | 24.72 | 0.012 |

Note

The ICP machine was able to detect selenium levels below 4 ppm due to water only being used in the rinse and sulfuric acid being absent.

Slurry Tank Process to Remove Contaminants

Slurry Tank Simulation for Large Vessel and Small Vessel:

The slurry tank simulation was performed by producing slurry composed of gypsum and sulfuric acid solution and allowing the slurry to mix for a certain amount of time in a slurry tank (reactor) vessel, filtering the slurry to produce a filter cake, rinsing the filter cake with water, and finally analyzing the filter cake and the slurry filtrate solution for selenium. The gypsum sample with the highest concentration of selenium, Jun. 10 or 11, 2013 Product, was selected to be used in the production of the slurries.

The slurry was produced by adding a known amount of gypsum, approximately 40 grams, to sulfuric acid solution. The concentration of the sulfuric acid solution was varied to determine the ideal sulfuric acid solution concentration for the maximum removal of selenium from the gypsum.

Two different volumes, 100 ml (small volume) and 865 ml (large volume), of sulfuric acid solution were used to determine the volume of sulfuric acid necessary for the removal of selenium from the gypsum. The sulfuric acid solutions were allowed to cool to room temperature (approximately 20-25° C.) before being used in the production of the slurries. The slurry was allowed to stir for 15 minutes. The slurry was then filtered by using a Buchner funnel, a GFA filter paper, a filter flask, and a laboratory vacuum pump to produce a filter cake of gypsum on top of the filter paper inside the Buchner funnel. The liquid in the filter flask was collected and saved for possible analysis (See Table 15A and Table 15B).

Finally, the filter cake was rinsed with deionized water to remove any left behind sulfuric acid solution. The amount of water used to rinse the sample was 100 ml or 865 ml. The deionized water was poured into the Buchner funnel without vacuum to ensure complete filter cake coverage. Then, the vacuum was applied, and the entire solution was vacuumed through the filter cake. The liquid in the filter flask was collected and saved for analysis.

The filter cake was then carefully removed from the Buchner funnel. The filter cake was placed in a laboratory oven at 50° C. overnight. After the filter cake was dried, it was digested with nitric acid and analyzed for selenium (Se), aluminum (Al) and magnesium (Mg) using the Inductively-Coupled Plasma-Optical Emission Spectrometer (ICP-OES) (See Table 15A for small vessel results and Table 15B for large vessel results).
Table 15 from the gypsum. The slurry was allowed to stir for 15 minutes using a hot plate stirrer to prevent settling of the gypsum. The slurry was then filtered by using a Buchner funnel, a GFA filter paper, a filter flask, and a laboratory vacuum pump to produce a filter cake of gypsum on top of the filter paper inside the Buchner funnel. The liquid in the filter flask was collected and saved for possible analysis (See Table 4).

TABLE 15A

Slurry Tank Test - Small Volume of Sulfuric Acid Solution
(100 ml volume)

| Test Number | Sulfuric Acid Solution Volume (mL) | Sulfuric Acid Solution Concentration (%) | Mixing Time (min) | Filter Cake ppm Se | Sulfuric Acid Filtrate ppm Se | Filter Cake ppm Al | Filter Cake ppm Mg |
|---|---|---|---|---|---|---|---|
| 062713-09 | 100 | 0 | 15 | 15.13 (0) | <4 | 642.2 (0) | 976.0 (0) |
| 062713-07 | 100 | 0.1 | 15 | 12.19 (17) | <4 | 516.8 (5) | 1088 (0) |
| 062713-08 | 100 | 0.5 | 15 | 4.791 (67) | 6.307 | 323.7 (41) | 460.6 (50) |
| 062713-09A | 100 | 5 | 15 | <4 (>73) | 10.20 | 399.2 (27) | 110.4 (88) |

*Note -
Percent reduction from the original gypsum sample is shown in parentheses.

TABLE 15B

Slurry Tank Simulation - Large Volume of Sulfuric Acid Solution
(865 ml volume)

| Test Number | Sulfuric Acid Solution Volume (mL) | Sulfuric Acid Solution Concentration (%) | Mixing Time (min) | Filter Cake ppm Se | Sulfuric Acid Filtrate ppm Se | Filter Cake ppm Al | Filter Cake ppm Mg |
|---|---|---|---|---|---|---|---|
| 062713-10 | 865 | 0.1 | 15 | 5.067 (65) | 9.392 | 440.7 (19) | 264.8 (71) |
| 062713-11 | 865 | 0.5 | 15 | 4.735 (68) | 11.53 | 387.7 (29) | 136.2 (85) |
| 062713-12 | 865 | 5 | 15 | <4 (>73) | 13.03 | 329.5 (39) | 92.76 (90) |

* Note -
4 ppm of selenium in sulfuric acid is the detection limit of the ICP machine due to interference of the argon carrier gas with selenium.
*Percent reduction from the original gypsum sample is shown in parentheses.

Heated Slurry Tank Process to Remove Contaminants
Heated Slurry Tank Simulation for Small Vessel:

The heated slurry tank simulation was performed by producing a slurry of gypsum and sulfuric acid solution, heating and maintaining the slurry at 65-85° C. and allowing the slurry to mix for a certain amount of time, filtering the slurry to produce a filter cake, rinsing the filter cake with water, and finally analyzing the filter cake and the slurry filtrate solution for selenium. The gypsum sample with the highest concentration of selenium, Jun. 10 or 11, 2013 Product, was selected to be used in the production of the slurries.

The slurry was produced by adding a known amount of gypsum, approximately 40 grams, to sulfuric acid solution to a small volume vessel as in the above described unheated small vessel slurry tank simulation. The concentration of the sulfuric acid solution was varied to determine the ideal sulfuric acid solution concentration for the removal of selenium Finally, the filter cake was rinsed with deionized water to remove any left behind sulfuric acid solution. The amount of water used to rinse the sample was 100 ml. The deionized water was poured into the Buchner funnel without vacuum to ensure complete filter cake coverage. Then, the vacuum was applied, and the entire solution was vacuumed through the filter cake. The liquid in the filter flask was collected and saved for analysis.

The filter cake was then carefully removed from the Buchner funnel. The filter cake was placed in a laboratory oven at 50° C. overnight. After the filter cake was dried, it was digested with nitric acid and analyzed for selenium (Se), aluminum (Al) and magnesium (Mg) using the Inductively-Coupled Plasma-Optical Emission Spectrometer (ICP-OES) (See Table 16).

TABLE 16

Heated Slurry Tank Simulation

| Test Number | Sulfuric Acid Solution Volume (ml) | Sulfuric Acid Solution Concentration (%) | Mixing Time (min) | Filter Cake ppm Se | Sulfuric Acid Filtrate ppm Se | Filter Cake ppm Al | Filter Cake ppm Mg |
|---|---|---|---|---|---|---|---|
| 062713-13 | 100 | 0.1 | 15 | 9.599 | <4 | 454.4 | 995.7 |
| 062713-14 | 100 | 0.5 | 15 | 5.806 | 6.670 | 388.8 | 450.9 |

* Note -
4 ppm of selenium in sulfuric acid is the detection limit of the ICP machine due to interference of the argon carrier gas with selenium.

Process for Removing Selenium from Contaminant Removal Process Sulfuric Acid Waste Filtrate Activated Carbon Filtration Tests:

The purpose of the filtration tests was to determine if activated carbon could be used to remove selenium from the sulfuric acid filtrate. This would allow the sulfuric acid solution to be reused during the selenium removal process. A chromatography column was filled with approximately 159 grams of activated carbon. The activated carbon filter column was mounted to a ring stand to ensure gravity flow filtration. The sulfuric acid filtrate with the highest concentration of selenium, 5% $H_2SO_4$ Large Volume Slurry Sulfuric Acid Filtrate, was used in both activated carbon filtration tests.

Single Pass Filtration Test

Approximately 250 ml of the sulfuric acid filtrate was poured into the top of the chromatography column. Approximately 75 ml of the sulfuric acid filtrate solution passed through the column since the dry charcoal absorbed the majority of the sulfuric acid filtrate. The solution that passed through the column was collected and saved for analysis (See Table 17).

Double Pass Filtration Test

Approximately 250 ml of the sulfuric acid filtrate was poured into the top of the chromatography column containing the activated carbon that was used in the single pass filtration test. Approximately 250 ml of the sulfuric acid filtrate solution passed through the column. The solution that passed through the column was collected and was poured into the top of the chromatography column a second time. Approximately 250 ml of the sulfuric acid filtrate solution passed through the column. The solution that passed through the column was collected and saved for analysis (See Table 17).

TABLE 17

Activated Carbon Filter Tests

| Number of Passes | Before Activated Carbon Filter Treatment | | | After Activated Carbon Filter Treatment | | |
|---|---|---|---|---|---|---|
| | ppm Se | ppm Al | ppm Mg | ppm Se | ppm Al | ppm Mg |
| 1 | 13.03 | 291.6 | 1395 | <4 | 533.0 | 750.7 |
| 2 | 13.03 | 291.6 | 1395 | <4 | 361.5 | 532.2 |

* Note -
4 ppm of selenium in sulfuric acid is the detection limit of the ICP machine due to interference of the argon carrier gas with selenium.
* Note -
The charcoal may have contained some aluminum since the aluminum concentration increased in the filtrate solution after passing through the charcoal.

Air Stack Samples:

A separate study was conducted to determine if the stack exhaust gases contained selenium and other possible metal contaminates. It is anticipated that the ammonium sulfate employed in the process of the present invention will be produced by taking stack exhaust carbon dioxide and reacting it with ammonium in a separate reactor and process. Contaminants in the withdrawn exhaust gas could introduce contaminants into the process of the present invention and thus into the process products of ammonium sulfate and calcium carbonate.

Samples of stack exhaust gases were collected at the Miller Plant location using a standard method V stack sampling apparatus. Aqua ammonia (14% ammonia) was loaded into two impingers in series. Gas from the stack was pulled through the impingers. The carbon dioxide ($CO_2$) in the stack gas reacted with ammonia to make ammonium carbonate or ammonium bi-carbonate. This was to simulate a possible full scale process. Then, the samples were analyzed on the on the ICP-OES to determine the concentrations of selenium in each sample. Some of the samples could not be analyzed on the ICP-OES due to the sample extinguishing the flame on the ICP-OES. No significant amount of selenium was detected in any of the samples (See Table 18).

TABLE 18

Air Stack Sample Analysis Summary

| Sample Number | Description | pH | ppm Se |
|---|---|---|---|
| 070213-1-1 | Run 1 Filter Cake Rinse | 8.11 | <4 |
| 070213-1-2 | Run 1 Impinger 1 | 9.07 | <4 |
| 070213-1-3 | Run 1 Impinger 1 Rinse | 9.06 | <4 |
| 070213-1-4 | Run 1 Impinger 2 | 9.73 | * |
| 070213-1-5 | Run 1 Impinger 2 Rinse | 9.45 | <4 |
| 070213-2-1 | Run 2 Filter Cake Rinse | 9.05 | <4 |
| 070213-2-2 | Run 2 Impinger 1 | 9.06 | <4 |
| 070213-2-3 | Run 2 Impinger 1 Rinse | 9.09 | <4 |
| 070213-2-4 | Run 2 Impinger 2 | 9.72 | * |
| 070213-2-5 | Run 2 Impinger 2 Rinse | 9.45 | <4 |
| 070213-3-1 | Run 3 Filter Cake Rinse | 8.62 | <4 |
| 070213-3-2 | Run 3 Impinger 1 | 8.99 | <4 |
| 070213-3-3 | Run 3 Impinger 1 Rinse | 9.08 | <4 |
| 070213-3-4 | Run 3 Impinger 2 | 9.72 | * |
| 070213-3-5 | Run 1 Impinger 2 Rinse | 9.46 | <4 |
| 070213-C-1 | Impinger 3 Rinse 1, 2, 3 | 9.57 | <4 |
| 070213-B-1 | DI Blank | 9.19 | <4 |
| 070213-B-2 | $NH_3$ Only Blank | 12.88 | * |

Note
Sample extinguished the flame.
Note
4 ppm of selenium in sulfuric acid is the detection limit of the ICP machine due to interference of the argon carrier gas with selenium.

Discussion of Test Results

Filter cakes were first prepared by slurrying the gypsum sample containing the highest concentration of selenium with water and vacuum filtering to produce an approximate 0.25 inch thick filter cake. Secondly each filter cake was rinsed with sulfuric acid solutions ranging in concentration from 0.1 to 5%, vacuum filtered, and then rinsed with deionized water and vacuum filtered to remove any of the sulfuric acid solution. Regardless of sulfuric acid concentration, all of the solutions removed selenium from the filter cakes to 4 ppm or less (71 to 73% reduction, could be as great as 100%). Four ppm is the minimum detectable limit of selenium in the ICP machine in sulfuric acid solutions due to interferences caused by the ICP's argon carrier gas. Aluminum concentration in the filter cake was slightly reduced by the sulfuric acid solution rinse (18 to 36% reduction) and magnesium concentration was significantly reduced (46 to 91% reduction), especially when using the higher concentration sulfuric acid solutions. The water used in preparing the filter cakes was analyzed for magnesium, aluminum, and selenium, and no significant concentrations were found.

The most desirable acids for use in this process of removing undesirable metals are those that contain sulfur and oxygen (example sulfuric acid ($H_2SO_4$) and sulfurous acid ($H_2SO_3$)). This is because no additional compounds should be produced that are not already present in the gypsum since its chemical structure is $CaSO_4\text{-}2H_2O$ (the $SO_4$ is already present and the acid does not introduce any new elements).

Other sulfur-oxygen acids, including dithionous acid (hydrosulfurous acid, $H_2S_2O_4$), pyrosulfuric acid ($H_2S_2O_7$), pyrosulfurous acid ($H_2S_2O_5$), and Sulfoxylic Acid ($H_2SO_2$) are optionally employed, as well as combinations of sulfur-oxygen acids.

Acid Rinse Contaminant Removal Process

Se—71 to 73% reduction, and approximately 100% reduction can be achieved.

Mg—46 to 91% reduction

Al—18 to 36% reduction

Based upon the results from the acid rinse contaminant removal process the process operates as follows:

Mix water with FGD gypsum if necessary to ensure a solids content of 15 to 25% and preferably of 20% solids. At ambient temperature (20-25° C.), introduce the FGD gypsum slurry to a gravity or vacuum filter and filter the gypsum slurry to result in a filter cake. Rinse the filter cake with an aqueous solution containing sulfuric acid from 0.01 to 10% concentration and preferably 0.1 to 5% concentration, discarding the filtrate or saving it for purification. Rinsing the resulting filter cake with water, to remove any residual sulfuric acid solution and discarding the rinse water or saving it for purification. The dilute sulfuric acid filtrate can be recycled and cleaned using activated carbon to remove the contaminants.

To result in higher purity process products and in particular, product calcium carbonate, an additional process step is employed to remove possible contaminates from the incoming gypsum. FGD gypsum may contain contaminates such as selenium, magnesium, and aluminum, as well as other contaminants. The contaminates are present in the coal and after combustion are scrubbed from the flue gas. The intent of this process is to treat the incoming FGD gypsum to remove these contaminates prior to entering the gypsum conversion process. FIG. 3 shows a process flow diagram for one embodiment of the contaminate removal acid rinse process of the present invention utilizing an acid rinse to remove contaminants. Sulfuric acid reacts with the contaminates to form soluble sulfate salts which can be washed out and removed from the gypsum.

One embodiment of the acid rinse purification process is shown in FIG. 3. With reference to FIG. 3, aqueous Gypsum Slurry (60) from the FGD gypsum scrubber is continuously fed to Filter No. 1 (62) which is a continuous belt filter. The belt filter is divided into three zones, Zone A, Zone B and Zone C. Zone A removes the water and forms the initial filter cake. The filtrate from Zone A goes to Waste (66) or a waste water treatment process. In Zone B, Sulfuric Acid Solution (61), ranging from 0.1 to 10% and preferably 0.1 to 5.0% sulfuric acid concentration, is passed over the cake to react with and wash out contaminants. Filtrate from Zone B may be discarded or is cleaned by contacting the acid solution over Activated Carbon (67) which removes the contaminates. The clean Sulfuric Acid (69) is recycled to the process beginning.

This contaminant removal process integrates into the beginning of the FGD gypsum conversion process of the present invention, shown in either FIG. 1 or FIG. 2. In FIG. 3, Filter 1 (62), Zone C, ammonium sulfate solution product (from the gypsum conversion process) is passed over the gypsum filter cake to result in Clean Gypsum Filter Cake (65). This is to allow any un-reacted ammonium carbonate present in the ammonium sulfate solution product to react with gypsum and residual sulfuric acid. Contaminates can be removed from the activated carbon by processes known in the art.

With reference to FIGS. 1 and 2, the acid rinse purification process would be integrated with the countercurrent process to be one process wherein the gypsum filter cake that is formed on FIG. 1, Filter A (5) or FIG. 2, Filter 1 (32) after the initial water wash, is rinsed with dilute sulfuric acid. This requires a filter that is capable of two separate washes and the capability to keep the two filtrate streams separate.

The clean, purified gypsum filter cake would contain some residual sulfuric acid, however, this would not cause any problems downstream because the sulfuric acid will react with ammonium carbonate to form ammonium sulfate.

With respect to the slurry tank reactor contaminant removal process, filter cakes were again prepared from the gypsum sample containing the highest selenium concentration and allowed to react with varying concentrations of sulfuric acid solutions in a small volume (100 ml) reactor and large volume (865 ml reactor). Mixing times were held constant at 15 minutes. The selenium removal was limited in the small volume reactor using 0% and 0.1% acid solutions (17% reduction) but selenium was removed down to 4.8 ppm or below with 0.5% and 5% acid solutions (67 to 73% reduction, could be as great as 100%). Magnesium and aluminum removal was also significant with the higher concentration acid solutions (27 to 88% reduction). In the larger volume reactor, selenium removal was effective down to 5 ppm or below regardless of the acid solution concentrations (65 to 73% reduction, could be as great as 100%). This also was true for magnesium and aluminum (19 to 90% reduction). The acid solution temperatures recorded during this series of tests was 20-25° C. The small reactor test was re-run using 0.1% and 0.5% sulfuric acid solutions but the reactor temperature was increased to 65-85° C. These tests showed no significant improvement in the removal of selenium, magnesium, or aluminum over the tests conducted at 20-25° C.

Slurry Tank Contaminant Removal Process—Small Volume Vessel

Se—67 to 73% reduction, and approximately 100% reduction can be achieved.

Mg—27 to 88% reduction

Al—27 to 88% reduction

Slur Tank Contaminant Removal Process—Large Volume Vessel

Se—65 to 73% reduction, and approximately 100% reduction can be achieved.

Mg—19 to 90% reduction

Al—19 to 90% reduction

The filtrate containing the highest level of selenium was passed through a column of activated carbon in a single pass test and a double pass test. In both tests, selenium was removed in the filtrate from 13 ppm to less than 4 ppm. Magnesium removal was also significant in the filtrate.

Based upon the results from the slurry tank contaminant removal process the process operates as follows:

Mix water with FGD gypsum if necessary to ensure a solids content of 15 to 25% and preferably of 20% solids. At ambient temperature (20-25° C.), introduce the FGD gypsum slurry to a reactor vessel and introduce aqueous solution of sulfuric acid from 0.01 to 10.0% concentration and preferably 0.1 to 5.0% concentration to the vessel and mix by means including a paddle, screw, impeller or agitator mixer for a time of 5 to 20 minutes (preferably 15 minutes) for adequate reaction. Introducing the resulting reacted slurry to a gravity or vacuum filter to produce a filter cake, discarding the filtrate. Rinsing the resulting filter cake with water to remove any residual sulfuric acid solution.

With reference to the test data for the slurry tank process, a smaller reactor vessel would handle a gypsum slurry of about 0.4 grams gypsum/ml solids content and a larger reactor vessel would handle a gypsum slurry of about 0.046 grams gypsum/ml solids content.

Another embodiment of the process of the present invention for removing contaminates from FGD gypsum is shown in FIG. 4. FIG. 4 shows a process flow diagram for a contaminate removal slurry tank process wherein sulfuric acid is mixed with the FGD gypsum in a reactor to react and produce salts of contaminants which are in solution and purified FGD gypsum is removed by filtration.

With reference to FIG. 4, aqueous Gypsum Slurry (80) from a FGD scrubber is continuously filtered to remove the water from the gypsum using Filter 1 (81) which is a continuous belt filter. The belt filter is divided into two zones, Zone A and Zone B. Gypsum cake (83) is continuously fed to a Reactor (85) equipped with a Mixer (84) for agitating the contents of Reactor (85). Sulfuric acid Solution (82), containing 0.01 to 10.0% and preferably 0.1 to 5.0% concentration sulfuric acid, is metered to the Reactor (85). Residence time in the Reactor (85) is 5 to 20 minutes and preferably about 15 minutes. The temperature in the Reactor (85) is in the range of 70 to 185° F. Effluent from the Reactor (85) is continuously filtered utilizing Filter 2 (89) which is a continuous belt filter, divided into two zones, Zone A and Zone B. In Filter 2 (89) Zone A, the clean gypsum is filtered and then filtrate from Zone A may be discarded or cleaned by passing the filtrate over Activated Carbon (92) to remove the contaminates from the acid solution. The Clean Sulfuric Acid Solution (94) is recycled to the process beginning. In Filter 2 (89) Zone B, Ammonium Sulfate Solution Product (88) is passed over filter cake which becomes Clean Gypsum Cake (90) to allow any un-reacted ammonium carbonate to react with the incoming gypsum and residual sulfuric acid.

This slurry tank contaminant removal process integrates into the beginning of the FGD gypsum conversion process of the present invention, shown in either FIG. 1 or FIG. 2. In FIG. 4, Filter 2 (89), Zone B, ammonium sulfate solution product (from the gypsum conversion process) is passed over the gypsum filter cake to result in Clean Gypsum Filter Cake (90). This is to allow any un-reacted ammonium carbonate present in the ammonium sulfate solution product to react with gypsum and residual sulfuric acid. Contaminates can be removed from the activated carbon by processes known in the art.

With further reference to FIGS. 1 and 2, the slurry tank purification process would be integrated with the countercurrent process to be one process wherein a belt filter is employed as FIG. 1, Filter A (5) and as FIG. 2, Filter 1 (32), Zone A to remove water from the gypsum slurry then a water wash is applied to the gypsum filter cake. The gypsum filter cake is then added to an additional reactor where it would be mixed with sulfuric acid solution to react with and remove contaminants. Then an additional filter would be used to separate the clean gypsum from the filtrate. A small water rinse may also be required to remove dilute sulfuric acid, which contains the contaminants. The clean gypsum would then enter FIG. 1, Reactor No. 1 (8) or FIG. 2, Reactor No. 1 (36). The dilute sulfuric acid filtrate can be recycled and cleaned using activated carbon to remove the contaminants.

The clean, purified gypsum filter cake would contain some residual sulfuric acid, however, this would not cause any problems downstream because the sulfuric acid will react with ammonium carbonate to form ammonium sulfate.

The use of activated carbon was tested as a process for removing selenium from the sulfuric acid filtrate resulting from both the acid rinse and slurry tank contaminant removal processes. Both single pass and double pass tests were performed with selenium reduced in a single pass to less than 4 ppm and magnesium was also significantly reduced. The amount of selenium could have been even less because 4 ppm is the lower limit of quantitative detection.

Based upon the results from the activate carbon process for removing contaminants from the acid filtrate operates as follows:

Introduce the acid filtrate to an activated carbon column at ambient temperature to yield purified water with at least 69% reduction in Se concentration and reduction in other contaminants. Optionally, introduce the purified water to the same activated carbon column under the same operating conditions to yield a more purified water with further reduction in aluminum and magnesium contaminants.

No further reduction in selenium concentration could be detected after the second pass because the first pass reduced the concentration of selenium to below the quantitative detection level.

Stack samples collected at the scrubber exit air discharge of Alabama Power's Miller Plant were also analyzed. Gas sample were bubbled through 14% aqua ammonium solution to produce ammonium carbonate. The intent was to simulate ammonium carbonate production as will be demonstrated in the full scale production. A total of four samples were collected and analyzed. All of the samples showed selenium levels of 4 ppm or below. In performing the tests, a sample of stack gas was pulled from the stack to make ammonium carbonate by reacting aqua ammonia with the carbon dioxide in the stack gas. When the ammonium carbonate solution was analyzed, no selenium was detected.

Summary—Contaminant Removal Processes

The FGD gypsum produced at the Miller Plant contains selenium in the range of <4 to 19 ppm as well as magnesium and aluminum. The samples contained no significant levels of arsenic, cadmium, chromium, nickel, or lead. Barium and mercury concentrations was also spot checked for two gypsum samples that contained the highest concentration of selenium and the analysis ranged from 73-148 ppm barium and 1.35-2.05 ppm mercury respectively. Selenium was removed down to insignificant levels (<4 ppm) from 15 ppm by producing a filter cake of the gypsum, rinsing the cake with sulfuric acid and deionized water rinses, and vacuum filtering the cake after the rinses. Magnesium removal was also significant whereas aluminum removal was slightly less effective. Differing concentrations of sulfuric acid (0.1 to 5%) were used in the rinses to try and determine the most effective concentration. All of the concentrations were successful in removing the selenium down to 4 ppm or less. Magnesium removal increased as the sulfuric acid concentration increased: 496 ppm remaining with 0.1% acid solution and 83 ppm remaining with 5% acid solution. Aluminum removal remained about the same regardless of acid solution concentration.

Gypsum filter cakes and sulfuric acid solutions of varying concentrations (0.1 to 5%) were also mixed for 15 minutes in a small slurry tank, reactor vessel (100 ml of acid solution used) and a large reactor vessel (865 ml of acid solution used). The cake was then vacuum filtered and rinsed with water before being analyzed for the contaminant metals. This method did not prove as effective as the rinse method in the small reactor because at 0.1% acid concentration selenium was reduced from 15 ppm to 12 ppm. In the 0.5% to 5% acid concentration tests, selenium was removed down to 4.8 ppm or less. In the slurry tank, larger reactor vessel, all acid concentrations removed selenium down to 5 ppm or less showing that the larger acid volume increased the effectiveness of the selenium removal. The slurry tank reactor processes had approximately the same results as the acid rinse contaminant removal process for magnesium and aluminum removal. The slurry tank reactor test was duplicated at the 0.1 and 0.5% acid concentrations for the slurry tank small reactor but the reactor was heated to 65 to 85° C. The additional heat made very little difference as far as removal of the heavy metals.

The filtrate with the highest selenium concentration was poured through an activated carbon column in a single pass test and a double pass test. Both tests removed selenium from the filtrate down to 4 ppm or less. The activated carbon also significantly removed the magnesium in the filtrate. This test proved that the use of activated carbon is a viable method to separate the selenium from the acid solution where the solution could be recycled back to the process. There are known methods for regenerating activated carbon so that the selenium and other metals could be reclaimed.

Stack samples captured from Miller Plant's scrubber discharge were analyzed for selenium and all samples were found to contain less than 4 ppm of selenium. Selenium contamination is not an issue in the stack gases. The pH of the stack samples ranged from 8.11 to 9.73.

The invention claimed is:

1. A continuous countercurrent flow process for converting FGD gypsum to ammonium sulfate and calcium carbonate comprising the following steps:
    separating an aqueous slurry of FGD gypsum to result in a FGD gypsum liquid residue and a FGD gypsum cake;
    combining the FGD gypsum cake with an ammonium carbonate solution and an ammonium sulfate solution in a first reactor to chemically react and form an ammonium sulfate solution containing a precipitated calcium carbonate and a FGD gypsum remnant and an ammonium carbonate remnant;
    separating the precipitated calcium carbonate from the ammonium sulfate solution to result in a product ammonium sulfate solution residue and an initial product calcium carbonate cake;
    employing a part of the product ammonium sulfate solution residue to retain as product ammonium sulfate solution and a remaining part to recycle back into the first reactor;
    combining the initial product calcium carbonate cake with a portion of the ammonium carbonate solution in a second reactor to chemically react and form an initial product ammonium sulfate solution;
    separating the initial product ammonium sulfate solution to result in an initial product ammonium sulfate solution residue and a final product calcium carbonate cake and retaining the final product calcium carbonate cake;
    washing the final product calcium carbonate cake with a portion of the ammonium carbonate solution, then with water to result in an ammonium carbonate wash residue;
    adding the ammonium carbonate wash residue to the second reactor; and
    employing part of the initial product ammonium sulfate solution residue to recycle to the first reactor and part of the initial product ammonium sulfate solution residue to recycle to the second reactor.

2. The process of claim 1, wherein the product ammonium sulfate solution contains ammonium sulfate and the product calcium carbonate cake contains calcium carbonate, with both ammonium sulfate and calcium carbonate in a yield of 97 to 100%.

3. The process of claim 1, wherein the product ammonium sulfate solution contains ammonium sulfate and the product calcium carbonate cake contains calcium carbonate, with both ammonium sulfate and calcium carbonate in a yield of 100%.

4. The process of claim 1, wherein the process has a total time of reaction being 8 to 12 minutes.

5. The process of claim 1, wherein the FGD gypsum is particulate crystals having less reactive surface area, being prism crystals of size 30×30×40 microns to 40×40×80 microns.

6. The process of claim 1, wherein the process is conducted at temperatures of 80 to 100° F.

7. The process of claim 1, further including mixing within the first reactor and the second reactor by a mixer selected from the group consisting of impeller mixer, paddle mixer, ultrasonic mixer and homogenizer.

8. The process of claim 7, wherein the ultrasonic mixer operates periodically at 2-20 seconds per minute of retention time in a reactor.

9. The process of claim 1, wherein separating is by a centrifuge or a filter.

10. The process of claim 1, wherein contaminants are removed from the FGD gypsum by an acid rinse process comprising the steps of
    filtering the FGD gypsum slurry to result in a FGD gypsum filter cake;
    rinsing the FGD gypsum filter cake with an aqueous solution containing sulfuric acid from 0.01 to 10% concentration to result in a purified FGD gypsum filter cake; and
    rinsing the purified FGD gypsum filter cake with water to remove residual sulfuric acid solution to result in a final purified FGD gypsum filter cake.

11. The process of claim 10, wherein there is a reduction in selenium concentration of 71-73%, a reduction in magnesium of 46-91% and a reduction of aluminum of 18-36%.

12. The process of claim 10, wherein the waste filtrate is purified by a process comprising the steps of contacting the waste filtrate with active carbon to reduce the concentration of selenium to less than 4 ppm.

13. The process of claim 1, wherein contaminants are removed from the FGD gypsum by a slurry tank process comprising the steps of
    introducing the aqueous slurry of FGD gypsum to a reactor vessel;
    introducing an aqueous solution of sulfuric acid from 0.01 to 10% concentration to the reactor vessel and mixing with the aqueous slurry of FGD gypsum to produce a reacted slurry containing contaminant products in solution; and
    filtering the reacted slurry to produce a filter cake of purified FGD gypsum and waste filtrate.

14. The process of claim 13, wherein there is a reduction in selenium concentration of 65-73%, a reduction in magnesium of 19-90% and a reduction of aluminum of 19-90%.

15. The process of claim 13, wherein the waste filtrate is purified by a process comprising the steps of contacting the waste filtrate with active carbon to reduce the concentration of selenium to less than 4 ppm.

16. The process of claim 1, wherein the step of combining the washed FGD gypsum cake with an ammonium carbonate solution, the amount of washed FGD gypsum and the amount of ammonium carbonate solution is regulated by adjusting the amount of recycled product ammonium sulfate solution to the first reactor and the amount of recycled initial product ammonium sulfate solution to the second reactor.

17. The process of claim 1, wherein
    the first reactor contains a solids concentration of reactants and the second reactor contains a solids concentration of reactants, and the solids concentration in the first reactor is regulated by adjusting a discharge flow from the first reactor and a recycle input flow to the first reactor, and the solids concentration in the second reactor is regulated by adjusting a discharge flow from the second reactor and a recycle input flow to the second reactor.

18. The process of claim 1, wherein the final product calcium carbonate cake comprises calcium carbonate particles having substantially cubic shape and of a size ranging from 0.5 to 4.0 microns.

19. A continuous countercurrent flow process for converting FGD gypsum to ammonium sulfate and calcium carbonate comprising the following steps:
- filtering an aqueous slurry of FGD gypsum to result in a FGD gypsum liquid filtrate and a FGD gypsum filter cake;
- washing the FGD gypsum filter cake with water and disposing a wash water filtrate;
- combining the washed FGD gypsum filter cake with an ammonium carbonate and an ammonium sulfate solution in a first reactor to chemically react and form an ammonium sulfate solution containing a precipitated calcium carbonate and a FGD gypsum remnant and an ammonium carbonate remnant;
- filtering the precipitated calcium carbonate from the ammonium sulfate solution to result in a product ammonium sulfate solution filtrate and an initial product calcium carbonate filter cake;
- employing a part of the product ammonium sulfate solution filtrate to retain as product ammonium sulfate solution and a remaining part to recycle back into the first reactor;
- combining the initial product calcium carbonate filter cake with a portion of the ammonium carbonate solution in a second reactor to chemically react and form an initial product ammonium sulfate solution;
- filtering the initial product ammonium sulfate solution to result in an initial product ammonium sulfate solution filtrate and a final product calcium carbonate cake and retaining the final product calcium carbonate cake;
- washing the final product calcium carbonate cake with unreacted ammonium carbonate solution, then with water to result in an ammonium carbonate wash filtrate containing ammonium carbonate and calcium sulfate, and a clean final product calcium carbonate cake;
- adding the ammonium carbonate wash filtrate to the second reactor;
- employing part of the initial product ammonium sulfate solution filtrate to recycle to the first reactor and part of the initial product ammonium sulfate solution filtrate to recycle to the second reactor;
- employing the ammonium carbonate wash filtrate as the absorbing liquid in an absorber tower and contacting the ammonium carbonate wash filtrate with ammonia and carbon dioxide to produce ammonium carbonate, and recycling the ammonium carbonate as a process reactant.

20. A continuous countercurrent flow process for converting FGD gypsum to ammonium sulfate and calcium carbonate comprising the following steps:
- filtering an aqueous slurry of FGD gypsum on a continuous filter having two zones, zone A and zone B, where in zone A water is washed over the FGD gypsum to result in a FGD gypsum waste filtrate and a FGD gypsum filter cake and in zone B, the FGD gypsum filter cake is washed with an ammonium sulfate solution containing a residual ammonium carbonate to result in a purer ammonium sulfate solution as process product and a reacted FGD gypsum filter cake containing calcium carbonate;
- combining the reacted FGD gypsum filter cake with an ammonium carbonate solution and an ammonium sulfate solution in a first reactor to chemically react and form an ammonium sulfate solution containing a precipitated calcium carbonate and a FGD gypsum remnant and an ammonium carbonate remnant;
- separating the precipitated calcium carbonate from the ammonium sulfate solution to result in a product ammonium sulfate solution residue and an initial product calcium carbonate cake;
- employing a part of the product ammonium sulfate solution residue to retain as product ammonium sulfate solution and a remaining part to recycle back into the first reactor;
- combining the initial product calcium carbonate cake with a portion of the ammonium carbonate solution in a second reactor to chemically react and form an initial product ammonium sulfate solution;
- filtering the initial product ammonium sulfate solution on a continuous filter having three zones, zone A, zone B and zone C, wherein the initial product ammonium sulfate solution is filtered in zone A to result in an initial product ammonium sulfate solution filtrate and a final product calcium carbonate filter cake containing a second FGD gypsum remnant and in zone B the final product calcium carbonate filter cake is washed with a second ammonium carbonate solution to remove the second FGD gypsum remnant, resulting in an ammonium carbonate filtrate that is recycled to the second reactor, and in zone C the final product calcium carbonate filter cake is washed with water to result in an ammonium carbonate wash filtrate and the final product calcium carbonate cake is retained as process product;
- recycling the ammonium carbonate wash filtrate to the second reactor; and
- employing part of the initial product ammonium sulfate solution filtrate to recycle to the first reactor and part of the initial product ammonium sulfate solution filtrate to recycle to the second reactor.

* * * * *